(12) United States Patent
Shoshan et al.

(10) Patent No.: US 10,362,492 B2
(45) Date of Patent: Jul. 23, 2019

(54) MOVING CELLULAR COMMUNICATION SYSTEM

(71) Applicant: ELTA SYSTEMS LTD., Ashdod (IL)

(72) Inventors: Yaakov Shoshan, Ashkelon (IL); Jacob Tzlil, Rishon Lezion (IL); Gil Koifman, Petach-Tikva (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 16/031,055

(22) Filed: Jul. 10, 2018

(65) Prior Publication Data

US 2018/0317099 A1 Nov. 1, 2018

Related U.S. Application Data

(63) Continuation of application No. 15/366,371, filed on Dec. 1, 2016, now Pat. No. 10,045,233, which is a (Continued)

(30) Foreign Application Priority Data

Aug. 29, 2011 (IL) .......................................... 214867

(51) Int. Cl.
*H04W 16/26* (2009.01)
*H04W 4/90* (2018.01)
(Continued)

(52) U.S. Cl.
CPC .............. *H04W 16/26* (2013.01); *H04B 7/15* (2013.01); *H04B 7/15507* (2013.01);
(Continued)

(58) Field of Classification Search
CPC ..... H04W 88/04; H04W 84/047; H04W 4/22; H04W 84/045; H04W 16/26;
(Continued)

(56) References Cited

U.S. PATENT DOCUMENTS

| 4,236,158 A | 11/1980 | Daniel |
| 5,357,257 A | 10/1994 | Nevin |

(Continued)

FOREIGN PATENT DOCUMENTS

| KR | 2009-010000 | 9/2009 |
| WO | 0115466 A1 | 3/2001 |

(Continued)

OTHER PUBLICATIONS

Band-Limited, White Gaussian Noise Excitation for Reverberation Chambers and Applications to Radiated Susceptibility Testing by Crawford et al., dated Jan. 1996.*

(Continued)

*Primary Examiner* — Daniel Lai
(74) *Attorney, Agent, or Firm* — Browdy and Neimark, PLLC

(57) ABSTRACT

A cellular system that includes one or more moving relays, each having one or more add-on Interference Cancellation Modules (ICMs) capable of generating a cleaner signal by increasing the Signal-to-Interferer Ratio (SIR), thereby cancelling interference. The interference originates from intra-network or from out-of-network source. The system enables cellular communication between two or more mobile stations, in a geographic area that lacks adequate cellular coverage by one or more stationary base station.

20 Claims, 31 Drawing Sheets

Related U.S. Application Data continuation of application No. 14/241,673, filed as application No. PCT/IL2012/050332 on Aug. 29, 2012, now Pat. No. 9,544,783.

(51) Int. Cl.

| | | |
|---|---|---|
| H04W 84/00 | (2009.01) | |
| H04B 7/15 | (2006.01) | |
| H04W 16/10 | (2009.01) | |
| H04W 16/22 | (2009.01) | |
| H04W 16/32 | (2009.01) | |
| H04W 36/08 | (2009.01) | |
| H04W 40/02 | (2009.01) | |
| H04W 64/00 | (2009.01) | |
| H04B 7/155 | (2006.01) | |
| H04B 7/26 | (2006.01) | |
| H04B 7/185 | (2006.01) | |
| H04W 12/08 | (2009.01) | |
| H04W 24/02 | (2009.01) | |
| H04W 72/08 | (2009.01) | |
| H04W 40/22 | (2009.01) | |

(52) U.S. Cl.
CPC ....... *H04B 7/18504* (2013.01); *H04B 7/2606* (2013.01); *H04W 4/90* (2018.02); *H04W 12/08* (2013.01); *H04W 16/10* (2013.01); *H04W 16/22* (2013.01); *H04W 16/32* (2013.01); *H04W 24/02* (2013.01); *H04W 36/08* (2013.01); *H04W 40/026* (2013.01); *H04W 64/003* (2013.01); *H04W 72/082* (2013.01); *H04W 84/005* (2013.01); *H04W 40/22* (2013.01); *H04W 64/006* (2013.01)

(58) Field of Classification Search
CPC . H04W 84/005; H04W 36/08; H04W 64/006; H04W 40/026; H04W 16/10; H04W 16/22; H04W 16/32; H04W 64/003; H04B 7/15
See application file for complete search history.

(56) References Cited

U.S. PATENT DOCUMENTS

| | | | |
|---|---|---|---|
| 5,363,111 | A | 11/1994 | Murphy |
| 5,990,831 | A | 11/1999 | McDowell |
| 6,115,409 | A | 9/2000 | Upadhyay et al. |
| 6,246,693 | B1 | 6/2001 | Davidson et al. |
| 8,014,029 | B2 | 9/2011 | Tripp |
| 8,676,144 | B2 | 3/2014 | Guo et al. |
| 8,718,560 | B2 | 5/2014 | Jin et al. |
| 9,654,988 | B2 | 5/2017 | Weisbart |
| 2004/0146024 | A1 | 7/2004 | Li et al. |
| 2008/0039146 | A1 | 2/2008 | Jin |
| 2008/0095282 | A1 | 4/2008 | Walton et al. |
| 2008/0260000 | A1 | 10/2008 | Periyalwar et al. |
| 2009/0096686 | A1 | 4/2009 | Niculescu et al. |
| 2009/0172397 | A1* | 7/2009 | Kim ............ H04W 12/06 713/168 |
| 2009/0227259 | A1 | 9/2009 | Min |
| 2009/0247182 | A1 | 10/2009 | Tamate |
| 2009/0257471 | A1 | 10/2009 | Tanaka et al. |
| 2009/0323836 | A1 | 12/2009 | Nakano et al. |
| 2009/0325479 | A1 | 12/2009 | Chakrabarti et al. |
| 2010/0303182 | A1 | 12/2010 | Daneshrad |
| 2010/0309834 | A1 | 12/2010 | Fischer et al. |
| 2012/0021687 | A1 | 1/2012 | Parker |
| 2012/0287781 | A1 | 11/2012 | Maria |
| 2013/0089009 | A1 | 4/2013 | Li et al. |
| 2013/0182785 | A1* | 7/2013 | Koifman ............ H04L 5/0023 375/267 |
| 2015/0245363 | A1 | 8/2015 | Lee et al. |

FOREIGN PATENT DOCUMENTS

| | | |
|---|---|---|
| WO | 2010105210 A2 | 9/2010 |
| WO | 2011092698 A1 | 8/2011 |
| WO | 2011158230 A2 | 12/2011 |
| WO | 2012014194 A2 | 2/2012 |
| WO | 2013027218 A2 | 2/2013 |

OTHER PUBLICATIONS

M. Torlak, "Spatial Array Processing" pp. 1-25. Telecommunications & Information Sys. Eng. The University of Texas at Austin dated Oct. 26, 1998.

Hafeth Hourani, "An Overview of Adaptive Antenna Systems", Helsinki University of Technology, Postgraduate course in Radio Communications (2004/2005), available on the internet: http://www.comlab.hut.fi/opetus/333/2004_2005_slides/Adaptive_antennas_text.pdf.

Chris Loadman et al., "An Overview of Adaptive Antenna Technologies for Wireless Communications", Chen & Dylan Jorgensen (Dalhousie University), Communication Networks and Services Research Conference 2003, pp. 1-5, Session A3, also available on the internet: http://www.cs.unb.ca/cnsrproject/Download/PDF/a3a.pdf.

I. Santamaria et al., Optimal MIMO Transmission Schemes with Adaptive Antenna Combining in the RF Path, 16th European signal processing conference, Aug. 25-29, 2008, also available on the internet: http://gtasweb.dicom.unican.es/files/Publicaciones/Congresos/Eusipco2008_MIMAX.pdf.

Suismita Das, "Smart Antenna Design for Wireless Communication using Adaptive Beam-forming Approach" Journal pp. 1-5. Electrical Engineering Department National Institute of Technology dated Nov. 19, 2008.

Peter Kootsookos et al., "Imposing pattern nulls on broadband array responses", Journal Acoustical Society of America, 105 (6), Jun. 1999.

Li et al., "A paper: An Examination of the Processing Complexity of an Adaptive Antenna System for WiMAX", 2nd IEE/EURASIP DSPEnabledRadio Conference, Southampton, Sep. 2005, also available on the internet: http://macltd.com/datafile_downloads/MAC%20Ltd%20-%20AAS%20for%20WiMAX.pdf.

B. Widrow et al., "Adaptive Antenna Systems", IEEE proceedings, vol. 55, No. 12, Dec. 1967, also available on the internet: http://isl-www.stanford.edu/~widrow/papers/j1967adaptiveantenna.pdf.

John Litva et al., "Digital Beamforming in Wireless Communications", Book, Artech House (1996).

Lal Chand Godara, "Smart Antennas" , Book, pp. 1-458, CRC Press (2004).

Frank Gross, "Smart Antennas for Wireless Communications", Book, The McGraw-Hill, pp. 1-285, (2005).

Syed Ahson et al., "WiMAX Technologies, Performance Analysis, and QoS", Book, pp. 1-296, CRC Press, Taylor and Francis Group (2008).

W. C. Cheuk et al., Null-steering LMS Dual-Polarised Adaptive Antenna Arrays for GPS, Journal of Global Positioning Systems (2005), vol. 4, No. 1-2: 258-267.

3GPP TS 36.300—Evolved Universal Terrestrial Radio Access (E-UTRA) and Evolved Universal Terrestrial Radio Access Network (E-UTRAN); Overall description; Stage 2, also available from http://www.3gpp.org/ftp/Specs/html-info/36300.htm printed Oct. 2013.

3GPP TS 36302—Evolved Universal Terrestrial Radio Access (E-UTRA); Services provided by the physical layer, also available from http://www3gpp.org/ftp/Specs/html-info/36302.htm, printed Oct. 2013.

http://en.wikipedia.org/w/index.php?title=Wideband&oldid=522580153, Widebrand, printed Oct. 28, 2013.

Budsabathon M et al: "Optimum Beamforming for Pre-FFT OFDM Adaptive Antenna Array", IEEE Transactions on Vehicular Technology, vol. 53, No. 4, Jul. 1, 2004, pp. 945-955, XP11115402, IEEE Service Center, Piscataway, NJ, US.

(56) References Cited

OTHER PUBLICATIONS

Fazel K: "Narrow-band interference rejection in orthogonal multi-carrier spread-spectrum communications", Universal Personal Communications, 1994, Sep. 27, 1994, pp. 46-50, XP010131551, New York, NY, USA, IEEE.

* cited by examiner

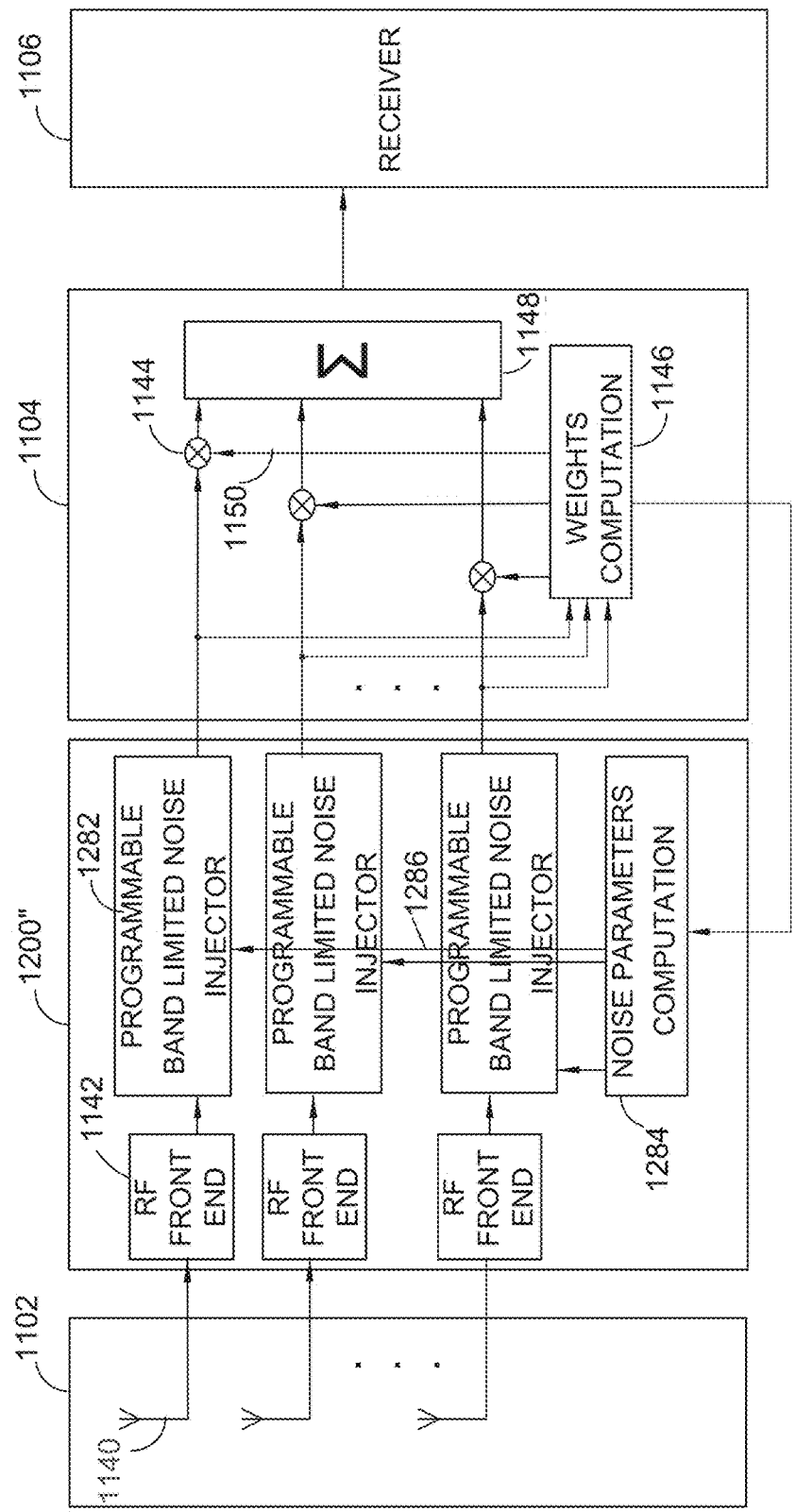

MOVING CELLULAR COMMUNICATION SYSTEM

FIELD OF THE INVENTION

This invention relates to moving cellular communication systems.

BACKGROUND OF THE INVENTION

The ever increasing popularity of cellular communication has led to dramatic improvements in cellular infrastructure deployment in urban areas as well as on highways in rural environments in many countries over the globe. The introduction of the cellular 3G standard and the newer 4G standard has further encouraged significant investments for improving cellular coverage in such areas.

Cellular communication offers a versatile type of communication that is characterized by at least:
(a) communication at a variable distance sub-range that falls in the range of sub-meter (e.g. femto-cells) to more than 10 Km (e.g. macro-cells);
(b) communication of desired application including at least one of audio, video and data;
(c) communication in a variety of environments including at least one of urban, sub-urban and rural areas,
all using basically the same cellular mobile stations (e.g. cellular telephones, smart-phones or tablets).

However, the vast majority of the cellular infrastructures is of a stationary nature, namely utilization of stationary core segments and base stations. Whilst the efficient deployment of stationary infrastructure affords efficient cellular communication in many densely populated areas, it falls short in providing the same quality of service (or even any cellular coverage) in areas that lack adequate cellular infrastructure or are devoid of any infrastructure.

In addition, even geographical areas that have appropriate cellular coverage may be susceptible to degraded performance or even total collapse of cellular communication coverage, for instance resulting from natural disasters, for example such as when a hurricane storm significantly damages the stationary stations or cores.

This may not only adversely affect the ability of the population in the disaster area to contact each other, but also may hinder rescue efforts held by rescue forces such as the police, firemen and medical emergency forces who may require efficient cellular communication extremely useful for fulfilling their designated rescue tasks.

As an alternative to lack of cellular communication infrastructure, and considering for example a rescue task (e.g. extinguishing a fire spread over a large area), the rescue team may be required to employ various types of wireless communication devices, some of which are designated for short range communication (e.g. between firemen that are close to each other), others adapted for long range communication (e.g. between a fireman communicating with a pilot for directing an airplane carrying fire extinguishing substances towards a desired area). Certain devices are operable in rural environments but their functionality is adversely affected in urban environments. Some devices are adapted for voice application but cannot communicate video or data.

There is thus a need to provide a cellular system that employs non-stationary base station(s) utilizable in a geographical area that lacks adequate coverage for facilitating versatile communication.

Conventional technology pertaining to certain embodiments of the present invention is described in the following publications inter alia: Spatial Array Processing, Murat Torlak, The University of Texas at Austin, available on the World Wide Web An Overview of Adaptive Antenna Systems, Hafeth Hourani, Helsinki University of Technology, available on the World Wide Web An Overview of Adaptive Antenna Technologies For Wireless Communications, Chris Loadman, Dr. Zhizhang Chen & Dylan Jorgensen, Dalhousie University, available on the World Wide Web Optimal MIMO Transmission Schemes with Adaptive Antenna Combining in the RF Path, Santamaria et al., European signal processing conference 2008, available on the World Wide Web Smart Antenna Design for Wireless Communication using Adaptive Beam-forming Approach, Susmita Das, National Institute of Technology, Rourkela, India, available on the World Wide Web An Examination of the Processing Complexity of an Adaptive Antenna System for WiMAX, Li et al., DSPEnabledRadio Conference, 2005, available on the World Wide Web U.S. Pat. No. 5,363,111 to Murphy, entitled "Apparatus and method for spatial nulling of interfering signals"

Adaptive Antenna Systems, Widrow et al., IEEE proceedings, 1967, available on the World Wide Web 3GPP TS 36.300—Evolved Universal Terrestrial Radio Access (E-UTRA) and Evolved Universal Terrestrial Radio Access Network (E-UTRAN); Overall description; Stage 2, available on the World Wide Web 3GPP TS 36.302—Evolved Universal Terrestrial Radio Access (E-UTRA); Services provided by the physical layer, available on the World Wide Web Imposing pattern nulls on broadband array responses, Peter Kootsookos et al., Journal Acoustical Society of America, 105 (6), June 1999
  Digital Beamforming in Wireless Communications, John Litva and Titus Kwok-Yeung Lo, Artech House, 1996
  Smart Antennas, Lal Chand Godara, CRC Press, 2004
  Smart Antennas for Wireless Communications, Frank Gross, McGraw-Hill, 2005
  WiMAX Technologies, Performance analysis, and QoS, Syed Ahson and Mohammad Ilyas, CRC Press, 2008
  "Null-steering LMS Dual-Polarised Adaptive Antenna Arrays for GPS", W. C. Cheuk, M. Trinkle & D. A. Gray, Journal of Global Positioning Systems (2005), Vol. 4, No. 1-2: 258-267

The disclosures of all publications and patent documents mentioned in the specification, and of the publications and patent documents cited therein directly or indirectly, are hereby incorporated by reference.

SUMMARY OF THE INVENTION

In accordance with an aspect of the invention, there is provided a cellular system comprising at least one moving non-stationary base station for enabling cellular communication between at least two mobile stations in a geographic area that lacks adequate cellular coverage by at least one stationary base station.

In accordance with certain embodiments, there is further provided at least one stationary base station.

In accordance with certain embodiments of the invention, there is further provided at least one non stationary core segment.

In accordance with certain embodiments of the invention, said non stationary core segment being a simulated stationary network.

In accordance with certain embodiments of the invention, said non stationary base station being a moving relay.

In accordance with certain embodiments of the invention, there is further provided at least one stationary core segment and stationary base station.

In accordance with certain embodiments of the invention there is further provided support of dynamic topology in terms of at least variable number of non stationary base stations and number of mobile stations.

In accordance with certain embodiments of the invention, said dynamic topology includes multi-layer Hierarchical dynamic cellular network.

In accordance with certain embodiments of the invention, the system is operable in an adaptable network coverage mode for adequately supporting a static or dynamic deployment of cellular mobile stations.

In accordance with certain embodiments of the invention, said adaptable network coverage includes change of assignment of cellular mobile stations between non-stationary base stations.

In accordance with certain embodiments of the invention, said adaptable network coverage includes change of location of at least one non-stationary base station.

In accordance with certain embodiments of the invention, said adaptable network coverage includes change of transmission or reception characteristics of said non-stationary bases stations.

In accordance with certain embodiments of the invention, said transmission or reception characteristics are selected from a group includes antenna type, antenna pointing, antenna beam-width and transmission power.

In accordance with certain embodiments of the invention, the system is operable in 3G standard.

In accordance with certain embodiments of the invention, the system is operable in 4G standard.

In accordance with certain embodiments of the invention, the system is operable in WiMax standard.

In accordance with certain embodiments of the invention, the system is operable in areas of disaster where existing stationary cellular infrastructure malfunction.

In accordance with certain embodiments of the invention, said cellular communication is characterized by
  i) communication between at least two mobile stations at a variable distance that falls in the range of sub-meter to more than 10 Km;
  ii) communication of desired application including at least one of audio, video, messaging and data.

In accordance with certain embodiments of the invention, said cellular communication is further characterized by
  iii) communication in an environment including at least one of urban, sub-urban, rural. maritime and aerial.

In accordance with certain embodiments of the invention, said non stationary moving base station is carried by moving autonomous platform from a group that includes ground robot, unmanned aerial vehicle (UAV) or unmanned seaborne vessel.

In accordance with an aspect of the invention, there is provided a mobile station equipped with ICM and carry-able by a platform, in a cellular system comprising at least one moving non-stationary base station for enabling cellular communication between at least two mobile stations in a geographic area that lacks adequate cellular coverage by at least one stationary base station.

In accordance with certain embodiments of the invention, said cellular system further including at least one stationary base station.

In accordance with an aspect of the invention, there is provided a mobile station equipped with SM and carry-able by a platform, in a cellular system comprising at least one moving non-stationary base station for enabling cellular communication between at least two mobile stations in a geographic area that lacks adequate cellular coverage by at least one stationary base station.

In accordance with certain embodiments of the invention, said cellular system further including at least one stationary base station.

In accordance with an aspect of the invention, there is provided a non stationary base station equipped with ICM, in a cellular system comprising at least one moving non-stationary base station for enabling cellular communication between at least two mobile stations in a geographic area that lacks adequate cellular coverage by at least one stationary base station.

In accordance with an aspect of the invention, there is provided a non stationary core segment equipped with SM, in a cellular system comprising at least one moving non-stationary base station for enabling cellular communication between at least two mobile stations in a geographic area that lacks adequate cellular coverage by at least one stationary base station.

In accordance with an aspect of the invention, there is provided a cellular system comprising at least two moving non-stationary base stations for enabling cellular communication between at least two mobile stations in a geographic area that lacks adequate cellular coverage by at least one stationary base station.

A system according to any of the previous embodiments wherein the cellular system enables adaptable network coverage.

Furthermore, the adaptable network coverage can be one or more of the following types: distributed, centralistic, partly distributed and partially centralistic.

Furthermore, adaptation of the network coverage may be made autonomously by the moving non-stationary base station.

Furthermore, the system may be operable in WiFi standard.

Spatial nulling and spatial interference cancellation is a known subject in the field of communications. The basics of these techniques is using multiple antennas (antenna array) at the receiver, and combining the signals from the antennas in a way that some optimization criteria are achieved. For example, criteria may minimize the received energy from spatial directions of interferers (one or more) while maintaining a proper received energy of the desired signal. Some other criteria may maximize the ratio of the desired signal energy to the energy of the received interferers.

Prior art FIG. 11 illustrates the conventional method for such spatial interference cancellers which is well known from the prior art and aptly illustrated, for example, in FIG. 1 of U.S. Pat. No. 5,363,111. Conventional spatial nulling is described inter alia in the following publications:

Null-steering LMS Dual-Polarised Adaptive Antenna Arrays for GPS, W C Cheuk, M Trinkle & D A Gray, Journal of Global Positioning Systems (2005), Vol. 4, No. 1-2: 258-267, particularly FIG. 1
  An Overview of Adaptive Antenna Systems, Hafeth Hourani, Helsinki University of Technology—particularly FIG. 1+FIG. 2

An Overview of Adaptive Antenna Technologies For Wireless Communications, Chris Loadman, Dr. Zhizhang Chen & Dylan Jorgensen, Dalhousie University—particularly FIG. 1

Smart Antenna Design for Wireless Communication using Adaptive Beam-forming Approach, Susmita Das, National Institute of Technology, Rourkela, India—particularly FIG. 1

Digital Beamforming in Wireless Communications, John Litva and Titus Kwok-Yeung Lo, Artech House—particularly chapter 2+FIG. 2.16

Smart Antennas, Lal Chand Godara, CRC Press—chapter 2, especially section 2.3, and FIG. 2.1, Smart Antennas for Wireless Communications, Frank Gross, McGraw-Hill, especially chapter 1 FIG. 1.1,—section 8.3.1+FIG. 8.2, section 8.4.

A desired signal 1112, coming from a particular spatial direction, is received by an antenna array 1102. One or more interfering signals 1110, coming from various other spatial directions, are also received by the antenna array 1102. The antenna array comprises two or more antennas, each of them receiving the superposition of the desired signal and the interfering signal(s). Generally, having more antennas in the antenna array enhances the performance of the method, and enables the cancellation of more interferers. The received signals from the antenna array are then fed into spatial nulling means 1104, which combines them into a single signal using some combining method. The combining method may be implemented by analog means or by digital means. The combining method applies either relative delay, gain or phase to the various signals prior to the combining. The combined signal is then fed into the receiver 1106. Receiver 1106 may be, for example, a demodulator for the desired signal 1112. The spatial nulling means 1104 may, for example, minimize the energy received from a specific spatial direction. This is called "Spatial Nulling", or "Null Steering".

Optionally, desired signal 1112 comprises a plurality of desired signals, each coming from a particular spatial direction. For example, in a multi-user communication system a plurality of desired signals are transmitted by a plurality of users, to be received by receiver 1106.

Prior art FIG. 12 illustrates some known in the art embodiments of the spatial nulling means 1104. Each antenna 1140 in antenna array 1102 is first fed into an RF front end 1142. The RF front end may comprise a Low-Noise-Amplifier (LNA), and may optionally comprise down-convertor. The signals from the RF front end are then fed into a weights computation 1146, which implements the chosen combining method. The weights computation unit 1146 computes and generates complex weights 1150, one per antenna. The signals from the RF front end 1142 and the appropriate weights 1150 are then multiplied by multiplier 1144, and summed by the combiner 1148 to a single signal. This method of complex weights multiplication may be implemented either in RF (Radio Frequency), IF (Intermediate Frequency) or Baseband.

Prior art FIG. 13*a* illustrates an example of the spatial gain pattern of the combined signal. The graph shape and values depend on the computed weights, the number of antennas, and the antenna characteristics, and is given here only as an example. In this example, a spatial null of about 30 dB is achieved at the direction (angle) of about 0 degrees, while at directions far from the null by 10 degrees or more, desired signals are received with a ripple of 5 dB. FIG. 13*b* illustrates an example of two spatial nulls, at −60 degrees and at about 22 degrees, for the suppression of two interferers.

Prior art FIGS. 13*a* and 13*b* illustrates the gain pattern for a single frequency. In other frequencies, the null depth and the gain pattern in general, change. For a wideband signal, such as used by modern digital communications, this may be a problem.

Prior art FIG. 14 illustrates an example of the combined signal frequency response 1160 of the example in FIG. 13*a*, at the spatial angle of 0 degrees. In this example, a bandwidth of 100 MHz centered at 1 GHz is considered. At the spatial angle of 0 degrees, which is the designed null direction, some frequencies of the interferer signal are suppressed by more than 50 dB, while other frequencies of the interferer are suppressed only by 25 dB, which might not be enough in some scenarios. This example demonstrates the difficulties and the problems in traditional spatial nulling means for a wideband signal.

A multicarrier communication system is a system that uses a wideband digital modulated multicarrier signal for transmission. The bandwidth (of frequencies) is divided into multiple carriers, each of them carrying a digital modulated transmission. Some specific techniques of multicarrier communication are OFDM (Orthogonal Frequency Division Multiplexing) and OFDMA (Orthogonal Frequency Division Multiple Access). Some examples of communication standards that use multicarrier techniques are WiMAX, LTE, WiFi and many more. FIG. 21*a* illustrates a multicarrier signal 300.

In a multicarrier receiver, one known method for spatial interference cancellation is performing the method shown in prior art FIG. 12, but for each carrier independently. This is known as "post-FFT" technique. The receiver 1106 gets the signals directly from the antennas 1140, and performs a Fast Fourier Transform (FFT) on each of them, separating the signals to a group of carriers. Then, spatial nulling is applied independently for each of the carriers. For each carrier, weights are computed and the appropriate signals from the antennas are combined using these weights. This method shows good performances, and solves the problem of the wideband frequency response of the null, but has some disadvantages. First, the complexity of the spatial nulling means is very high, because it is done separately on each carrier (for example, 2048 carriers is a typical value). Secondly, it involves adding the spatial nulling means inside the receiver or demodulator. Many times this is not possible because the receiver or demodulator is a closed element which cannot be modified, or can only be modified in a very costly fashion.

Conventionally, data transmission allocations are usually mastered by a scheduler e.g. in the above referenced publication entitled "WiMAX Technologies Performance Analysis and QoS", particularly in chapter 9, and in both 3GPP standards referenced above, regarding a Scheduler in LTE Standard residing at one side of the communication system (either at the local side of the receiver, or at the remote side of the transmitter). The scheduler determines and allocates carrier frequencies for the use of the data transmissions, i.e. it determines onto which frequencies (carriers) the data will be transmitted. The scheduler's operational method takes into consideration, amongst other criteria, the channel quality over the various frequencies. Optionally, the scheduler's operational method also determines how much data will be transmitted over each of the carriers, i.e. how many bits per symbol will be transmitted over each carrier. The latter is commonly referred to as the "Bit Loading" or "Bit Allocation" method. In the case of a multi-user system, the scheduler also takes into consideration the throughput requirements and the QoS (Quality of Service) of each user, and the specific channel quality over various frequencies for each user.

Certain embodiments of the present invention seek to provide a method for enabling the usage of spatial nulling means and of weighted antenna summation for a wideband multicarrier communication signals, by applying a frequency-selective signal manipulator before the spatial nulling means.

Certain embodiments of the present invention seek to provide a frequency selective signal manipulator as a programmable multi-band BPF.

Certain embodiments of the present invention seek to provide a frequency selective signal manipulator as a programmable multi-band band-limited noise injectors.

Certain embodiments of the present invention seek to provide a frequency selective signal manipulator being configured/adjusted according to the designed nulling characteristics, as designed by the nulling means.

Certain embodiments of the present invention seek to provide a frequency selective signal manipulator being configured/adjusted according to the actual nulling characteristics, as measured at the output of the nulling means, typically without modifications to a standard receiver.

Certain embodiments of the present invention seek to provide a method for enabling the usage of spatial nulling means and of weighted antenna summation for wideband multicarrier communication signals, by reserving an empty region within the frame (this is done by appropriate configuration applied to the system scheduler), in which the spatial nulling methods could adapt. The empty region is typically dynamically allocated according to measured interferers' level.

Certain embodiments of the present invention seek to provide a method for detection of the empty region by analyzing the received signal from the antennas and/or by analyzing the signal emerging from the spatial nulling means. Empty region detection may be performed by the receiver via a suitable interface. In WiMAX applications, an empty region can be configured an empty zone. In LTE applications, an empty region can be configured on an empty RB (Resource Block).

There is thus provided, in accordance with at least one embodiment of the present invention, a system for cancelling spatial interference associated with an original multicarrier signal carrying at least one data transmission sent by a transmitter to an antenna array comprising a plurality of antennae and having a receiver operatively associated therewith, the system receiving a plurality of received signals respectively including the interference and the original signal as received by a respective individual antenna from among the plurality of antennae, the system comprising a spatial nulling device for generating a cleaner signal by reducing at least one spatial component of the interference; and a signal manipulator operative to manipulate a derivative of the received signal so as to cause the at least one data transmission to be more concentrated in a subset of frequency bands in which the spatial nulling device is more effective and to be less concentrated in frequency bands which do not belong to the subset of frequency bands.

The spatial interference may be generated by one or typically more interference sources. The derivative of the received signal may for example be the received signal itself. Signal manipulation may occur after spatial nulling.

Further in accordance with at least one embodiment of the present invention, the system also comprises an antenna array.

Still further in accordance with at least one embodiment of the present invention, the signal manipulator comprises a programmable band pass filter device which filters a signal to be filtered derived from a signal received by at least one of the antennae so as to pass at least one frequency band inside the subset and to block at least one frequency band outside the subset.

The signal to be filtered derived from an individual signal received by an individual antenna may, according to one embodiment, be the individual signal itself.

The band pass filter device typically but not necessarily comprises an array of band pass filters including a plurality of band pass filters corresponding in number to the plurality of antennae.

Further in accordance with at least one embodiment of the present invention, the spatial nulling device includes a dynamic weighted antenna summation functionality operative to dynamically compute a weighted sum of signals received by the plurality of antennae wherein the weighting is performed in accordance with a plurality of weighting coefficients corresponding in number to the plurality of antennae and selected to reduce at least one spatial component of the received signal which includes interference.

Still further in accordance with at least one embodiment of the present invention, each band pass filter has dynamically computed filter coefficients and wherein the signal manipulator also comprises a filter coefficient computer operative to dynamically compute the filter coefficients.

Additionally in accordance with at least one embodiment of the present invention, the spatial nulling device includes a weighted antenna summation functionality operative to compute a weighted sum of signals received by the plurality of antennae wherein the weighting is performed in accordance with a plurality of weighting coefficients corresponding in number to the plurality of antennae, and wherein the filter coefficient computer is operative to use the plurality of weighting coefficients to dynamically compute the filter coefficients.

Further in accordance with at least one embodiment of the present invention, the signal manipulator comprises an array of programmable band limited noise injectors including a plurality of programmable band limited noise injectors corresponding in number to the plurality of antennae, wherein each noise injector adds noise to the signal received from the antenna corresponding to the noise injector, such that noise is added only to frequency bands outside the subset and not to frequency bands inside the subset.

Still further in accordance with at least one embodiment of the present invention, the noise comprises white Gaussian noise.

It is appreciated that a single noise generator may be provided to feed the same noise to all injectors in the array. Alternatively, a separate noise generated may feed each of the injectors in the array.

Further in accordance with at least one embodiment of the present invention, the signal manipulator comprises an array of programmable band pass filters including a plurality of band pass filters corresponding in number to the plurality of antennae and wherein each individual band pass filter filters the signal received from the antenna corresponding to the individual band pass filter so as to pass all frequency bands inside the subset and to block all frequency bands outside the subset.

Still further in accordance with at least one embodiment of the present invention, the signal manipulator receives information indicative of the cleaner signal and operates in accordance therewith.

Additionally in accordance with at least one embodiment of the present invention, the information indicative of the cleaner signal comprises the cleaner signal itself.

Further in accordance with at least one embodiment of the present invention, the information indicative of the cleaner signal comprises a result of spectral analysis performed on the cleaner signal.

Still further in accordance with at least one embodiment of the present invention, the signal manipulator determines the subset at least partly based on the information indicative of the cleaner signal.

Additionally in accordance with at least one embodiment of the present invention, the signal manipulator determines the subset at least partly based on at least a portion of the plurality of weighting coefficients.

Further in accordance with at least one embodiment of the present invention, the signal manipulator receives signals from the antenna array and feeds signal to the spatial nulling device and wherein the programmable band pass filter device comprises a plurality of band pass filters corresponding in number to the plurality of antennae and wherein the programmable band pass filter device comprises an array of programmable band pass filters including a plurality of band pass filters corresponding in number to the plurality of antennae and wherein each individual band pass filter filters the signal received from the antenna corresponding to the individual band pass filter so as to pass at least one frequency band inside the subset and to block at least one frequency band outside the subset.

Further in accordance with at least one embodiment of the present invention, the spatial nulling device receives signals from the antenna array and feeds signal to the signal manipulator and wherein the signal to be filtered comprises an output signal generated by the spatial nulling device.

Further in accordance with at least one embodiment of the present invention, the signal manipulator performs at least one frequency-dependent operation on the signal.

Still further in accordance with at least one embodiment of the present invention, the signal comprises a communication signal.

Additionally in accordance with at least one embodiment of the present invention, the signal comprises a wideband signal.

Also provided, in accordance with at least one embodiment of the present invention, in a multi-carrier communication system including a receiver, at least one transmitter transmitting a multi-carrier signal to the receiver, an interference canceller for cancelling spatial interference and a scheduler which is operative, for each individual time frame along a temporal axis, to allocate to various data transmissions, respective portions of a time-frequency region defined over the individual time frame, the multi-carrier signal defining a multiplicity of carriers together spanning a frequency band, is a method for adapting the interference canceller to the interference, the method comprising using the scheduler to reserve at least one empty sub-region within the time-frequency region by allocating only portions external to the sub-region to each of the data transmissions; and configuring the interference canceller by deriving, from signal content in the empty sub-region, at least one interference-dependent parameter of the interference canceller's operation.

Further in accordance with at least one embodiment of the present invention, the empty sub-region includes the entire frequency band and only a portion of the time frame.

Still further in accordance with at least one embodiment of the present invention, the empty sub-region includes only a portion of the frequency band and only a portion of the time frame.

Additionally in accordance with at least one embodiment of the present invention, the empty sub-region includes only a portion of the frequency band and the entire time frame.

Further in accordance with at least one embodiment of the present invention, the using the scheduler comprises configuring the scheduler to reserve the at least one empty sub-region by allocating only the portions external to the sub-region to each of the data transmissions.

Still further in accordance with at least one embodiment of the present invention, using the scheduler comprises generating a request to the scheduler for allocation of a sub-region within the time-frequency region to an auxiliary transmitter; employing the scheduler to accede to the request by allocating at least one individual sub-region to the auxiliary transmitter; and refraining from transmitting within the individual sub-region.

Further in accordance with at least one embodiment of the present invention, no auxiliary transmitter is provided and the request to the scheduler for allocation to an auxiliary transmitter comprises a simulated request.

Still further in accordance with at least one embodiment of the present invention, the receiver is located at a first location and wherein the method also comprises providing the auxiliary transmitter at a second location which differs from the first location.

Additionally in accordance with at least one embodiment of the present invention, the method also comprises providing the auxiliary transmitter co-located with the receiver.

Also provided, in accordance with at least one embodiment of the present invention, is a method for cancelling spatial interference associated with an original multi-carrier signal carrying at least one data transmission sent by a transmitter to an antenna array comprising a plurality of antennae and having a receiver operatively associated therewith, the system receiving a plurality of received signals respectively including the interference and the original signal as received by a respective individual antenna from among the plurality of antennae, the system comprising using a spatial nulling device for generating a cleaner signal by reducing at least one spatial component of the interference; and manipulating a derivative of the received signal so as to cause the at least one data transmission to be more concentrated in a subset of frequency bands in which the spatial nulling device is more effective and to be less concentrated in frequency bands which do not belong to the subset of frequency bands.

Further in accordance with at least one embodiment of the present invention, the method also comprises providing a scheduler which is operative, for each individual time frame along a temporal axis, to allocate to the at least one data transmission, at least one respective portion of a time-frequency region defined over the individual time frame; and adapting the spatial nulling device to the interference, the adapting comprising using the scheduler to reserve at least one empty sub-region within the time-frequency region by allocating only at least one portion external to the sub-region to the at least one data transmission, rather than allocating any portion disposed internally of the sub-region to the at least one data transmission; and configuring the spatial nulling device by deriving, from signal content in the empty sub-region, at least one interference-dependent parameter of the spatial nulling device's operation.

Further in accordance with at least one embodiment of the present invention, the manipulating includes manipulating the received signal to cause the transmitter-receiver communications to be allocated only to a subset of frequency bands in which the spatial nulling device answers to a predetermined effectiveness criterion.

Still further in accordance with at least one embodiment of the present invention, the manipulating includes manipulating the received signal to cause the transmitter-receiver communications to be allocated only to a subset of frequency bands in which the spatial nulling device answers to a predetermined effectiveness criterion.

Additionally in accordance with at least one embodiment of the present invention, the request to the scheduler is generated by the auxiliary transmitter.

Further in accordance with at least one embodiment of the present invention, the multi-carrier communication system comprises a multi-user communication system.

Still further in accordance with at least one embodiment of the present invention, the configuring the interference canceller also comprises providing an empty region detector which triggers the interference canceller upon detection of the sub-region.

Additionally in accordance with at least one embodiment of the present invention, each noise injector has dynamically configurable noise parameters and wherein the signal manipulator also comprises a noise parameter computer operative to dynamically compute the noise parameters.

Further in accordance with at least one embodiment of the present invention, the configurable noise parameters define frequency bands of the noise.

Additionally in accordance with at least one embodiment of the present invention, the spatial nulling device includes a weighted antenna summation functionality operative to compute a weighted sum of signals received by the plurality of antennae wherein the weighting is performed in accordance with a plurality of weighting coefficients corresponding in number to the plurality of antennae, and wherein the noise parameters computer is operative to use the plurality of weighting coefficients to dynamically compute the noise parameters.

Further in accordance with at least one embodiment of the present invention, using the scheduler includes using the signal manipulator to manipulate the received signal so as to prevent the scheduler from allocating the empty sub-region to any of the data transmissions.

It is appreciated that embodiments of the invention are typically more useful to the extent that the signal is a wideband signal.

Cancelling spatial interference typically involves reduction of spatial interference rather than total elimination thereof.

Also provided, in accordance with at least one embodiment of the present invention, in a multi-carrier communication system including a receiver, at least one transmitter transmitting a multi-carrier signal to the receiver, an interference canceller for cancelling spatial interference and a scheduler which is operative, for each individual time frame along a temporal axis, to allocate to various data transmissions, respective portions of a time-frequency region defined over the individual time frame, the multi-carrier signal defining a multiplicity of carriers together spanning a frequency band; is apparatus for adapting the interference canceller to the interference, including apparatus for activating the scheduler to reserve at least one empty sub-region within the time-frequency region by allocating only portions external to the sub-region to each of the data transmissions; and apparatus for configuring the interference canceller by deriving, from signal content in the empty sub-region, at least one interference-dependent parameter of the interference canceller's operation.

Further in accordance with at least one embodiment of the present invention, the communication signal comprises a multi-user communication signal.

Still further in accordance with at least one embodiment of the present invention, the subset of frequency bands in which the spatial nulling device is more effective comprises frequencies satisfying a predefined criterion based on at least the estimated reduction of the at least one spatial component of the received signal at the frequencies.

Additionally in accordance with at least one embodiment of the present invention, the subset of frequency bands in which the spatial nulling device is more effective comprises frequencies satisfying a predefined criterion based on at least the estimated signal to interference ratio of the cleaner signal at the frequencies.

Still further in accordance with at least one embodiment of the present invention, the using the scheduler comprises configuring the scheduler to reserve the at least one empty sub-region by allocating only the portions external to the sub-region to each of the data transmissions.

Further in accordance with at least one embodiment of the present invention, the using the scheduler comprises generating a request to the scheduler for allocation of a sub-region within the time-frequency region to an auxiliary transmitter; employing the scheduler to accede to the request by allocating at least one individual sub-region to the auxiliary transmitter; and refraining from transmitting within the individual sub-region.

Further in accordance with at least one embodiment of the present invention, the generating a request to the scheduler comprises generating the request by the auxiliary transmitter.

Still further in accordance with at least one embodiment of the present invention, the cleaner signal is cleaner than each of the plurality of received signals.

Additionally in accordance with at least one embodiment of the present invention, the system also comprises a scheduler which is operative, for each individual time frame from among at least one time frame defined along a temporal axis, to allocate to the at least one data transmission, respective portions of a time-frequency region defined over the individual time frame; and to cause the at least one data transmission to be more concentrated in a subset of frequency bands including manipulating a derivative of the received signals so as to cause the scheduler to allocate the at least one data transmission to be more concentrated in a subset of frequency bands in which the spatial nulling device is more effective and to be less concentrated in frequency bands which do not belong to the subset of frequency bands.

Also in accordance with at least one embodiment of the present invention, the signal manipulator comprises a programmable band limited noise injector device which adds noise to a signal derived from a signal received by at least one of the antennae such that noise is added only to frequency bands outside the subset and not to frequency bands inside the subset.

Further in accordance with at least one embodiment of the present invention, the spatial nulling device receives signals from the antenna array and feeds a signal to the signal manipulator, and the signal derived from the signal received by the at least one of the antennae comprises an output signal generated by the spatial nulling device.

Still further in accordance with at least one embodiment of the present invention, the manipulating includes manipulating a derivative of the received signal so as to cause the scheduler to allocate the at least one data transmission such that the data transmission is more concentrated in a subset of frequency bands in which the spatial nulling device is more effective and is less concentrated in frequency bands which do not belong to the subset of frequency bands.

Further in accordance with at least one embodiment of the present invention, the method also comprises providing a scheduler which is operative, for each individual time frame from among at least one time frames defined along a temporal axis, to allocate to the at least one data transmission, respective portions of a time-frequency region defined over the individual time frame, and wherein the manipulating includes manipulating a derivative of the received signal so as to cause the scheduler to allocate the at least one data transmission such that the data transmission is more concentrated in a subset of frequency bands in which the spatial nulling device is more effective and is less concentrated in frequency bands which do not belong to the subset of frequency bands.

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 15a-15b, 16a-16b, 18a-18b, 19a-19d, 20a-20c and 26a-26c are simplified functional block diagram illustrations of interference cancelling systems for multicarrier communication applications, constructed and operative in accordance with certain embodiments of the present invention and characterized in that a spatial nulling device generates a cleaner signal by reducing at least one spatial component of interference and a signal manipulator manipulates a derivative of a received signal so as to cause at least one data transmission to be more concentrated in a subset of frequency bands in which the spatial nulling device is more effective and to be less concentrated in frequency bands which do not belong to that subset of frequency bands.

DETAILED DESCRIPTION OF THE INVENTION

Figure 1:
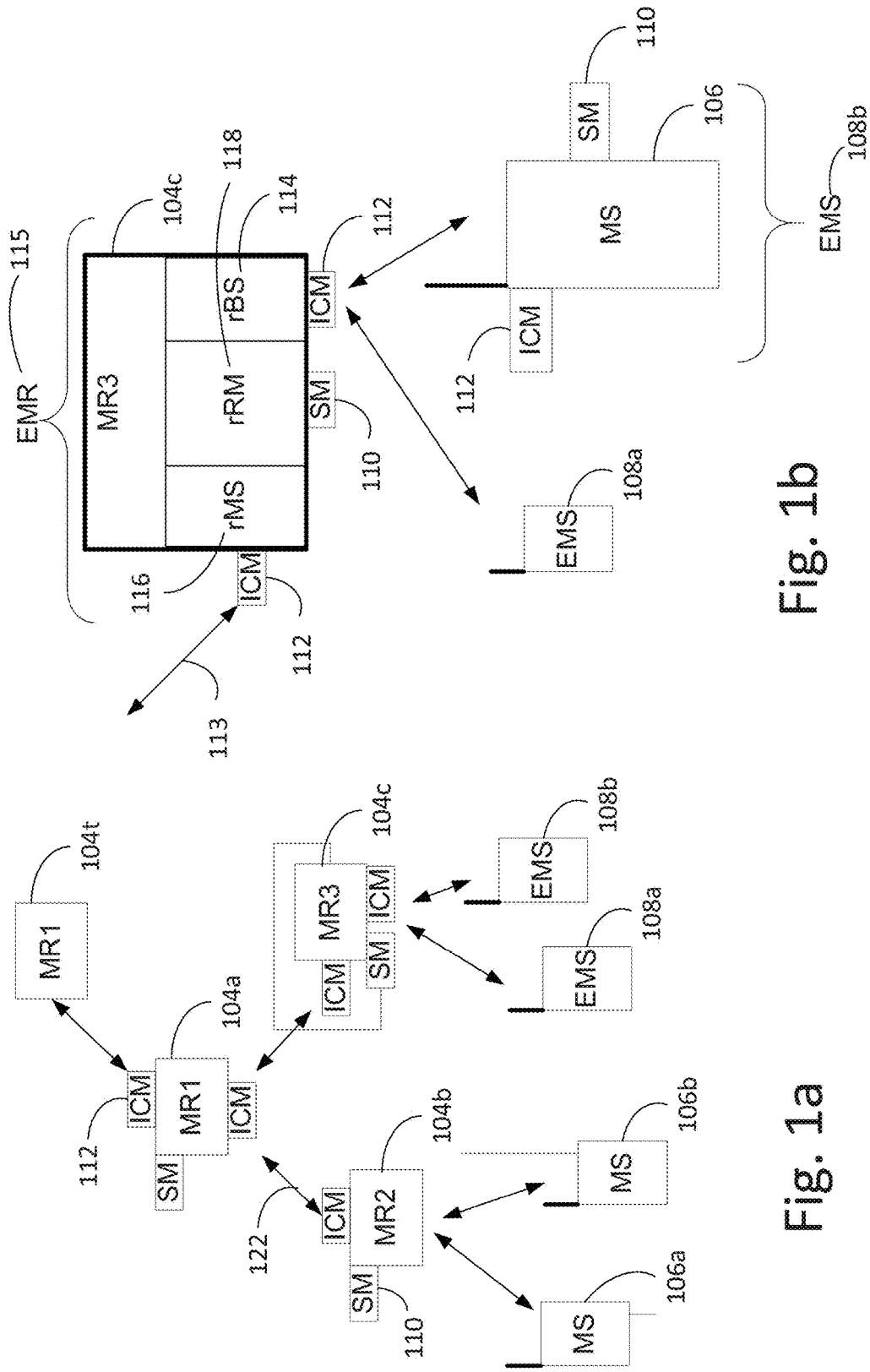
FIGS. 1a and 1b illustrate schematically generalized system architecture of the Moving Cellular Communication System, in accordance with certain embodiments of the invention.

FIG. 1a illustrates a Moving Cellular Communication System that includes (for example) three Moving Relays (MR) 104a, 104b and 104c that serves two Mobile Stations (MSs) 106a, 106b and two Enhanced Mobile Stations (EMSs) 108a, 108b. Each one of the moving relays is capable of moving while serving each one of the MSs or EMSs, as will be elaborated below. In addition, two add-on modules can be optionally connected to each MR or MS and turn them into enhanced MR (EMR) or enhanced MS (EMS) respectively. The add-on modules types are Interference Cancellation Module (ICM) 112 and Security Module (SM) 110. The ICM role as described in more detail in co-pending PCT patent application no. PCT/IL2011/000468 filed on Jun. 13, 2011 entitled "System and Methods for Null Steering in a Multicarrier System" whose contents is incorporated herein by reference is for interference cancellation (whether intra-network or from out-of-network source). The intra-network interference can be or include, for example, the mutual interference between the relay Mobile Station (rRM) and the relay Base Station (rBS), or between Mobile Stations located in adjacent cells or between Base Stations located in adjacent cells. The out-of-network interference can, for example, originate in an adjacent different cellular system (e.g. at border areas) or by any other suitable wireless system or source. The SM is added for upgraded security as described in more detail in co-pending PCT patent application no. PCT/IL2011/000587 filed on Jul. 21, 2011 entitled "Switched Application Processor Apparatus for Cellular Devices" whose contents is incorporated herein by reference and in co-pending Israeli patent application filed Aug. 25, 2011 by applicant entitled "Network Environment Separation" whose contents is incorporated herein by reference. For example, the SM can enable higher security application processing (Application Processor 2) to be used by the MS as seen e.g. in FIG. 8 of PCT/IL2011/000587 which depicts MS architecture incorporating SM as add-on to it (referenced there as 815). In addition, FIGS. 6 and 7 of PCT/IL2011/000587 illustrate outgoing and incoming sequences that can be implemented by EMS or EMR when it has SM attached to it.

It should be noted that the proposed cellular system can have all types and combinations of node, such as but not limited to: MS, MR, EMS, EMR. Each Enhanced node can have SM only or ICM only or any combination of both concurrently (i.e. 1 SM and 2 ICMs as in MR3 104c or 1 SM and 1 ICM as in MR2 104b, etc.).

FIG. 1b shows a zoom-in schematic view of a EMR 115 (in the presented example is MR3 104c and attached several add-on modules 112, 110) and also of an EMS (in the presented example is 108b). As can be seen, the MR consists of a base-station (rBS) 114 a relay resource manager (rRM) 118 and a link to other base station 113, which is implemented in the presented example as in-band backhauling using a local MS (rMS) 116 as described in more detail in co-pending PCT publication no. WO 2011/092698 published on Aug. 4, 2011 entitled "Cellular Communication System with Moving Base Stations and Methods and Apparatus Useful In Conjunction Therewith" whose contents is incorporated herein by reference. It should be noted that the backhauling link to other base station can be also implemented using any other technique, such as a dedicated backhauling link (e.g. using satellite communication, 3G/UMTS/HSPA, WiMAX, WiFi or microwave link). The add-on modules of the MR, SM 110 and two ICMs 112, are shown. Adding them (or part of them) turns the MR 104c to EMR 115. The addition of the add-on modules is also presented for the MS 106 which turns it to EMS 108b. It should be noted that in accordance with certain embodiments, the SM 110 of the EMR 115 can be interfaced to each of the MR components, e.g. to the rMS 116 as described in FIG. 1a above or to the rRM 118 in order to enable addition of higher security applications (e.g. IP Services 719 of FIG. 10) as part of the Stand-Alone Subsystem that includes a moving core segment). Note also that in accordance with certain embodiments the ICM is coupled to the output (e.g. Antenna) of MS (106) for achieving cancellation of ambient interferences (e.g. interfaces originated from near MR. near SeNB, near MS etc). Note that in accordance with certain embodiments, the outputs (e.g. Antennae) of rBS or rMS modules (114, 116 respectively) are coupled with null steering module (.e.g. ICM) for achieving cancellation of interferences originated from mutual interferences of rBS and rMS, near MR. near SeNB, near MS etc for example as depicts in PCT patent application no. PCT/IL2011/000468 filed on Jun. 13, 2011 entitled "System and Methods for Null Steering in a Multicarrier System" FIGS. 5a-5b.

Figure 2:
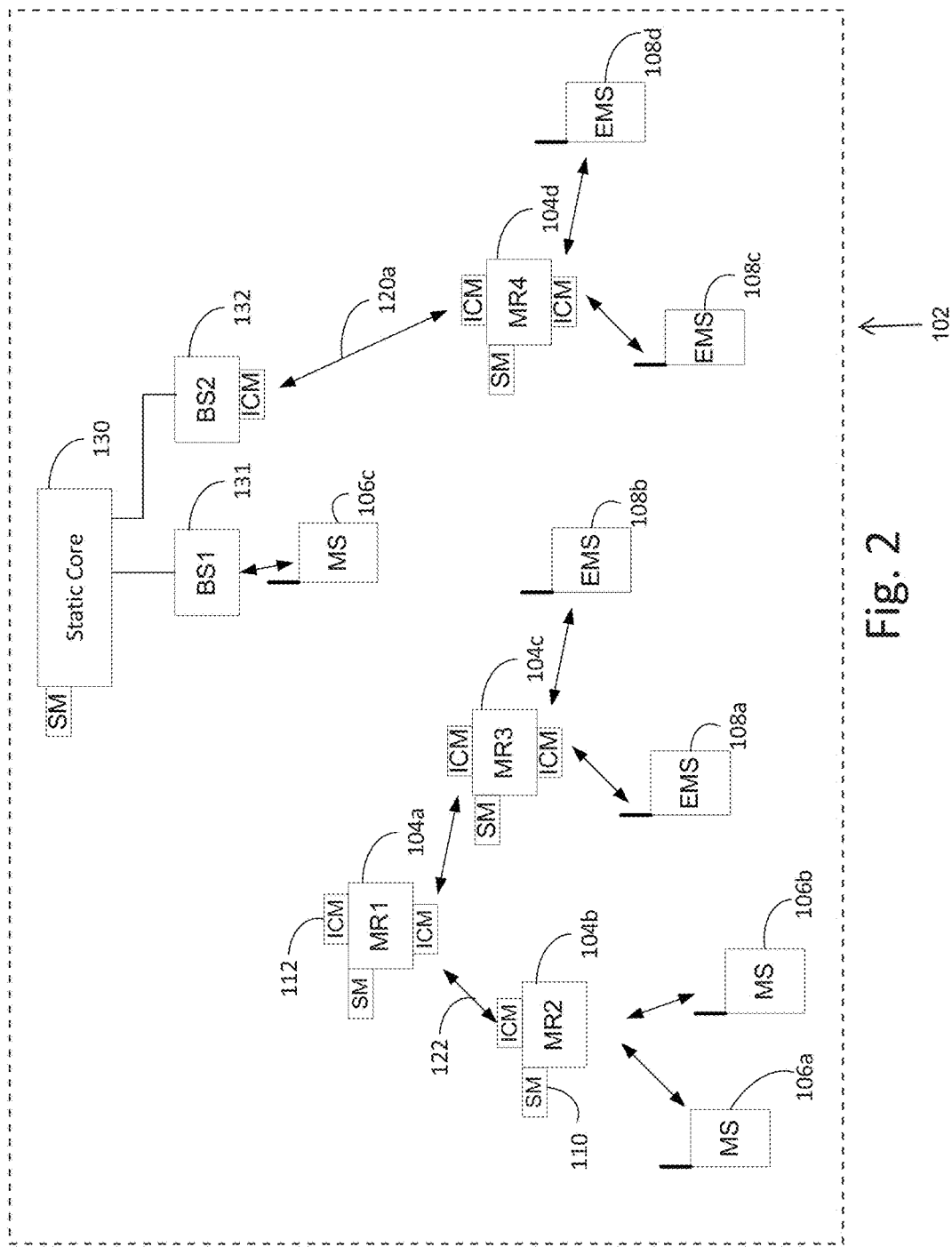
FIG. 2 illustrates schematically a generalized system architecture of the Moving Cellular Communication System that includes a stand-alone part and also a stationary cellular communication system part, in accordance with certain embodiments of the invention.

Turning now to FIG. 2, it presents a hybrid moving cellular communication system 102 that includes a non-stationary (namely—moving) part having adaptive coverage and which includes MR1 104a, MR2 104b and MR3 104c. In addition to the non-stationary part, the presented system includes also a standard stationary part that consists of a static core 130 and stationary base-stations 131, 132. It can be seen, in accordance with certain embodiments the SM can be interfaced to the Core segment similarly to the interface to the rRM described at the end of last paragraph. The stationary part coverage area is further extended in a dynamic way using MR4 104d because MR4 104d is non-stationary and can move according to the needed coverage area defined by the location of the served MSs. In this figure, EMSs 108c and 108d are not located in the stationary part coverage area and by using MR4 104*d* they can be connected to each other and to a MS that is served by the stationary part, i.e. 106*c*.

Figure 3:
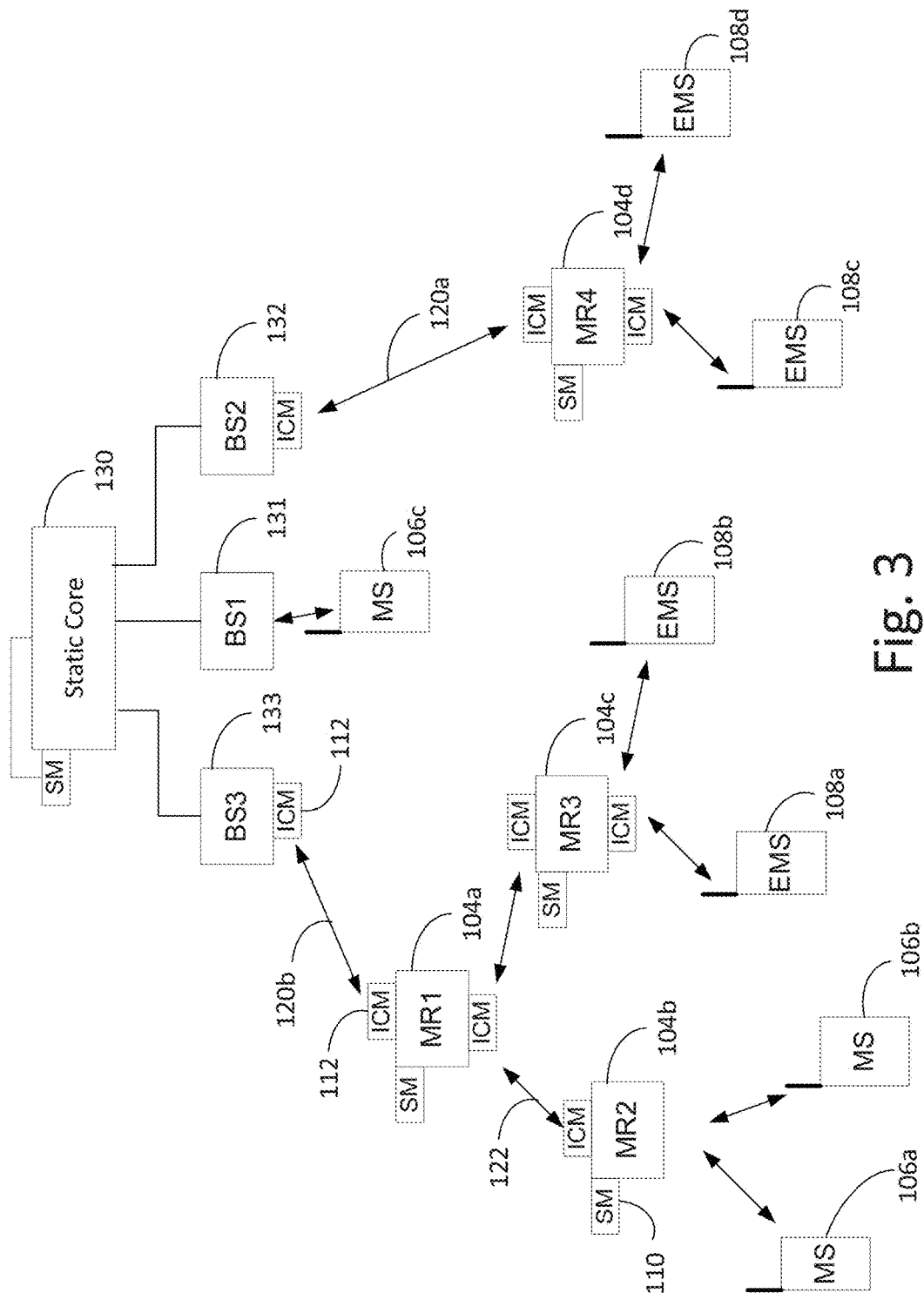
FIG. 3 illustrates schematically a generalized system architecture of the Moving Cellular Communication System that is connected to a stationary cellular communication system part, in accordance with certain embodiments of the invention.

FIG. 3 illustrates the capability of a non-stationary (moving) cellular system (that includes MR1 104*a*, MR2 104*b* and MR3 104*c*) to dynamically connect to a stationary cellular system when a component of the non-stationary network has moved to the coverage area of the stationary system. In the presented figure (for example), MR1 104*a* has moved to the coverage area of static BS3 133, then a link between MR1 104*a* and BS3 133 is formed 120*b* and any MS (or EMS) that is served by the non-stationary cellular system (i.e. every MS or EMS that is served by MR1 104*a*, MR2 104*b* and MR3 104*c*) can communicate with any MS or EMS that is served by the stationary cellular system (e.g. MS 106*c*) or any MS or EMS that is served by any other non-stationary cellular system that is connected to the stationary cellular system (e.g. MS 108*c* or 108*d*).

Figure 4:
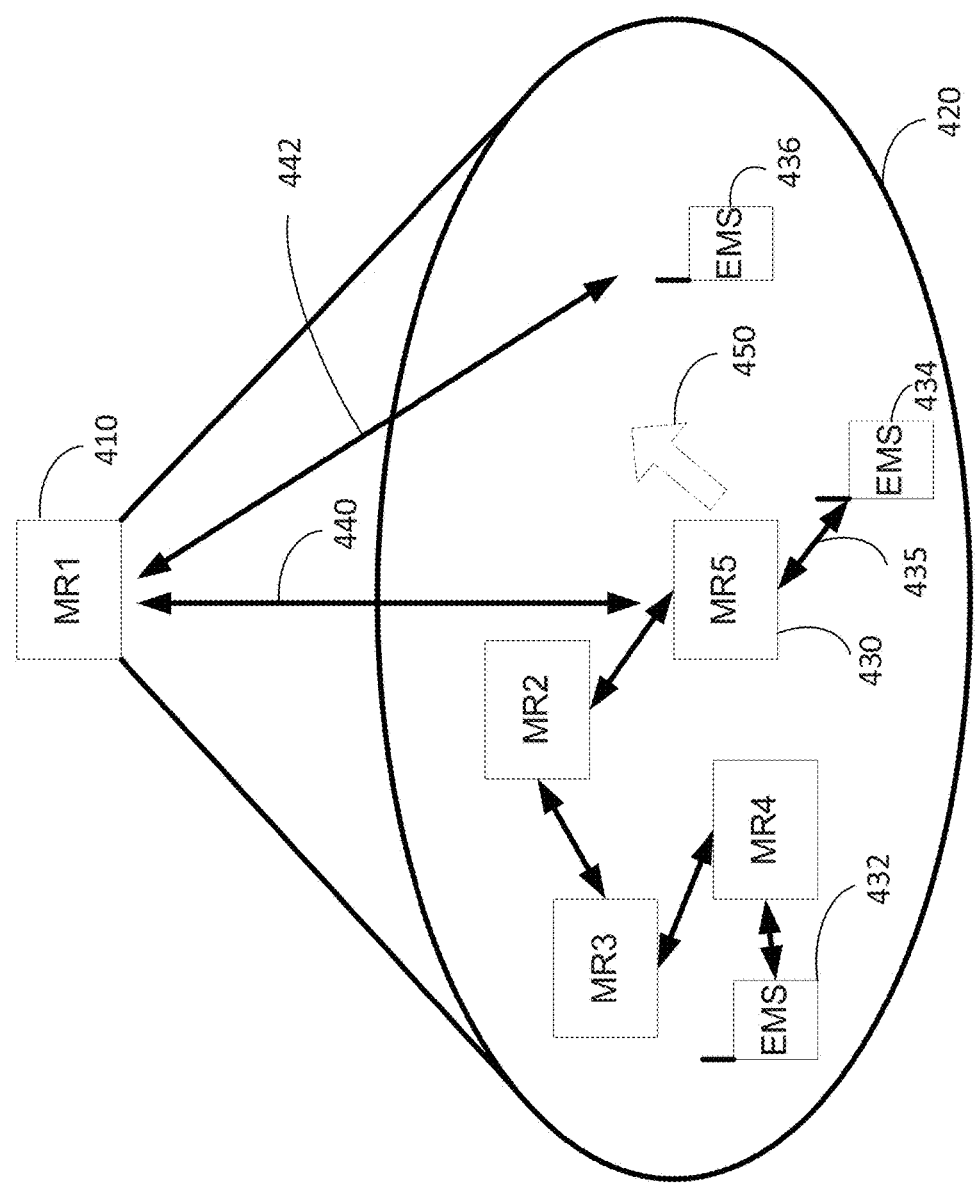
FIG. 4 illustrates schematically a scenario where a need to change the location of Moving Relay is apparent, in accordance with certain embodiments of the invention.

FIG. 4 displays a scenario in which a moving cellular system consists of several MRs (MR1, MR2, MR3, MR4 and MR5) that serve EMSs, namely 434, 434 and 436. MRs are used here as an example and some of them or all of them can be EMRs as well. MR1, which is in this example has a wide coverage area 420 (i.e. MR1 410 is mounted on-board airborne platform) is connected to EMS 436 and is also connected to MR5 430. The link between MR1 410 and EMS 436 is of poor quality and therefore MR1 410 can not support high data rate applications such as broadband data or video. In case EMS 436 needs such a high data rate application, this need is noted by MR1 410, and the moving cellular system calculates a new position of the MRs so that it can better serve the overall needs of all the MSs/EMSs (e.g. according to priorities or as proportionally fair or as per any appropriate criteria). In this particular case, the system calculated and determined that to better serve the overall requirement MR5 430 needs to move in the direction 450 of EMS 436. The MRs and/or EMRs can be mounted on-board manned vehicles/platforms (such as but not limited to trucks, vans, helicopter, boat) in which the person located in the platform can position the platform at a required location in order to better serve the MSs and/or eMSs. In addition, the MRs and/or EMRs can be located on-board un-manned vehicles/platforms (such as Unmanned-Air-Vehicle, ground robot, un-manned sea-borne vessel, etc.) in which it can be positioned (autonomously or remote controlled by an operator) at a desired location.

Figure 5:
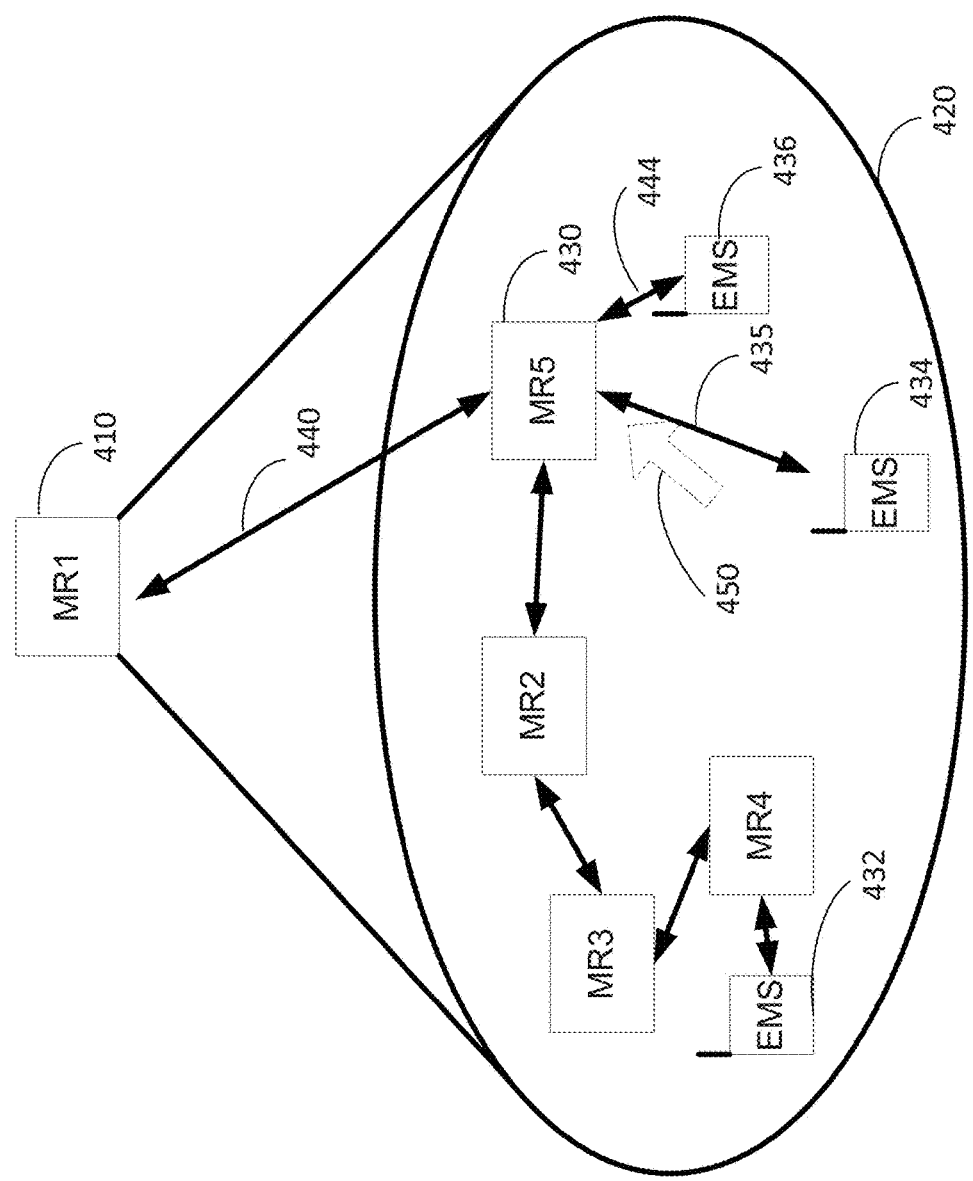
FIG. 5 illustrates schematically an adaptable network coverage scenario, in accordance with certain other embodiments of the invention.

FIG. 5 illustrates schematically an adaptable network coverage scenario, in accordance with certain other embodiments of the invention; It can be seen that MR5 430 has now moved 450 to the new calculated location that was indicated in FIG. 4. Now EMS 436 is connected directly 444 to MR5 430 and because of it is being closer it can support EMS 436 with higher data rate applications. It can be seen, for example, that MR5 430 keeps the connection 435 with its existing served EMS 434.

Figure 6:
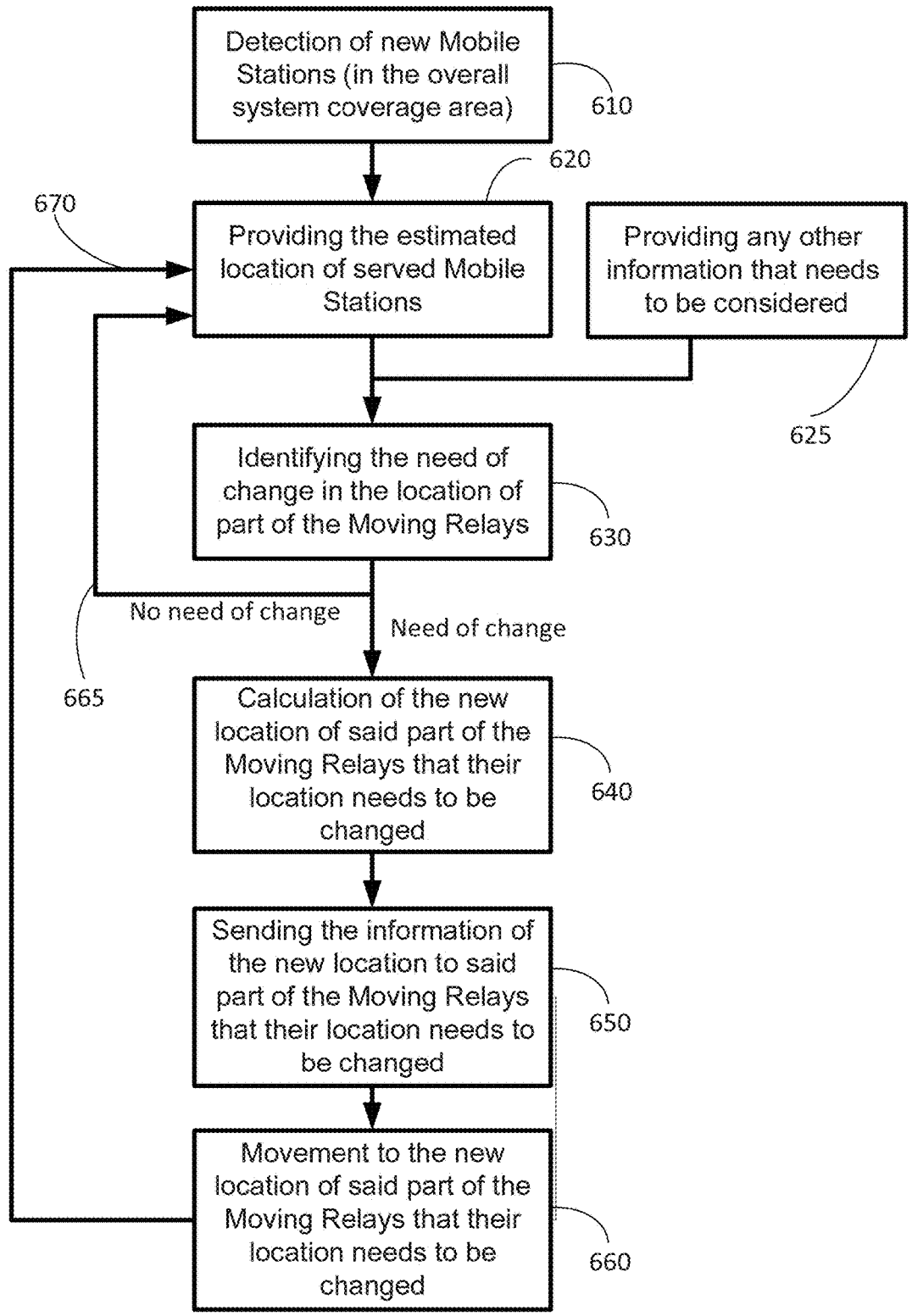
FIG. 6 illustrates schematically a flow chart of a sequence of operations for obtaining centralistic adaptable network coverage, in accordance with certain embodiments of the invention.

FIG. 6 illustrates schematically a flow chart of a sequence of operations for obtaining centralistic adaptable network coverage, in accordance with certain embodiments of the invention. The first step 610, which is optional, is a detection of new MSs/EMSs that can be served by any of the MRs of the moving cellular communication system. The detection can be implemented for example by airborne MR that has a wide coverage area and that can detect further MSs/EMSs that are not covered or served by ground MRs. Optionally, an additional list of MSs and/or EMS can be entered manually or remotely. After adding the new detected or manually/remotely entered MSs/EMSs to the list of the MSs/EMSs that needs to be served by the system, the next step 620 is to provide to the non-stationary (moving) cellular system the estimated location of one or more of the MSs/EMSs that it needs to serve. In accordance with certain embodiments, step 625 is implemented in which, in addition to location, any other information that needs to be considered can be provided to the non-stationary (moving) cellular system, such as but not limited to the required application for the MSs/EMSs, physical constraints of moving to a specific direction, the quality of service (such as signal-to-noise ratio, bit-error-rate, block-error-rate), the MS characteristics (such as but not limited to antenna performance and type and maximal transmitted power). The estimated location can be obtained by the non-stationary cellular communication system (e.g. using the standard positioning capabilities of the cellular network as for example described in 3GPP releases) or by any external system that can provide the estimated location of the MSs/EMSs to the non-stationary cellular communication system. The location can for example be obtained by the GPS location of each MS/EMS typically supports and sent to the cellular system. An additional optional method for estimation of the location of MSs/EMSs is by adding the MRs/EMRs with means for estimation of location of MSs/EMSs, that can be for example an antenna that can support estimation of direction-of-arrival of MSs/EMSs and by sharing that information estimated location for part of the MSs/EMSs can be obtained. Any other known method for locating MSs/EMSs can be used by the system (such as differential-time-of-arrival—DTOA). The estimated location of part or all of the MSs/EMSs are sent to and stored in a central location. Such a central location can be in example seen in FIG. 1 as one of the rRM 118 in one of the a MR/EMR of the non-stationary cellular system. In this central location a test or computation is then executed to identify whether a change in the location of part or all the MRs/EMRs is required. If no change is required, as a result of this test 665, then the flow returns to the previous step 620. Otherwise, the next step is the calculation of the new location of the part (or all) the MRs that their location needs to be changed 640. The identification step 630 and calculation step 640 can be based on several criteria such as weighted sum of parameters such as the location of the MSs/EMSs, and any abovementioned information or parameter that is provided to the system (i.e. quality of service). Alternatively a tracking method can be used for tracking a single of a group of MSs/EMSs by a single or group of MRs/EMRs. The new calculated location of each MR that its location is needs to be changed is then sent to it 650. Sending the new location can be made using the non-stationary cellular system communication links or by any other external means (e.g. other wireless system, WiFi, satellite communications, other cellular system, microwave link, etc.). Then each of the MRs/EMRs that needs to change their location move to the new location 660. Thereafter the flow returns 670 to step 620.

Figure 7:
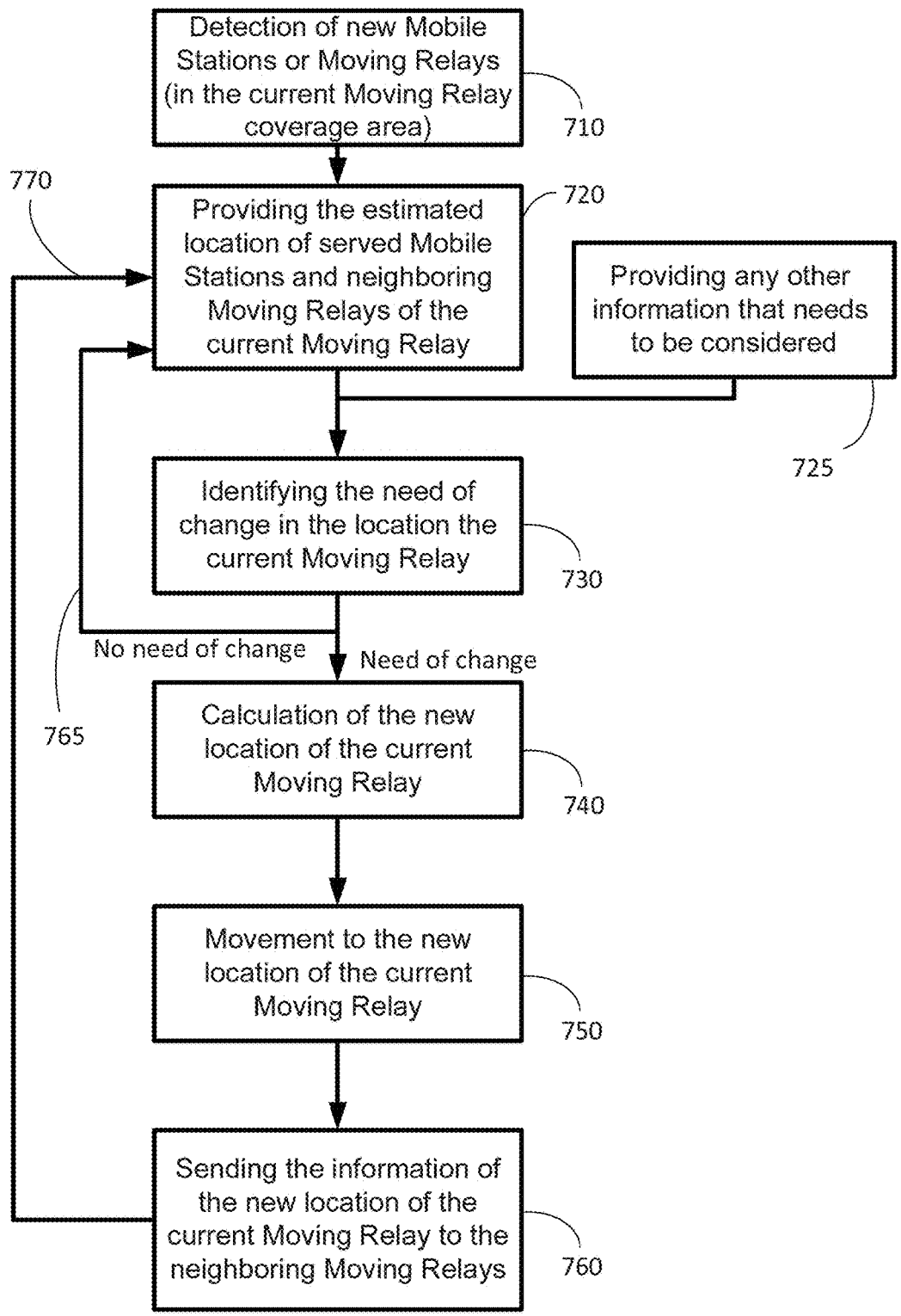
FIG. 7 illustrates schematically a flow chart of a sequence of operations for obtaining distributed adaptable network coverage, in accordance with certain other embodiments of the invention.

FIG. 7 illustrates schematically a flow chart of a sequence of operations for obtaining distributed adaptable network coverage, in accordance with certain other embodiments of the invention. In this distributed manner each of the MRs/EMRs decides by its own the need to change its location. This flow chart describes an example of an algorithm that is executed by the MR/EMR. Hereafter the discussed specific MR/EMR that is referred will be called "current MR". The first step (optional) is a detection of new MSs/EMSs by the current MR 710. The next step is then to provide to the current MR the location of the MSs/EMSs that it needs to serve (and any additional information with regard to them that can be accounted for in the following steps) and the location of neighboring MRs/EMRs 720. The ways to provide the location have already been described in the description of FIG. 6. In accordance with certain embodiments, step 725 is implemented in which, in addition to location, any other information that is to be considered can be provided to the current non-stationary (moving) relay. Description of such information is given in the description of FIG. 6. In addition, optionally, the MRs/EMRs share their relevant information (including location information) with other MRs/EMRs. The location information (and additional information) is then tested and computed to identify the need of change in the current MR 730. If no need of change is the result 765, then the flow returns to the previous step 720. Otherwise the flow proceeds to the calculation step 740. In the calculation step 740 the new location of the MR/EMR is calculated (methods for calculations are described in FIG. 6). Then the MR/EMR moves to the new location 750. Thereafter, optionally, the new location of the MR is sent to the neighboring MRs 760. And finally the flow returns 770 to step 720.

In accordance with an aspect of the presently disclosed subject matter, there is provided a moving cellular communication system comprising at least one moving relay including at least one base station functionality and at least one mobile station functionality and a relay resource manager, all co-located, at least one stand-alone moving relay from among the moving relays further including a simulated stationary network that includes a simulated IP connectivity gateway operative to communicate with a simulated mobility management entity; the simulated stationary network simulates the operation of a stationary network; the stand-alone moving relay being a root of a sub tree that includes at least one moving relay and at least one mobile station, and is configured to utilizing its mobile station functionality, base station functionality and radio manager for operating in at least the following modes of operations:

(i) normal mode of operation wherein the stand-alone moving relay communicating with other relays in the network and with the stationary network;
  (ii) in response to an stand-alone event, operating in an stand-alone mode of operation, including
    a. communicating to a designated mobile station in the sub-tree each message that was received from a moving relay or a mobile station in the sub-tree and the message having an IP address of the designated mobile station; or
    b. communicating to the simulated stationary network each message that was received from a moving relay or a mobile station in the sub-tree and having an IP address that does not match any mobile station in the sub-tree.

In accordance with an embodiment of the presently disclosed subject matter, there is further provided a system, wherein the simulated stationary network further including simulated at least one application having respective application IP address, and wherein the operating in an stand-alone mode of operation, further including communicating to a designated application in the simulated network each message that was received from a moving relay or a mobile station in the sub-tree and the message having an IP address of the designated application.

In accordance with an embodiment of the presently disclosed subject matter, there is further provided a system, wherein the simulated stationary network further includes a simulated router.

In accordance with an embodiment of the presently disclosed subject matter, there is further provided a system, wherein the stand-alone event includes detecting disconnection of the stand-alone relay from the stationary network.

In accordance with an embodiment of the presently disclosed subject matter, there is further provided a system, further comprising, in response to undo stand-alone event, the stand-alone relay is configured to revert to operate in accordance with the normal mode.

In order to address the challenges described above, we need to define architecture and methods to cope with the need to transfer control and traffic information between each one of the mobile stations, through any hierarchical cellular topology to any destination that can be a mobile station in the same network or any destination outside the network. In the rest of the description we will present the solution for the 4G 3GPP cellular network, also known as LTE (Long Term Evolution), but the same principles can be applied to any hierarchical cellular network (i.e. based on 3G standard).

In existing LTE cellular network each mobile station is identified by its own IP, a packet that is addressed to a mobile station is being routed through P\S-GW using a GTP tunnel to the base station and from there to the mobile station.

In a hierarchical cellular network as described in the specified applications the packet is being routed through several tunnels and being routed to the destination mobile station.

The proposed invention is a mobile relay which is also capable of providing IP-based services in case of a stand-alone event. An example of a stand-alone event might be a disconnection from the core network.

Normally, in LTE cellular networks when a mobile station connects to the core network, it gets a default bearer and an IP assignment. When a mobile station requests a new service it gets an assignment of another, dedicated bearer. Each assigned bearer has specified QoS rules such as maximal delay, packet loss rate, GBR and queuing priority. The bearers are mapped to tunnels where every user packet that flows in the cellular network from the mobile station to the core and from the core to the mobile station is mapped into a unique tunnel being scheduled by using the tunnels bearer assignment. In order to reflect bearer requests of the mobile station, the mobile station functionality of the moving relay gets bearer assignments that are corresponded to the ones of its connected mobile station.

Figure 8:
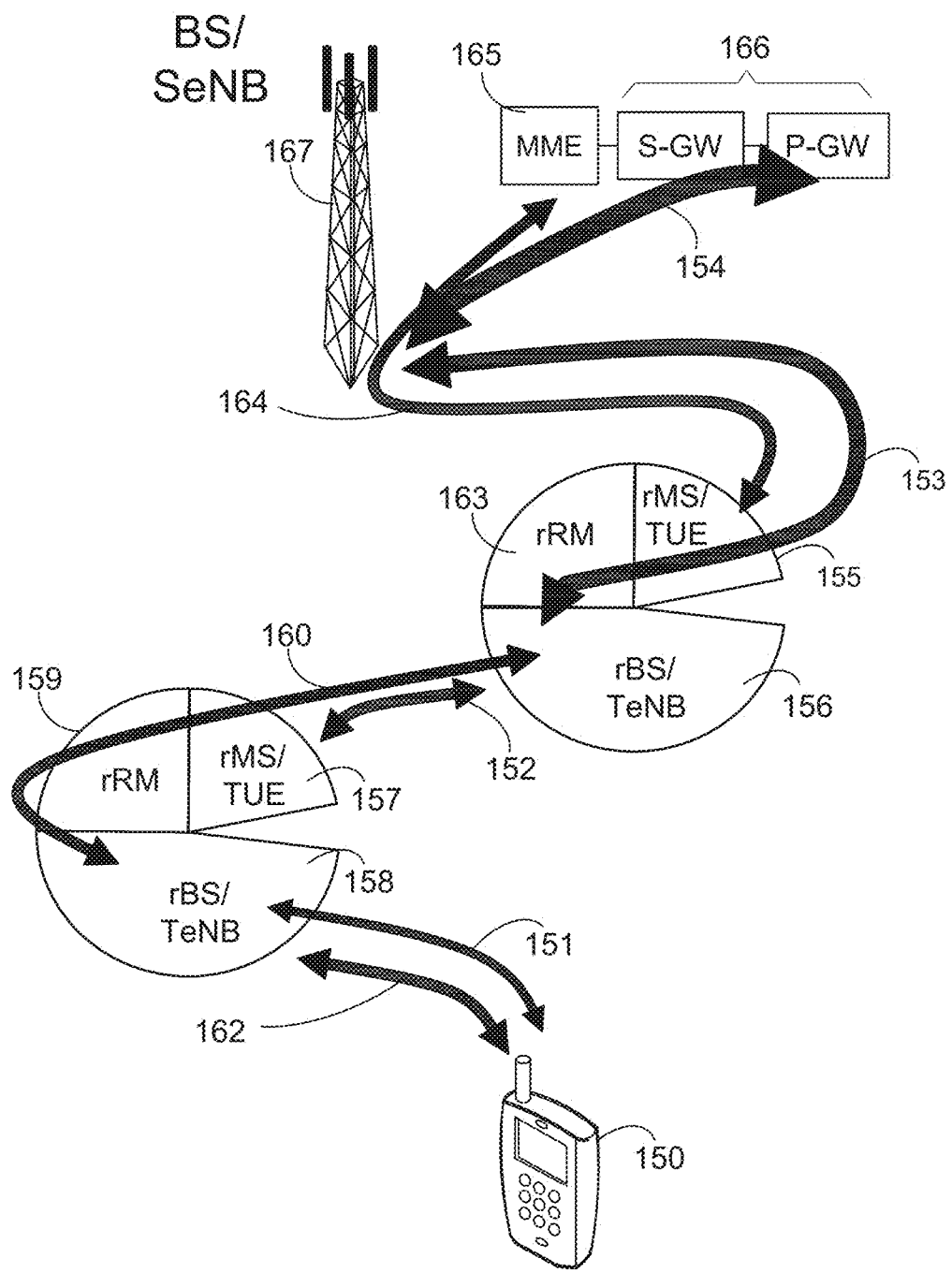
FIG. 8 is an example of communication in normal mode in a multi-hop scenario and a single mobile station.

FIG. 8 is another example of normal mode of operation for multi-hop relaying scenario, where the two relays' base station functionalities [158,156] and the static base station [167] comprises a tunnel termination point; the corresponding tunnels are [160,153,154]. These tunnels typically transfer in the upstream direction mobile station [150] data that is sent to the relay's base station functionality [158] over the air-interface [162] to the core IP connectivity gateway/s. In the downstream these tunnels typically transfer data from the IP Connectivity gateway/s [166] to the relay's base station functionality [158] to be sent over the air interface [162] to the mobile station [150].

Figure 9A:
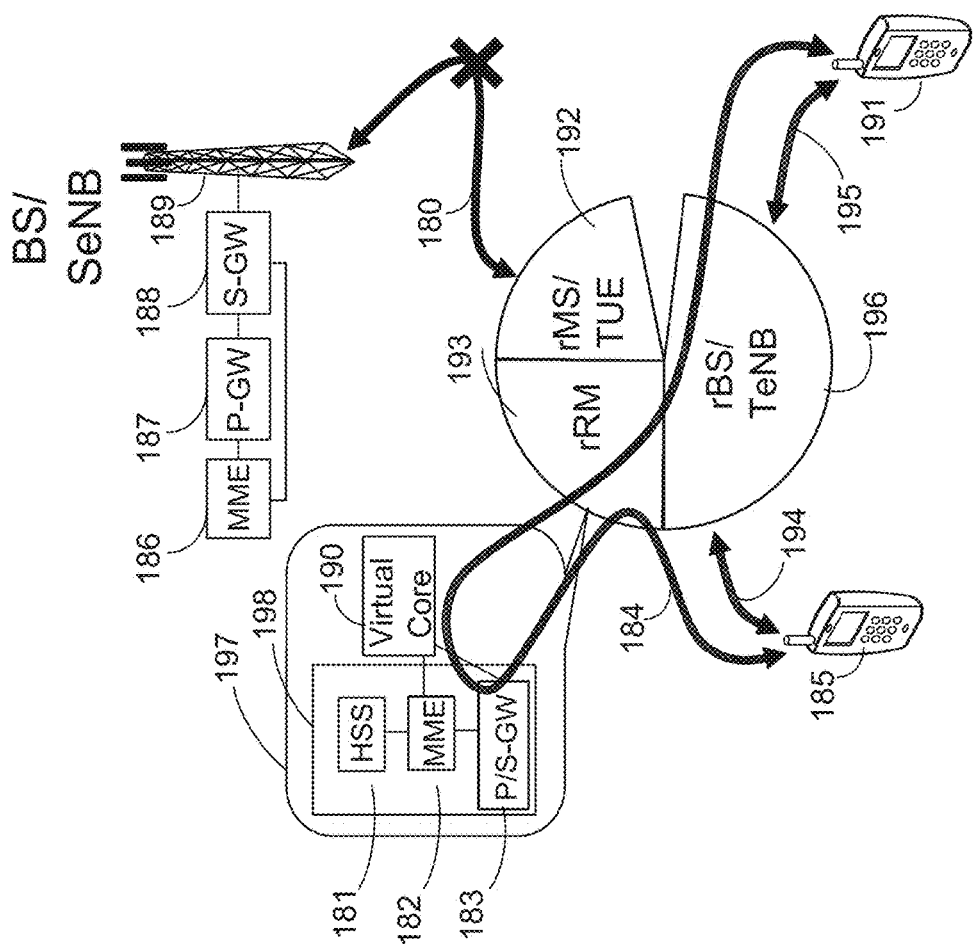
FIG. 9a is an example of two mobile stations communication in an emergency mode.

FIG. 9a is an example of an emergency moving relay operating in emergency mode. The backhauling radio link [180] between the moving relay and the static base station [189] was disconnected; as a result the local relay radio manager (rRM) [193] addresses communication data being designated to mobile stations [185,191] that are under the local relay radio manager's sub tree using the simulated network e.g. Stand Alone Subsystem as described herein.

The tunnel that was originally to be terminated at the core network P/S-GW [187,188] (the tunnel that was connecting the static network core P/S-GW [187],[188] to the relay's base station functionality (rBS) [196], whose tunnel header destination address was P/S-GW [187,188]) is terminated in the local simulated P/S-GW [183], e.g. its tunnel header destination address is set to P/S-GW[183]).

Figure 9B:
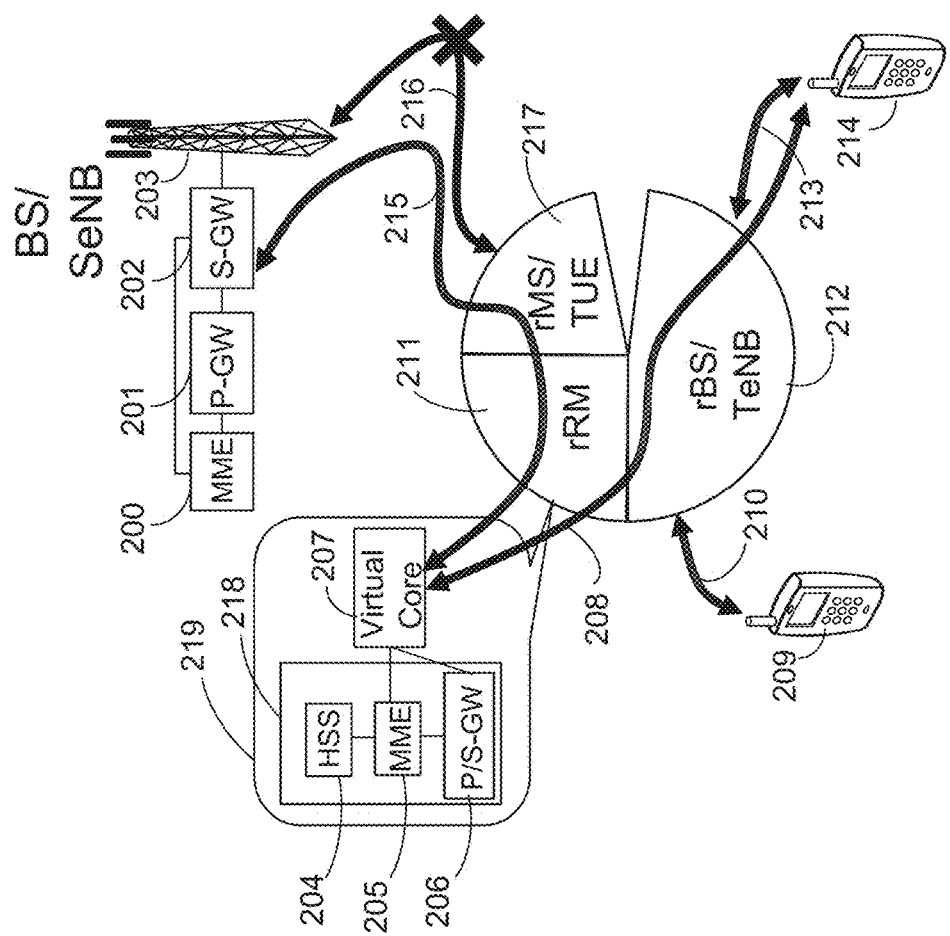
FIG. 9b is an example of two mobile stations communication in an after undo emergency mode.
Figure 9C:
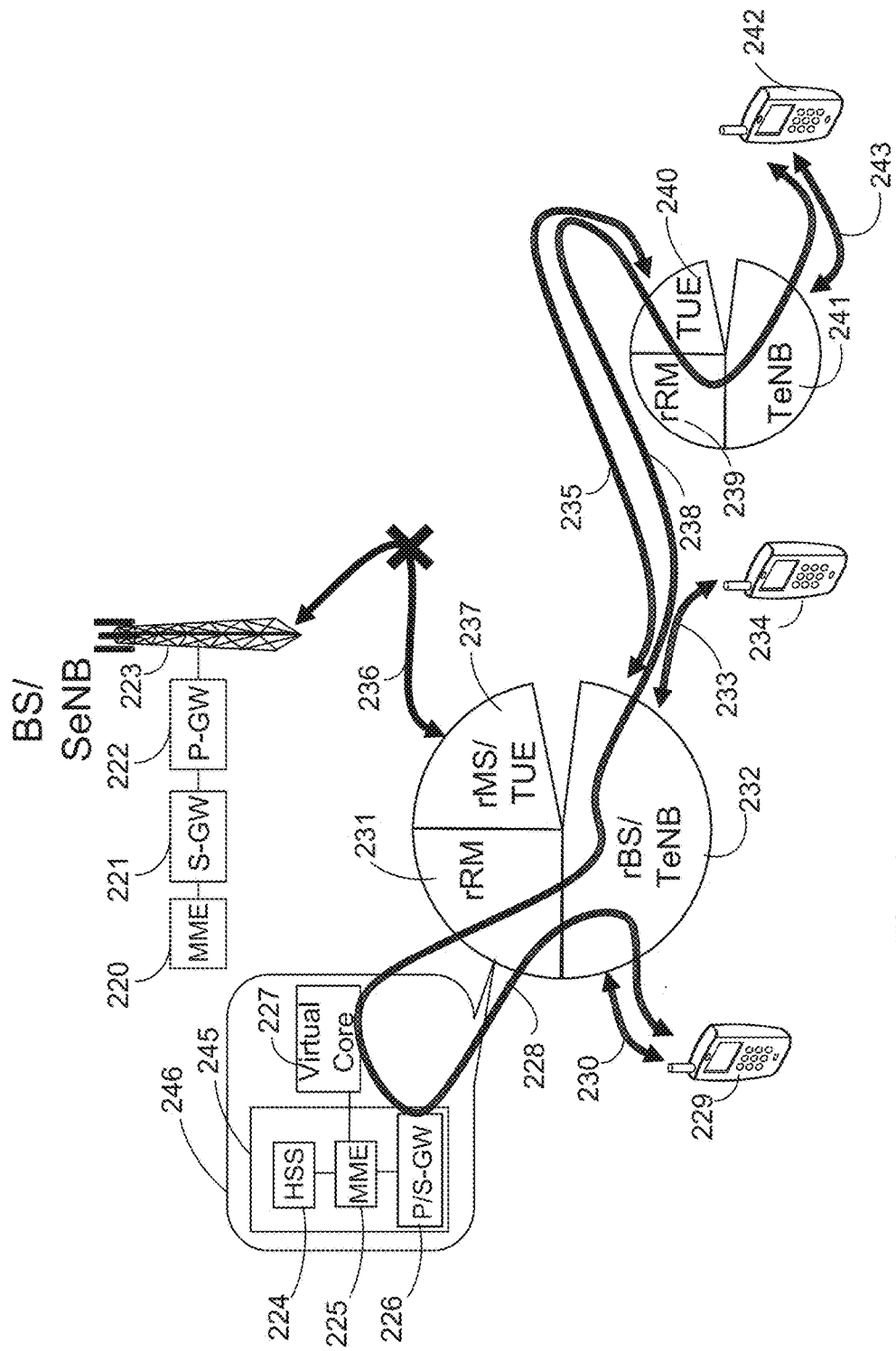
FIG. 9c is an example of three mobile stations communicating in an emergency mode in a multi-hop scenario.

FIG. 9c is an example of communication in an emergency mode in a multi-hop scenario. The tunnel that was originally to be terminated at the core network P/S-GW [187,188] is now terminated by the root of the disconnected moving relay sub-tree that simulates the core network [224,225,226]. The second moving relay [239,240,241] and the anchored mobile stations [239,234,242] are unaware of the emergency event.

FIG. 9b is an example of an undo emergency event. This undo emergency event may for example be initiated as a result of a connection being made between the relay mobile station functionality and one of: a static base station connected to static core or other relay base station functionality having active simulated core (for example, a mobile station functionality is now able to connect to the stationary core). The disconnected radio link [216] is restored and the relay radio manager [211] relays communication data back to the core network [200,201,202].

On each relay node, the sibling nodes are stored e.g. in a local table in the Routing agent. Each mobile station [229, 234, 242] associates its data streams with a bearer. Each bearer is typically associated with a traffic filter template (TFT) that includes the bearer's source address, designated node address and an optional addition of source, destination port and protocol. Typically, each bearer is uniquely marked with a Tunnel ID (TID). In the example illustrated in FIG. 9c, mobile station [242] connects to mobile station [229] e.g. using a voice over IP (VoIP) application. On a hop by hop basis, each relay node inspects the bearer establishing procedure and is operative to store a sibling node and its associated TID. In case of a disconnection [236] from the core [200,201,202] the relay resource manager (rRM) [231] functionality in the relay which resides at the head of the tree (i.e. but not limited to the relay closest to the disconnected core) is operative to locally route communication between designated nodes that are in the disconnected nodes' cluster or optionally additionally to provide services to mobile station/s in its topology tree. So, in the illustrated example, mobile station [229, 234, 242] are camped to the disconnected nodes' cluster (group of relays that are inter-connected) of relay nodes [RN1,RN2]. The relay resource manager (rRM) [231] functionality of RN1 (RN=RELAY NODE=RELAY) which resides at the top of the tree routes the communication between mobile station [229] and mobile station [242]. Furthermore, because the communication is based on GPRS tunneling, the relay resource manager (rRM) [231] can alter each tunnel, so that it can enable to communicate with the source and the destination of the tunnel, e.g. by creating an alternative using a GTP-C standard [e.g. 3GPP TS 29.274] tunnel by sending a create packet data protocol (PDP) context, Create Bearer Request to its collocated core. When an undo emergency event is received, the relay resource manager (rRM) [231] can use the same mechanism. So, the relay resource manager (rRM) may be operative for creating an alternative using a GTP-C standard [e.g. 3GPP TS 29.274] tunnel by sending a create packet data protocol (PDP) context,) to alter the local (emergency-mode) tunnels to the original tunnels (normal-mode).

It is appreciated that in case of an emergency event the relay located at the root (head) of the topology tree (e.g. the relay which first caught the event or the node closest to the core) enables a local EPC core (simulated core network/Stand-alone subsystem) and functionally replaces the stationary or remote-simulated core [FIG. 9c, 220, 221,222]. All other relay nodes in the topology tree and their connected mobile stations are seamless to the disconnection (e.g. if no connection is to be established with any entity outside the topology tree). The disconnection may also be indicated by informing idle mode mobile stations (MSs) e.g. by changing a public land mobile network (PLMN) ID to another public land mobile network (PLMN) and broadcasting the ID to all Base station functionalities (TeNb) in the cluster. The public land mobile network (PLMN) may also indicate relevant information such as the ID of the head relay and the number relay in the cluster. It is appreciated that the term EPC refers to an all-IP mobile core network for LTE communication.

Figure 10:
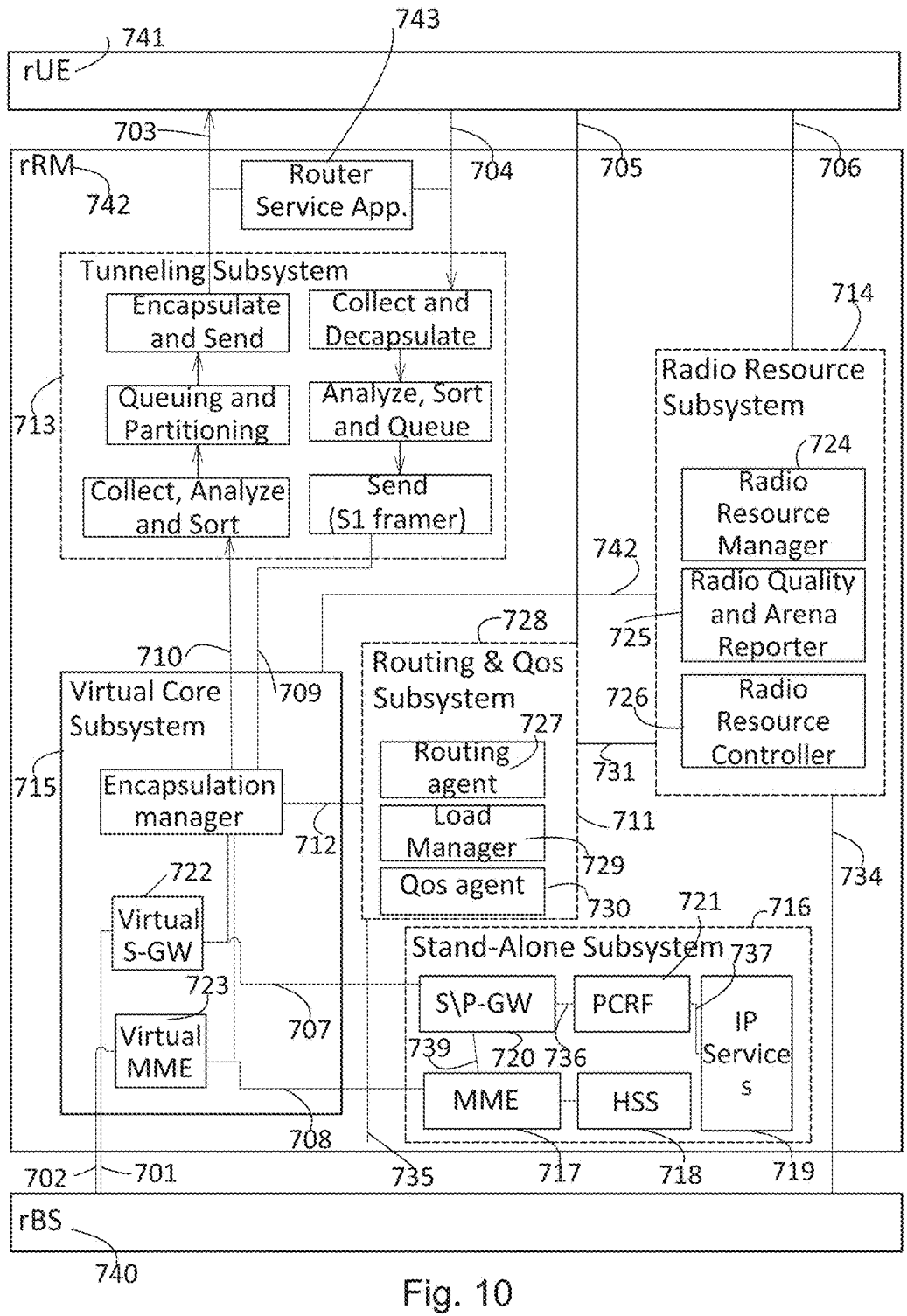
FIG. 10 is a simplified block diagram of an example architecture for the relay resource manager (rRM) of MR.
Figure 11:
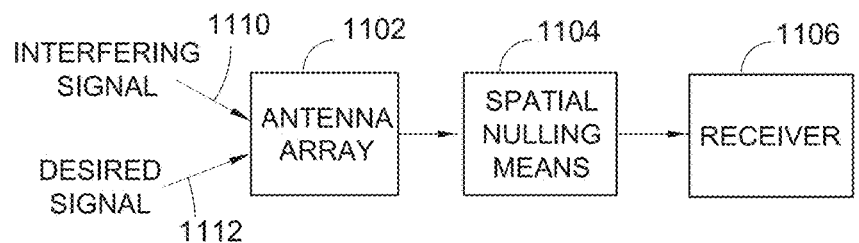
FIGS. 11, 12, 13a-13b, 14 and 21a are prior art illustrations useful in understanding the background of the present invention.

FIG. 10 is a simplified block diagram of an example architecture for the relay resource manager (rRM) of MR. The terms "stand-alone subsystem", "simulated stationary network", "core functionality", mini-core and simulated core are used herein interchangeably.

As shown, the relay resource manager comprises some or all of: a Tunneling subsystem [713], Radio Resource subsystem [714] Virtual core subsystem [715], internal router service application [743], Stand-Alone Subsystem [716] and Routing and QoS Subsystem [728], suitably coupled e.g. as shown.

The tunneling subsystem is operative for encapsulating and de-capsulating of user plane and control plane payloads over user plane bearers according to different priorities and sending the de-capsulated user plane and control plane payloads to entities in the core such as but not limited to any of: mobility management entity e.g. MME, gateways, and application servers. The tunneling subsystem typically interfaces [703, 704] with the mobile station functionality rUE [741] e.g. over a standard IP stack.

The Virtual core subsystem typically constitutes the gateway between the core (stationary) on the one hand, and various resource management subsystems and the base station functionality rBS [740'] on the other hand. The Virtual core subsystem may communicate with the base station functionality rBS [740'] or core (of the static network) e.g. using standard S1-MME [702,708b,709,710] and S1-U [701,707b,709,710] or proprietary management and control (M&C) over IP interface [701,707b,709,710] with the base station functionality rBS [740'] and remote core. The Virtual core subsystem may send all or any of the S1-MME, S1-U, M&C messages to the core optionally through the Tunneling Subsystem [713].

The Encapsulation manager function of the Virtual core subsystem [715] implements a Network event listener e.g. as illustrated in FIG. 6 at reference numeral 1304 and a Network event handler e.g. as illustrated in FIG. 6 at reference numeral 1305]. The handler may use deep packet inspection techniques in order to maintain suitable statistics (such as but not limited to any or all of: all active bearers including source and destination addresses, ports, and priorities) The handler may also raise events (for example in case of a disconnection from the core). The encapsulation manager is also operative for handling (send/receive) different messages that are sent/received [712] by the Routing and QoS Subsystem to/from the core being used, for example messages to create or delete a bearer.

In addition, the Encapsulation manager function of the Virtual core subsystem [715] may optionally include functionality for exchanging information between the relay resource manager rRM that the Virtual core subsystem resides within [742] and: (1) another relay resource manager located inside another relay, and/or (2) Relay/s Server located as part of the static network. The Virtual S-GW [722] and Virtual MME [723] may have corresponding standard S-GW and MME interfaces with the base station functionality rBS [740'] accordingly. If a remote core is used by the relay, the Virtual S-GW [722] and Virtual MME [723] may emulate these core functions as proxies so that the base station functionality rBS [740'] works smoothly and seamlessly despite remoteness of the core.

The Routing & QoS subsystem [728] may comprise some or all of a routing agent [727], Load manager [729] and QoS Agent [730']. Routing & QoS subsystem [728] communicates with the mobile station functionality (rMS) [741] e.g. using AT Commands or any suitable proprietary interface [705]. Routing & QoS subsystem [728] communicates with the base station functionality rBS e.g. using the M&C interface [735]. Using the M&C interface the Routing and QOS subsystem may command a change in various parameters in the base station functionality rBS [740'] such as PLMN, and/or may command the base station functionality rBS [740'] to initiate a handover mechanism of an attached mobile station. Using the mobile station functionality (rMS) [741] interface [705] the Routing and QoS subsystem [728] may receive radio measurements of served base stations or neighboring base stations, and may send fake radio measurements to the mobile station functionality (rMS) [741] that the mobile station functionality may send to its serving base station in order to intervene with the handover mechanism. Routing and QoS subsystem [728] may register to specific access point names (APN) and/or create additional bearers.

The Load manager [729] is operative for balancing traffic loads between different relays. Load manager [729] may perform actions such as but not limited to: indicating other relay resource manager elements such as but not limited to any or all of: Radio Resource Subsystem [714], Routing agent [727], QoS agent [730'] or Encapsulation manager (block of the Virtual Core Subsystem [715]) or mobile station functionality [741] or base station functionality rBS [740'] or mobility management entity MME of remote core (of the static network or) that which current site loaded. Load manager [729] may also command the routing agent to try to change topology in order to gain more bandwidth (at the backhauling link), or to request that additional bandwidth be assigned to the mobile station functionality (rMS) for the backhauling link from the mobility management entity MME of remote core.

The QOS agent [730'] is operative for creating bearers according to the current attached mobile stations and their bandwidth requests in case there is a need for a additional bearer due to the multi-hop mechanism.

The Radio Resource Subsystem [714] may comprise some or all of: Radio resource manager [724], Radio Quality and Arena Reporter [725'] and Radio Resource Controller [726]. The radio resource subsystem [714] is operative for reducing interference between: (1) relay's access links which may be sent and received by the base station functionality rBS [740']) and relay's backhauling links which may be sent and received by the rUE (rMS) [740]; (2) relay's access links and other relays' access links; and (3) relay backhauling links and other relays' backhauling links. The Radio resource controller [726] is operative for controlling different radio resources of the mobile station functionality rUE [741] and of base station functionality rBS [740'] e.g. some or all of: lower base station functionality transmission power, blanking particular base station functionality resource blocks/subframe/s, request for mobile station functionality uplink grant, changing center frequency, changing bandwidth.

The Radio Quality and Arena Reporter [725'] may be operative for gathering a radio measurement report indicating received power reports of the base station functionality rBS [740'] and base station functionality rBS's neighboring base stations from the connected mobile stations reporting to the base station functionality rBS [740'] and from the mobile station functionality rUE [741]. The radio measurement report may indicate one or more of: the mobile station functionality's serving base station's radio measurements; and/or radio measurements of mobile station functionality rUE [741]'s active set, e.g. list of neighboring base stations that mobile station functionality rUE [741] is operative to measure periodically. The Radio Resource Subsystem sends the measurement report through the interface to the Virtual Core subsystem [742], typically using the encapsulation manager, to radio resource subsystems of other relays' relay resource managers as a radio quality report. This radio quality report may be relevant for distributed radio resource management mechanisms and/or for decisions relevant to the routing agent.

The radio resource manager may receive radio quality reports from the radio resource manager's local Radio quality and arena reporter [725'] and from neighboring relays' Radio quality and arena reporters. The radio resource manager may compute the level of interference between the various stations, e.g. of relays and optionally of the static network. The radio resource manager may also provide radio resource configuration recommendations to its local radio resource controller [726] and/or to its neighboring relays' radio resource controller/s through interface [742] and using the encapsulation manager of the Virtual core subsystem [715].

The Radio resource manager [714] can optionally communicate in interface [706] e.g. using AT Commands or other proprietary protocol with the mobile station functionality rUE [741]. The Radio resource manager can further optionally communicate in interface [734] e.g. using M&C protocol with the base station functionality rBS [740]. The Radio resource manager can further optionally communicate with other relays' radio resource subsystems through interface [742] e.g. using the virtual core subsystem [715] Encapsulation manager.

The Stand-alone subsystem [716], also termed herein the Simulated core network, is responsible for core packet switching & handling and for IP services. The Stand-alone subsystem [716] may serve as a local core also termed herein a mini-core since it may have less functionality than the static core does. Stand-alone subsystem [716] may also be operative for giving local services, such as local storage of maps and/or being a voice call server or/and SIP server and/or video server and/or gaming server, e.g. through the IP services function [719], in the event of handoff e.g. when the relay disconnects from the remote core (either static or part of other relay rRM) from the serving core. If such handoff occurs, the virtual core subsystem [715] may recreate all relevant PDP contexts and bearers according to the information stored on the virtual core subsystem's [715] encapsulation manager and switch the packet data to the local stand-alone subsystem [716]. When the local Stand-alone subsystem is used as an active core, and there is a need in a given situation, to re-use the remote core instead of the local core, a reverse process performed.

Tunneling Subsystem [713], Routing & QoS Subsystem [728] and Radio Resource Subsystem [714] are optional subsystems of the relay resource manager (rRM). All or any subset of these subsystems can be added to the relay resource manager (rRM) as per need.

The router service application [743] can be added to the relay to enable it to do extended tunnels for multi-hop encapsulation. According to certain embodiments, one mobile station is connected to a core functionality of the relay resource manager and another mobile station is connected to the core element of the static network, and there is a link between these cores.

If a mobile station that is attached to a stationary base station or even a standard phone communicates with a mobile station that is attached to the core through several relays e.g. as depicted in FIG. 8, the mobile station attached to a stationary base station may connect e.g. using conventional interfaces to the P-GW and from there by hopping through [164] the static base station SeNB [167], the first relay node TUE[155], relay resource manager rRM [163] and base station functionality TeNB [156]. The second relay's mobile station functionality TUE [157], the relay resource manager rRM [159] and the base station functionality TeNB [158] are typically able to communicate with the mobile station [150].

Any suitable IP connectivity gateway may be used herein, not being limited to what is specifically shown and described herein, such as but not limited to one of: an IP-connectivity GW in LTE; one of a P-Gateway, S-Gateway, P/S-Gateway and Access-Gateway; in 3G GGSN, an SGSN, in WiMAX, an ASN-Gateway in CSN;

Any suitable mobility management entity may be used herein, not being limited to what is specifically shown and described herein, such as but not limited to one of: an LTE MME, a 3G RNC, and a WiMAX ASN.

The router service application [743] can be implemented as a software application, or alternatively as a hardware router.

Note that the invention is not bound to the specified aspects and embodiments and accordingly any combination thereof is also applicable.

The invention likewise is directed to various counterpart method embodiments and aspects, mutatis mutandis.

The invention likewise is directed to a computer storage medium for storing computer code portions for performing the method stages.

Figure 15A:
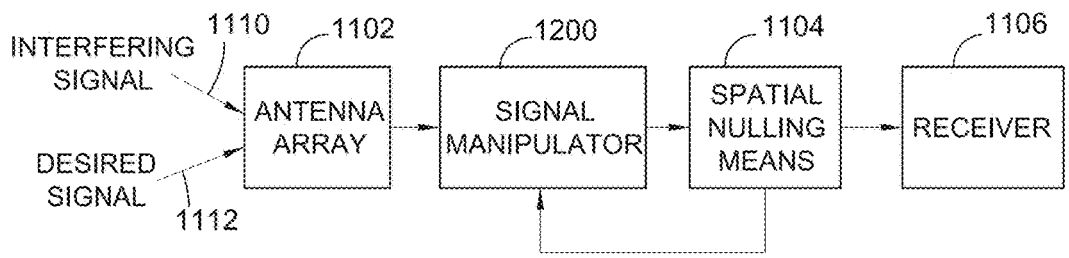

FIG. 15a illustrates a method for spatial nulling according to one embodiment of the present invention. The desired signal 1112 is a wideband multicarrier signal. The interfering signals (one or more) 1110 may be of the same characteristics as the desired signal, i.e. multicarrier signals of the same bandwidth and frequencies. Alternatively, interfering signals 1110 may be of some other type, or have some other bandwidth, or even be some narrowband interferers. The desired signal 1112 and the interfering signals 1110 are received by the antenna array 1102. The outputs of the antenna array 1102 are fed into a signal manipulator 1200, which preferably performs some frequency dependent or frequency selective actions on the signals. Some examples of this signal manipulator are described hereinafter with reference to FIG. 16a and FIG. 18a. After the signals from the antennas are processed by the signal manipulator 1200, they are fed into the spatial nulling means 1104.

Figure 12:
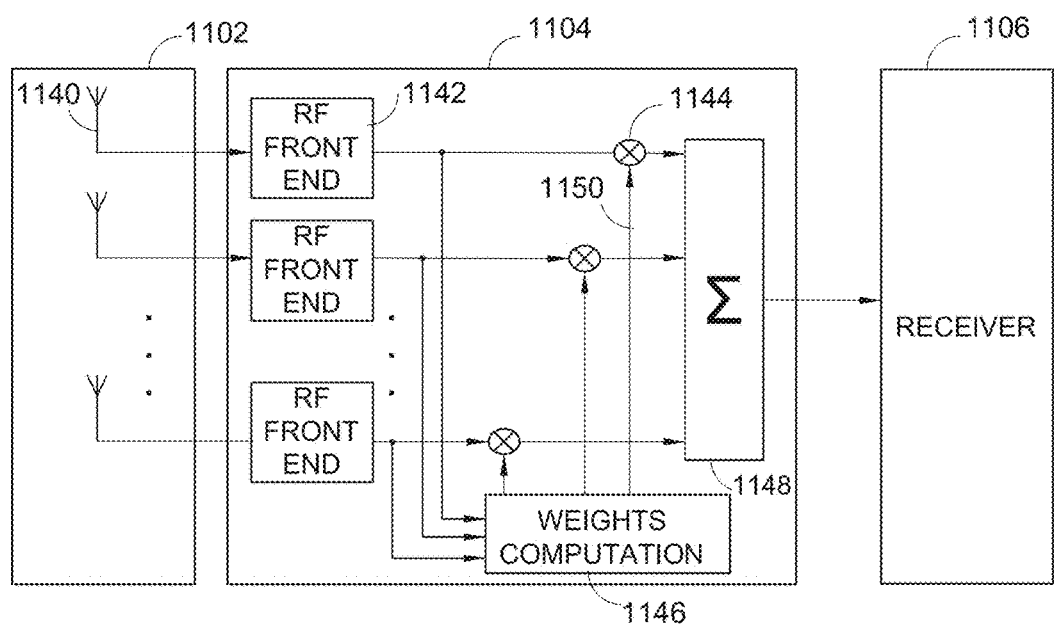

An example for the spatial nulling means may be the one described above with reference to FIG. 12, i.e. comprised of a weights computation, a multiplier, and a combiner. Spatial nulling is well known in the art, e.g. as described in the above-referenced publication by Hafeth Hourani, Chris Loadman et al. The purpose of the signal manipulator 1200 is to concentrate the transmitted data information onto carriers within the desired bandwidth portion, which are the frequencies where the spatial nulling means 1104 performs better, i.e. the null depth is deep enough. This is done by applying to the signals, a frequency dependent or frequency selective method for rendering undesired frequencies useless for the receiver, thereby to cause the communication system to refrain from allocating data transmissions over these frequencies.

In the case of a scheduler residing at the local side, the receiver 1106 may detect the useless frequencies, and report them to the local scheduler, which in turn does not allocate data transmissions over these frequencies, and sends its allocation table to the remote transmitter (this is done using the opposite communication link). In the case of a scheduler residing at the remote side, the receiver may detect the useless frequencies, and report them to the remote scheduler using the opposite communication link. The remote scheduler then does not allocate data transmissions over these useless frequencies.

An advantage of certain embodiments described above is that no modifications need be made to the receiver 1106, and no special interfaces are needed to or from the receiver 1106, thus allowing this method to be applied to a standard receiver.

Another advantage is that the useless frequencies are effectively blocked and masked to the receiver 1106. This is very effective when the interferer signal is not stationary (for example, the interferer signal goes on and off, as likely happens in communication signals). Without blocking these frequencies, the scheduler would have allocated data transmissions onto these frequencies while the interferer signal was "off", and the communication system would have failed once the interferer signal went "on".

In the embodiment described above, the signal manipulator 1200 is configured according to the frequency response that came out of the spatial nulling means 1104. Optionally, the configuration is effected in a set-up stage, in which first the spatial nulling means 1104 is tuned and determines its spatial response including the spatial angles in which nulling is made, and then the signal manipulator 1200 is configured accordingly. Alternatively, the tuning of the spatial nulling means 1104 followed by the configuration of the signal manipulator 1200 are performed periodically during normal operation. For example, in the case of a WiMAX or LTE it may be performed every frame, or every several frames. According to a further alternative, the tuning of the spatial nulling means 1104 followed by the configuration of the signal manipulator 1200 is performed per request from the system controller due to some criterion such as but not limited to detection of change in interferers.

Figure 13A:
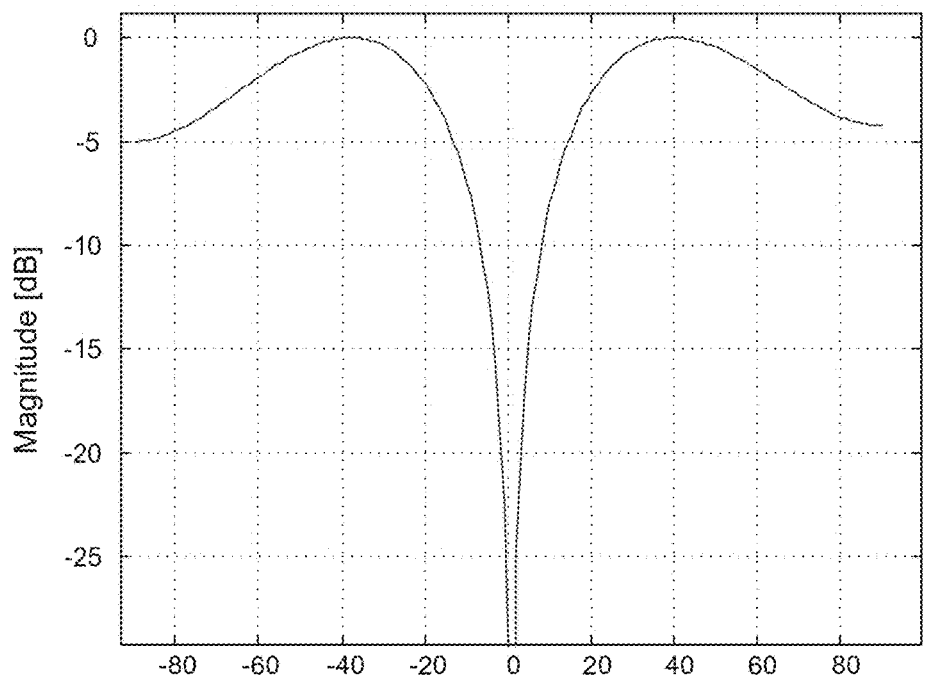
Figure 13B:
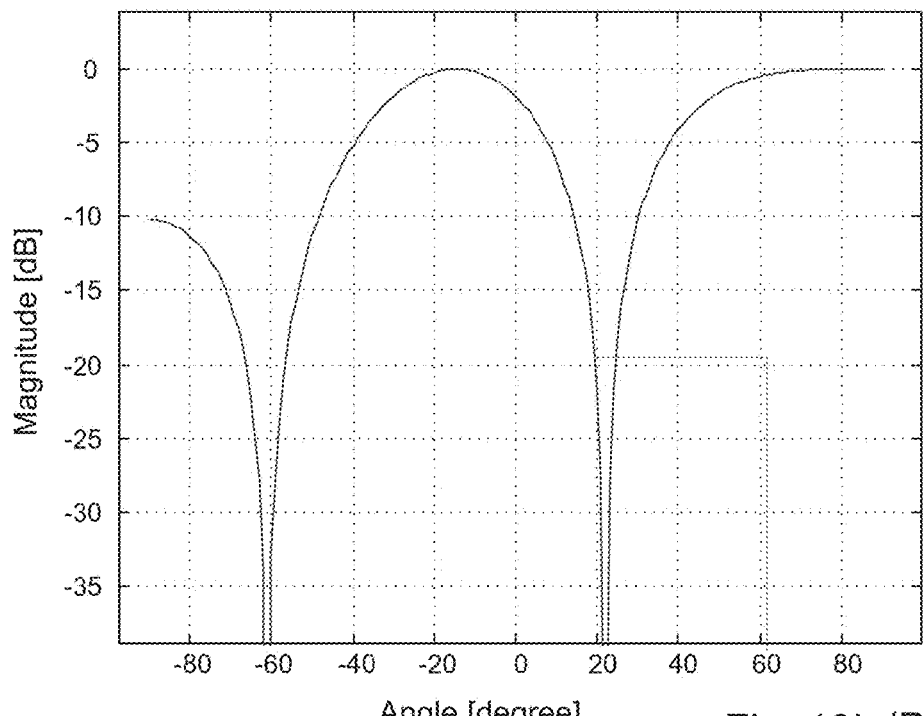

Optionally, configuration is effected by passing the computed weights of the spatial nulling means 1104 to the signal manipulator 1200, which computes the frequency response and the nulling capabilities as a function of frequency, at the desired spatial angle of the null. According to a further alternative, the angle of the desired null is also passed from the spatial nulling means 1104 to the signal manipulator 1200, directing the signal manipulator 1200 on which spatial direction to compute the frequency response. For example, the weights of the spatial nulling means 1104 may be tuned to effect a spatial response as in FIG. 13a, causing a null at the spatial angle of 0 degrees. In this example, the frequency response at this spatial angle is computed by signal manipulator 1200 to be the frequency response 1160 shown in FIG.

14. Then, signal manipulator 1200 considers this frequency response in light of the nulling requirements of the communication system, e.g. the required Signal to Interferer Ratio (SIR) in order for the communication system to operate properly, and determines the subset of frequency bands in which the spatial nulling is effective. Then, signal manipulator 1200 applies to the signals a frequency dependant or frequency selective method for rendering undesired frequencies useless for the receiver, thereby to cause the communication system to refrain from allocating data transmissions over these frequencies, or to otherwise prefer to concentrate the data transmissions over the frequencies where the spatial nulling is effective. Examples of suitable frequency dependent schemes are described below with reference to FIG. 16*a* and FIG. 18*a*.

Alternatively, some other measures or data is passed from the spatial nulling means 1104 to the signal manipulator 1200, to enable it to determine the frequency dependent method. For example, the frequency response at the null direction may optionally be computed in the spatial nulling means 1104, and passed to the signal manipulator 1200. In another example, spatial nulling means 1104 may compute the frequency response and also determine the subset of frequency bands in which the spatial nulling is effective, and pass the frequency values of this subset.

The embodiment described hereinabove with reference to FIG. 15*a* may be implemented in RF, IF or Baseband.

Figure 15B:
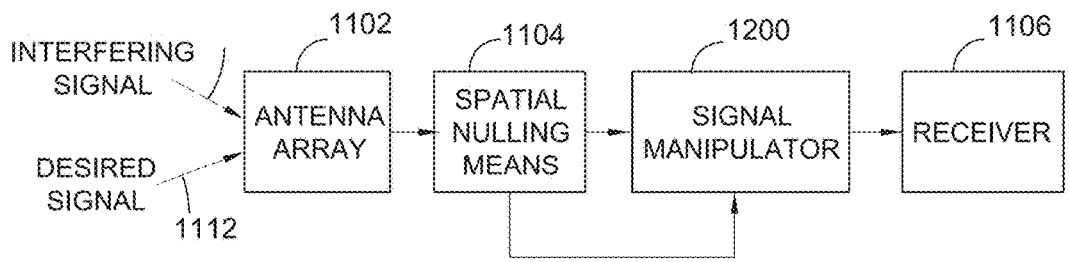

FIG. 15*b* illustrates a system for spatial nulling according to another embodiment of the present invention. This embodiment is similar to that of FIG. 15*a* except that the signals from the antenna array 1102 are first fed into spatial nulling means 1104, and its output is then fed into the signal manipulator 1200. The advantage of the embodiment of FIG. 15*b* over the embodiment of FIG. 15*a*, for certain applications, is that signal manipulator 1200 applies its frequency dependent function to only one signal coming out of the spatial nulling means 1104, whereas in FIG. 15*a* signal manipulator 1200 applies its frequency dependent function to each of the signals coming out of the antenna array. The embodiment described hereinabove with reference to FIG. 15*b* may be implemented either in RF, IF or Baseband.

Examples for frequency dependent methods to be used in accordance with the embodiment of FIG. 15*b* are described below with reference to FIG. 16*b* and FIG. 18*b*.

Figure 16A:
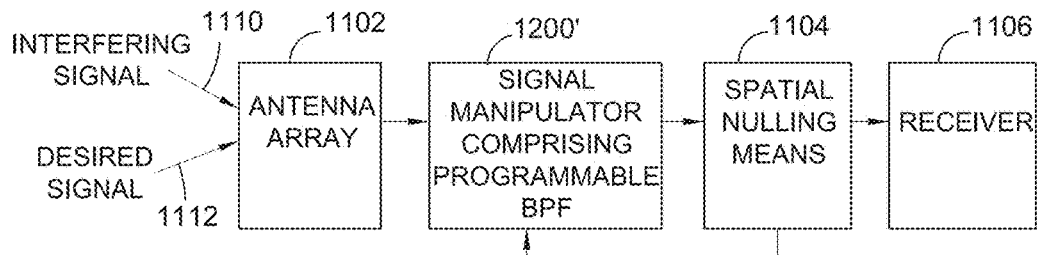

FIG. 16*a* illustrates an example of a first embodiment of the system described in FIG. 15*a*. In this embodiment, the signal manipulator 1200 of FIG. 15*a* comprises a programmable BPF (Band-Pass-Filter), referenced 1200' in FIG. 16*a*. More preferably, programmable BPF 1200' comprises a multi-band BPF. Typically, signal manipulator 1200' comprises such a BPF for each of its input signals, i.e. for each of the antennas in antenna array 1102. The spatial nulling means 1104 passes the designed weights, or other suitable data, to the programmable BPF 1200', as described above with reference to FIG. 15*a*. The programmable BPF 1200' implements a method which dynamically designs the appropriate filter coefficients including passing desired frequencies for which the nulling is good enough, and stopping the frequencies where the nulling is not good enough. Filter coefficients design may proceed in accordance with any suitable known method for designing a digital filter given a desired passband and a desired stopband. The passband is selected to include the frequencies for which the nulling is good enough, based on some predefined criterion of goodness. This criterion may be, for example, the required Signal to Interferer Ratio (SIR) at the receiver 1106 input, in order for the communication system to operate properly. This method effectively blocks the receiver from using the frequencies where the nulling is not good enough according to the predefined criterion, and the scheduler does not allocate any data transmissions there, or otherwise prefers to concentrate the data transmissions over the frequencies where the nulling is good enough. The BPF typically implements the frequency dependent system described hereinabove with reference to FIG. 15*a*.

Figure 16B:
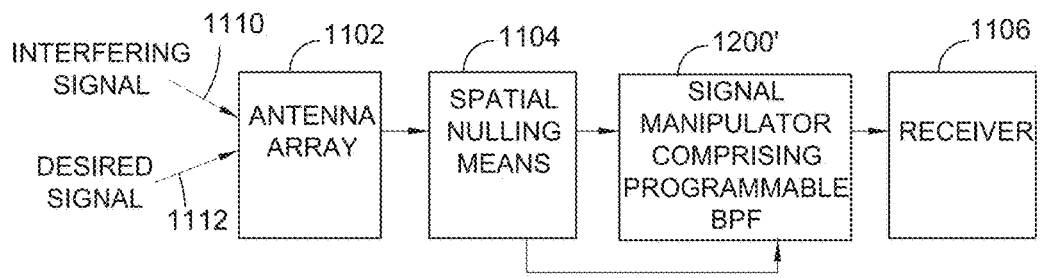

FIG. 16*b* illustrates an example implementation of the system of FIG. 15*b*. In this embodiment, the signal manipulator 1200 of FIG. 15*b* comprises a programmable BPF (Band-Pass-Filter), referenced 1200' in FIG. 16*b*. More preferably, programmable BPF 1200' comprises a multi-band BPF. The description of the filter coefficients design and the frequency passband and stopband design may be the same as described above with reference to FIG. 16*a*. The difference from the embodiment of FIG. 16*a* is that only one signal is coming out of the spatial nulling means 1104, thus only one BPF is implemented in signal manipulator 1200', as described above with reference to FIG. 15*b*.

Figure 14:
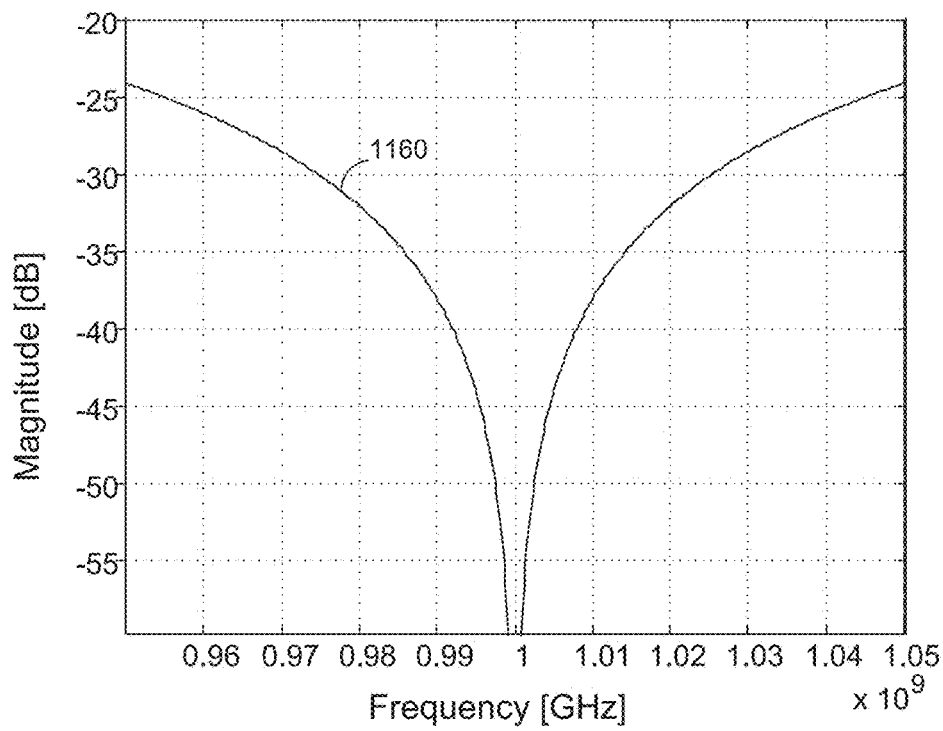
Figure 17:
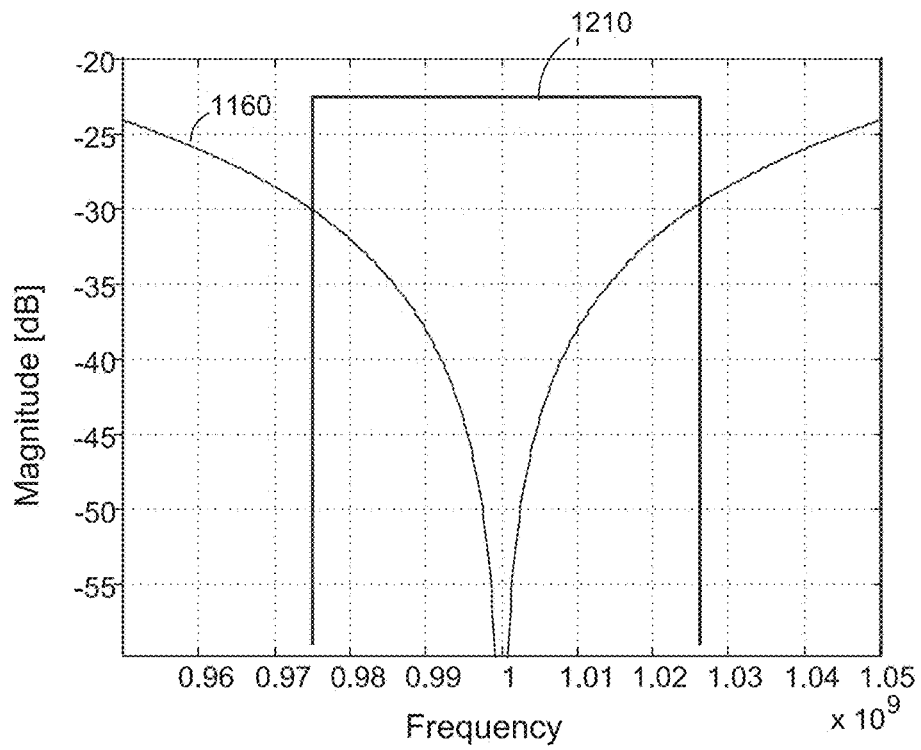
FIGS. 17, 21b and 21c are graphs useful in understanding certain embodiments of the present invention.

FIG. 17 illustrates an example of the frequency response of the BPF of FIG. 16*a* or FIG. 16*b*. The frequency response 1160 of the combined signal is plotted, as described above with reference to FIG. 14. The frequency response 1160 is shown at the desired null spatial direction. The programmable BPF 1200' is configured to implement the frequency response 1210, causing the useable frequencies to pass to the receiver, while stopping the useless frequencies. More preferably, frequency response 1210 may be a multi-band BPF response.

Figure 18A:
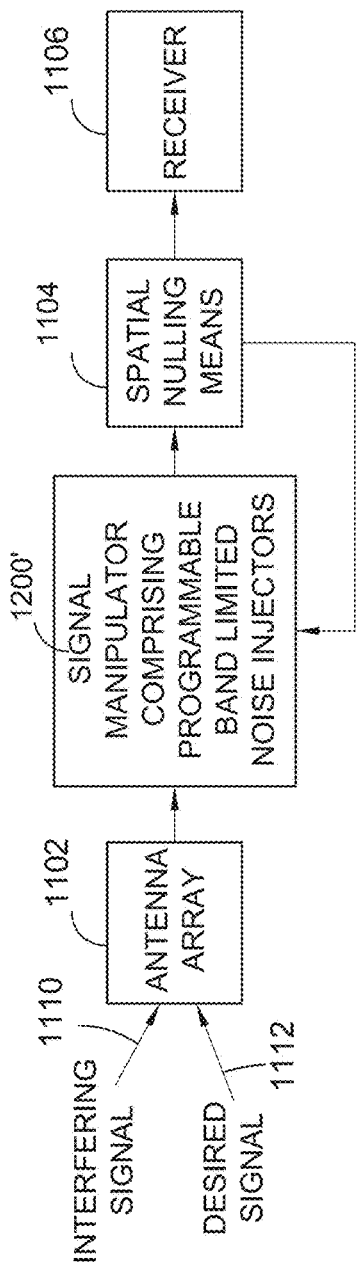

FIG. 18*a* illustrates another example implementation of the system of FIG. 15*a*. In this embodiment, the signal manipulator 1200 of FIG. 15*a* comprises programmable band limited noise injectors, referenced 1200" in FIG. 18*a*. More preferably, programmable band limited noise injectors 1200" each include multi-band noise injectors. Typically, signal manipulator 1200" comprises such a noise injector for each of its input signals, i.e. for each of the antennas in antenna array 1102. The spatial nulling means 1104 passes the designed weights, or some other data, to the programmable band limited noise injectors 1200", as described above with reference to FIG. 15*a*. Programmable band limited noise injectors 1200" implement a method which dynamically generates multi-band band limited noise signals, and adds the noise signals to its input signals that came from the antenna array 1102, correspondingly. The generated noise may be a band limited White Gaussian Noise (WGN) or it may be of another statistical type. Typically, the spectral power density of the noise signals is dynamically configured to be higher than the spectral power density of the received signals from the antenna array. The programmable band limited noise injectors 200" determines the frequency bands of the generated noise based on some predefined criteria. Such criteria may be, for example, the required Signal to Interferer Ratio (SIR) at the receiver 1106 input, in order for the communication system to operate properly. This method effectively blocks the receiver from using the frequencies where the nulling is not good enough according to predefined criteria, and the scheduler does not allocate any data transmissions there, or otherwise prefers to concentrate the data transmissions over the frequencies where the nulling is good enough. The noise injectors may implement the frequency dependent system described hereinabove with reference to FIG. 15*a*.

Figure 18B:
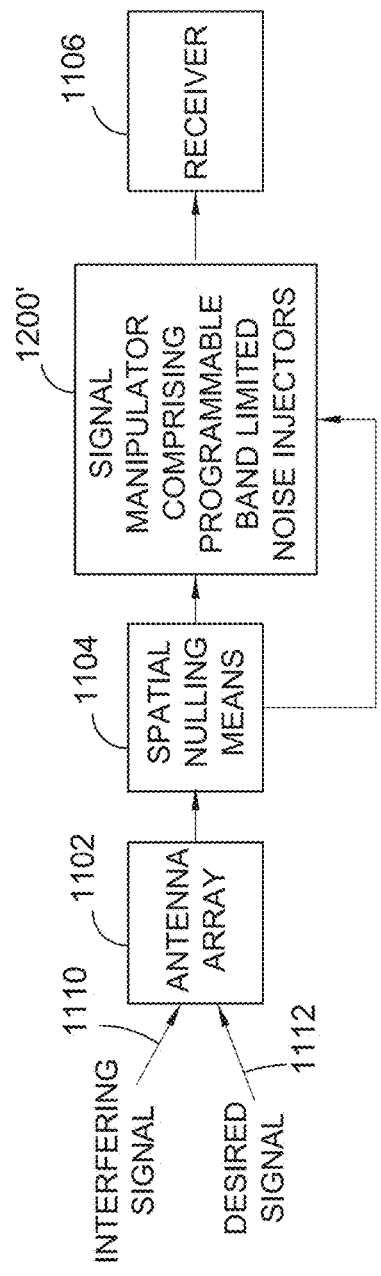

FIG. 18*b* illustrates an example of a second embodiment of the method described in FIG. 15*b*. In this embodiment, the signal manipulator 1200 of FIG. 15*b* comprises programmable band limited noise injectors, referenced 1200''' in FIG. 18*b*. More preferably, programmable band limited noise injectors 1200''' comprises multi-band noise injectors. The description of the noise injectors design and generation is the same as described above with reference to FIG. 18*a*. The difference from the embodiment of FIG. 18*a* is that only one signal emerges from the spatial nulling means 1104, thus only one noise injector is implemented in signal manipulator 1200''', as described above with reference to FIG. 15*b*.

Figure 19A:
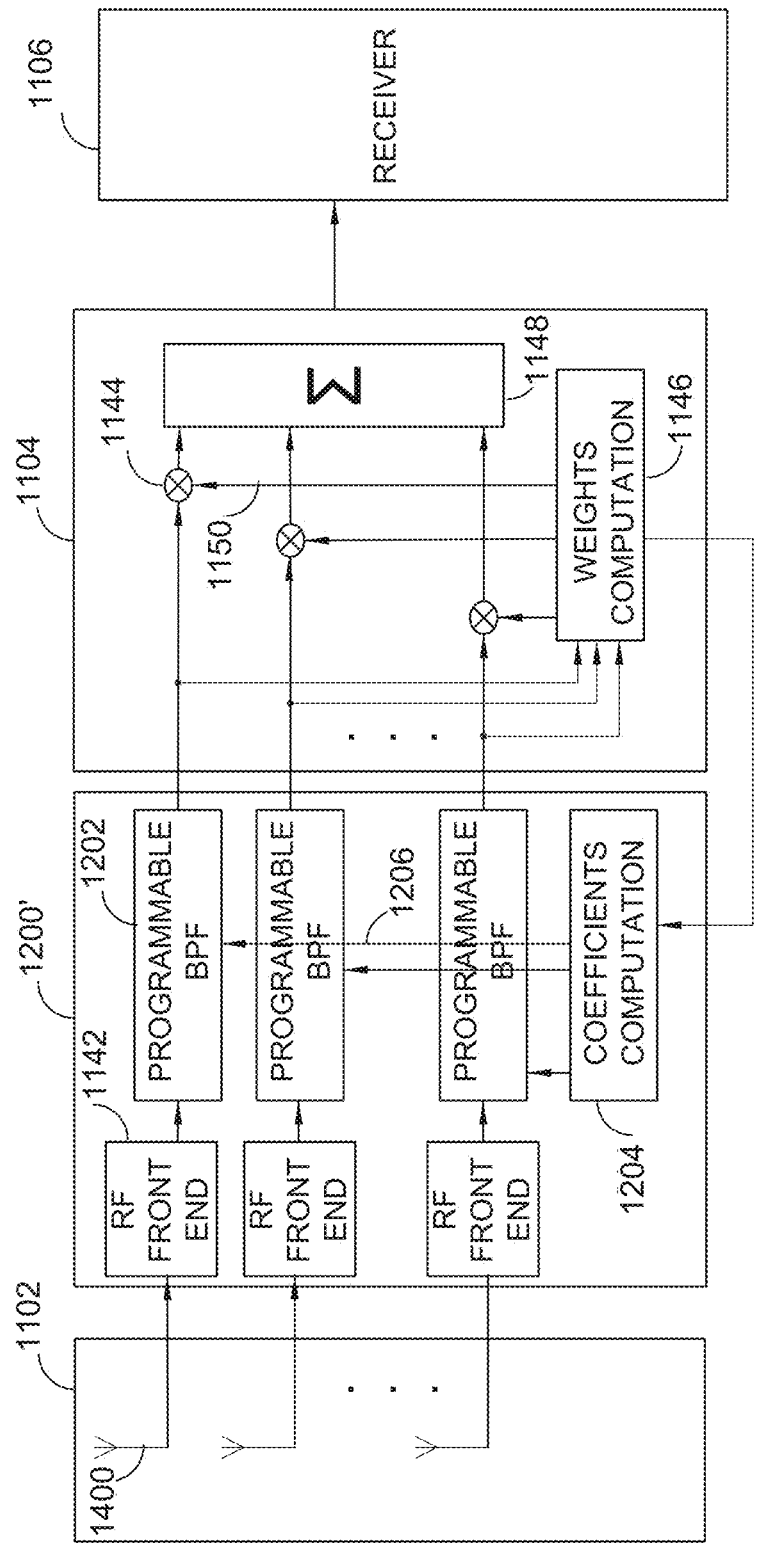

FIG. 19*a* illustrates a further embodiment of FIG. 16*a*. In this embodiment, spatial nulling means 1104 comprises a weighted antenna summation, as described hereinabove with reference to FIG. 12. The programmable BPF 1200' comprises an array of programmable Band Pass Filters 1202, an array of RF front end 1142, and a coefficient computation block 204. Each of the received signals from the antennas in antenna array 1102 is fed into an RF front end 1142, and then into a corresponding programmable BPF 1202, which filters the signal. BPF 1202 may optionally be a multi-band BPF. The outputs from the BPFs are fed into the spatial nulling means 1104. The programmable BPF 1202 is configured by coefficient computation unit 1204, which computes coefficients 1206, and passes the coefficients 1206 to the programmable BPF 1202. The coefficient computation unit 1204 determines the coefficients 1206 based on configuration from weights computation unit 1146 and on predefined criteria, as described hereinabove with reference to FIGS. 15*a* and 16*a*. The embodiment described above may be implemented, mutatis mutandis, either in RF, IF or Baseband.

Figure 19B:
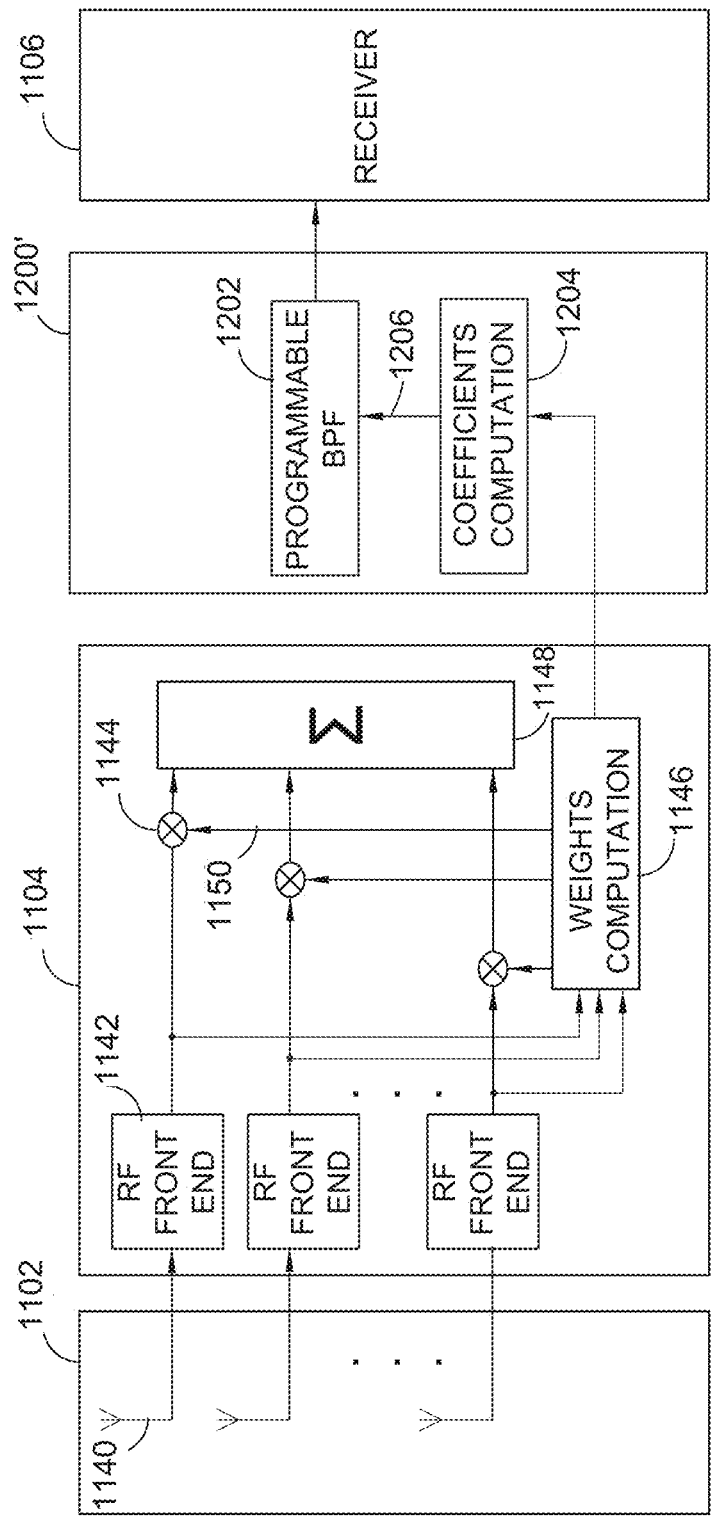

FIG. 19*b* illustrates a further embodiment of FIG. 16*b*. In this embodiment, spatial nulling means 1104 comprises a weighted antenna summation, as described hereinabove with reference to FIG. 12. The programmable BPF 1200' comprises a programmable Band Pass Filter 1202 and a coefficient computation 1204. BPF 1202 may optionally be a multi-band BPF. Each of the received signals from the antennas in antenna array 1102 is fed into an RF front end 1142, and then is fed into the weighted antenna summation within spatial nulling means 1104. The output from the spatial nulling means 1104 is fed into the programmable BPF 1202, which is configured by coefficient computation unit 1204. Coefficient computation unit 1204 computes coefficients 1206 and passes them to the programmable BPF 1202. The coefficient computation unit 1204 determines the coefficients 1206 based on configuration from weights computation unit 1146 and on predefined criteria, as described hereinabove with reference to FIG. 15*b* and FIG. 16*b*. The embodiment described above may be implemented, mutatis mutandis, either in RF, IF or Baseband.

FIG. 19*c* illustrates a further embodiment of FIG. 18*a*. In this embodiment, spatial nulling means 1104 comprises a weighted antenna summation, as described hereinabove with reference to FIG. 12. The band limited noise injectors 1200'' comprises an array of programmable band limited noise injectors 1282, an array of RF front end 1142, and noise parameters computation 1284. Noise injector 1282 may be a multi-band noise injector. Each of the received signals from the antennas in antenna array 1102 is fed into an RF front end 1142, and then into its corresponding programmable band limited noise injector 1282, which adds band limited noise to the signals. The outputs from the noise injectors are fed into the spatial nulling means 1104. The programmable band limited noise injectors 1282 are configured by noise parameter computation unit 1284, which computes noise parameters 1286, and passes them to the programmable band limited noise injectors 1282. Noise parameters 1286 may comprise, for example, the frequency bands of the generated noise and its power. The noise parameter computation unit 1284 determines the noise parameters 1286 based on configuration from weights computation unit 1146 and on predefined criteria, as described hereinabove with reference to FIG. 15*a* and FIG. 18*a*. The embodiment described above may be implemented, mutatis mutandis, either in RF, IF or Baseband.

Figure 19D:
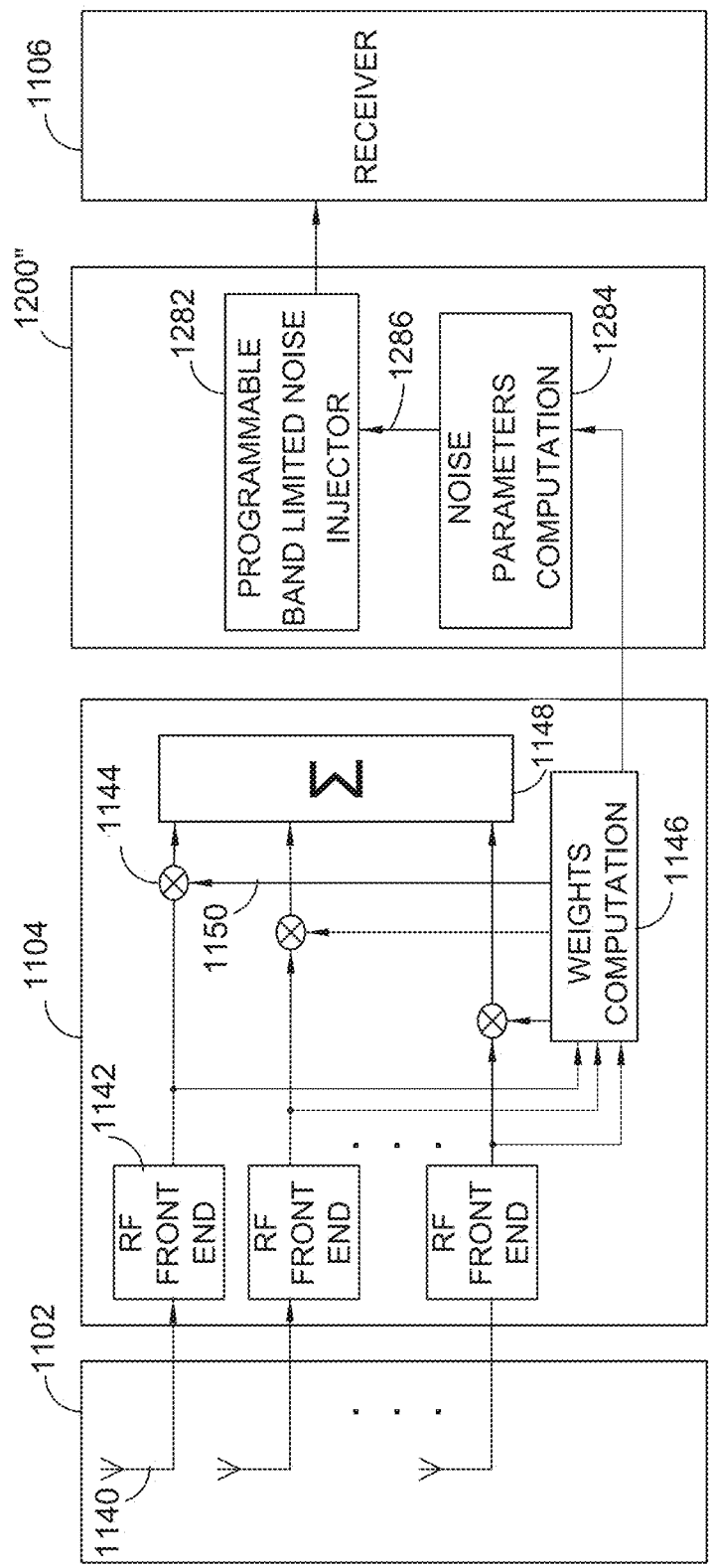

FIG. 19*d* illustrates another possible implementation of FIG. 18*b*. In this embodiment, spatial nulling means 1104 comprises a weighted antenna summation, as described hereinabove with reference to FIG. 12. The programmable band limited noise injectors 1200'' comprise a programmable band limited noise injector 1282 and a noise parameter computation unit 1284. Noise injector 1282 may optionally be a multi-band noise injector. Each of the received signals from the antennas in antenna array 1102 is fed into an RF front end 1142, and then is fed into the weighted antenna summation within spatial nulling means 1104. The output from the spatial nulling means 1104 is fed into the programmable band limited noise injector 1282, which is configured by noise parameter computation unit 1284. Noise parameter computation unit 1284 computes noise parameters 1286 and passes them to the programmable band limited noise injector 1282. Noise parameters 1286 may comprise, for example, the frequency bands of the generated noise and its power. The noise parameters computation unit 1284 determines the noise parameters 1286 based on configuration from weights computation unit 1146 and on predefined criteria, as described hereinabove with reference to FIG. 15*b* and FIG. 18*b*. The embodiment described above may be implemented, mutatis mutandis, either in RF, IF or Baseband.

Figure 20A:
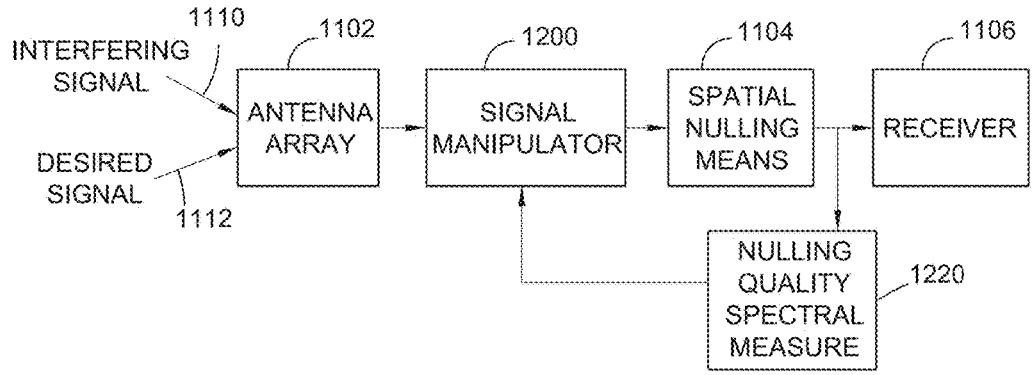

FIG. 20*a* illustrates another embodiment of the present invention which can, if desired, be combined with the embodiment of FIG. 16 or of FIG. 18 in that unit 1200 may be in accordance with the teachings of FIG. 16, or FIG. 18, or any other suitable implementation. Whereas in the embodiments of FIGS. 15, 16 and 18, the signal manipulator 1200 is configured and operative based on the design parameters provided by 1104, and acts like a "Feed Forward" mechanism, in FIGS. 20*a* and 20*b*, the signal manipulator 1200 is configured and operative based on feedback from actual performance of the nulling means and acts like a "feedback mechanism" rather than a "feed forward" mechanism. The feedback mechanism typically includes measuring the actual signals, using unit 1220. Block 1200 may comprise a programmable BPF, or a programmable noise injector, similar to previous embodiments.

The embodiment of FIG. 20*a* may be similar to the embodiment of FIG. 15*a*, except that the signal manipulator 1200 dynamically designs the frequency selective method e.g. according to quality measurements performed on the actual signal that outcomes of the spatial nulling means 1104. This operation may be performed by the nulling quality spectral measure 1220. For example, the energy of the actual signal may be measured over frequencies, and the actual null quality may be measured empirically. Optionally, this measure may be carried out by computing the FFT of the actual signal, or by other suitable known in the art methods for spectral estimation. The nulling quality measure 1220 then configures, using feedback, the signal manipulator 1200, thus allowing adaptation to the actual conditions. The signal manipulator 1200 may optionally comprise a programmable BPF as in FIG. 16*a*, or programmable band limited noise injectors as in FIG. 18*a*.

The term "designing the frequency selective method" as used herein includes configuring the signal manipulator. For BPF-based embodiments as described herein, this may include computation of BPF coefficients whereas for noise injector-based embodiments, as described herein, this configuration may include computation of the noise parameters.

Figure 20B:
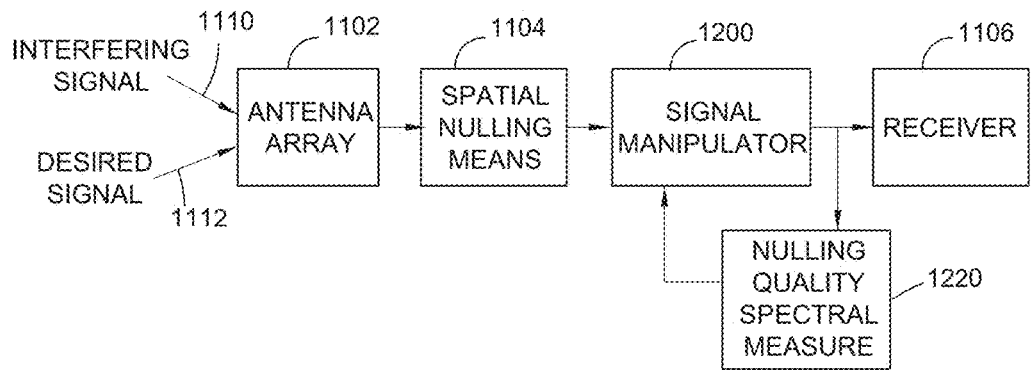

FIG. 20b illustrates yet another embodiment of the present invention. This embodiment is similar to the embodiment of FIG. 15b, except that in this embodiment the signal manipulator 1200 dynamically designs the frequency selective method according to some quality measurements performed on the actual signal that are provided by the signal manipulator 1200. This may be performed by the nulling quality spectral measure 1220. For example, the energy of the actual signal may be measured over frequencies, and the actual null quality may be measured empirically. Optionally, this measure may be done by computing the FFT of the actual signal, or by any other known in the art method for spectral estimation. The nulling quality measure 1220 then configures, using a feedback, the signal manipulator 1200, thus allowing adaptation to the actual conditions. The signal manipulator 1200 may optionally comprise a programmable BPF as in FIG. 16b, or programmable band limited noise injectors as in FIG. 18b.

Figure 20C:
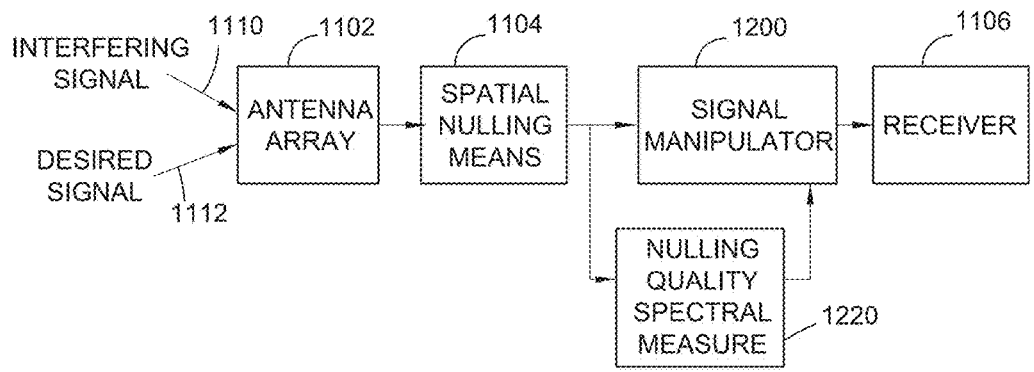

FIG. 20c illustrates still another embodiment of the present invention which is similar to the embodiments of FIGS. 15b and 20b, except that the signal manipulator 1200 dynamically designs the frequency selective method according to some quality measurements performed on the actual signal that comes out of the spatial nulling means 1104. This may be performed by the nulling quality spectral measure 1220. For example, the energy of the actual signal may be measured over frequencies, and the actual null quality may be measured empirically. Optionally, this measure may be done by computing the FFT of the actual signal, or by any other known in the art method for spectral estimation. The nulling quality measure 1220 then configures the signal manipulator 1200, thus allowing adaptation to the actual conditions. The signal manipulator 1200 may optionally comprise a programmable BPF as in FIG. 16b, or programmable band limited noise injectors as in FIG. 18b.

Figure 21A:
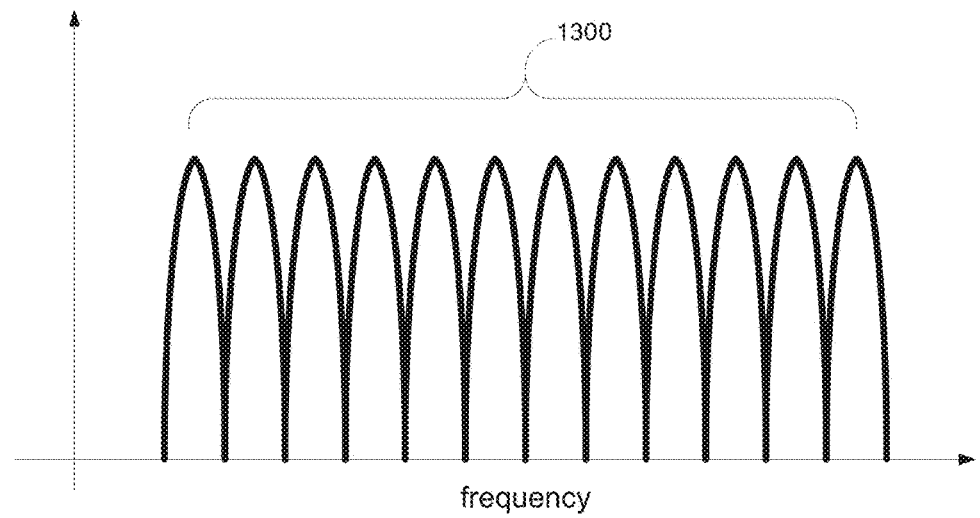

FIG. 21a is a prior art graph illustrating an example of a wideband multicarrier desired signal, comprising many carriers over frequencies 1300.

Figure 21B:
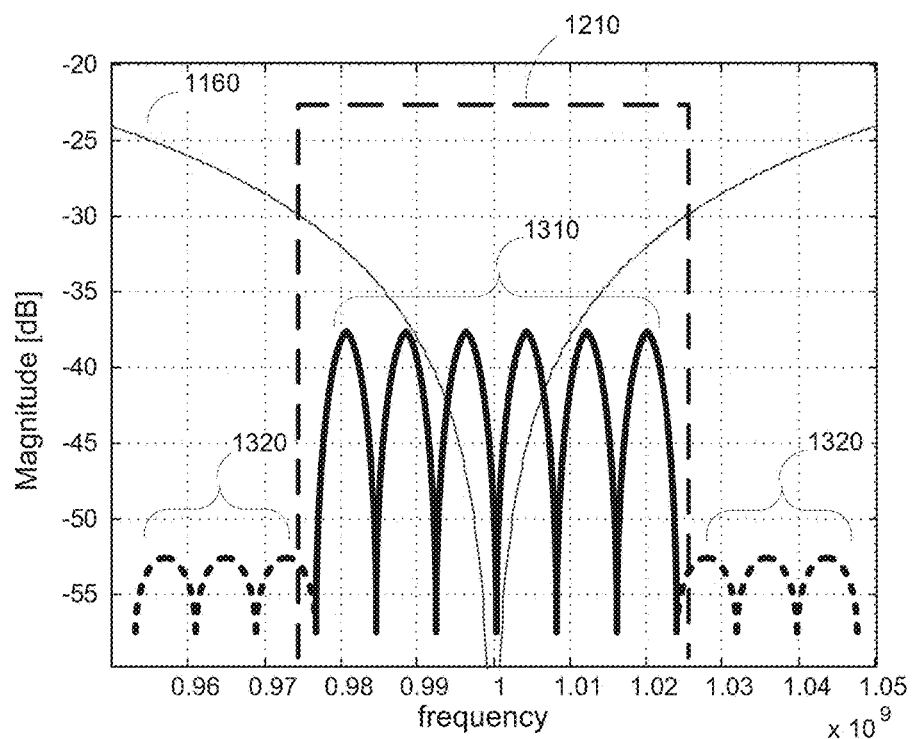

FIG. 21b is a graph illustrating an example of the output of the method described above with reference to FIG. 16a, FIG. 16b, FIG. 17, FIG. 19a and FIG. 19b. The programmable BPF 1200' having the frequency response 1210 causes frequencies 1310 to pass to the receiver, and frequencies 1320 to be blocked, because the null depth in frequencies 1320 is not good enough, as shown by graph 1160. Practically, frequencies 1320 may not be totally blocked, but attenuated to a sufficient extent. Therefore, the scheduler does not allocate any data transmissions onto these frequencies.

Figure 21C:
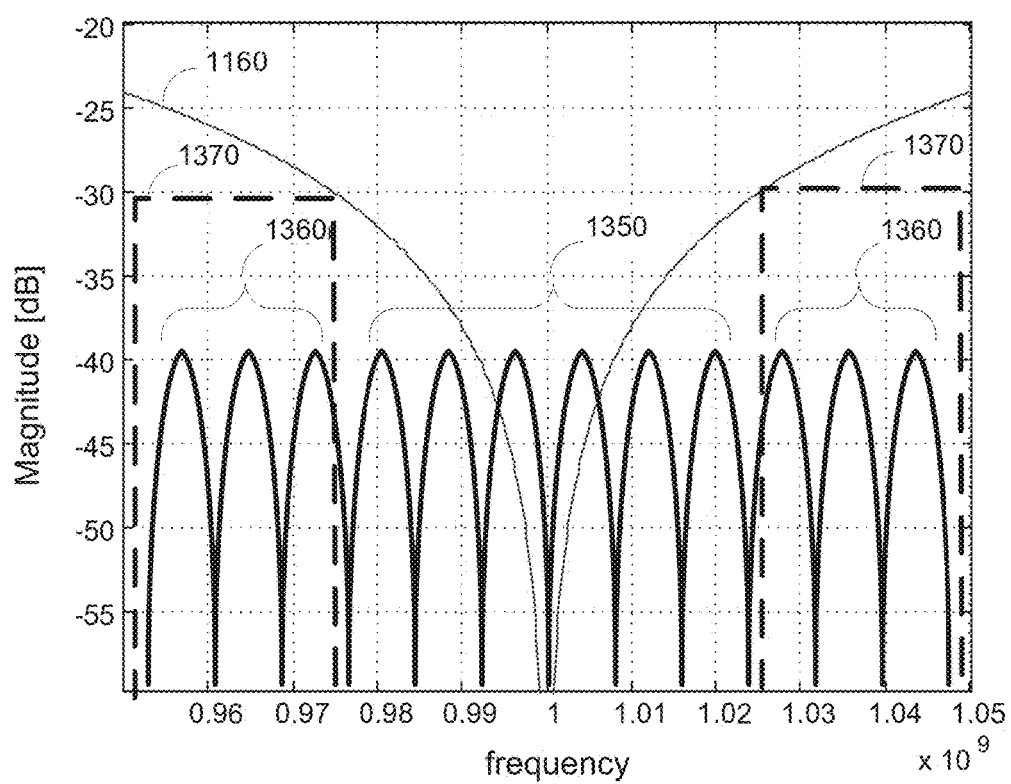

FIG. 21c illustrates an example of the outcome of the method described above with reference to FIGS. 18a-18b, 19c-19d. The programmable band limited noise injectors 1200'' generate and inject a multi-band band-limited noise having the spectrum 1370. Noise spectrum 1370 spans over carrier frequencies 1360 of the desired signal, causing receiver 1106 to receive carrier frequencies 1360 with a very low quality, i.e. very low SNR (Signal to Noise Ratio). Carrier frequencies 1360 are those in which the null depth is not good enough, as shown by graph 1160. Carrier frequencies 1350, in which the null depth is good enough, are not affected by the noise injectors. Therefore, the scheduler refrains from allocating data transmissions onto frequencies 1360, and prefer to concentrate data transmissions onto frequencies 1350.

Figure 22A:
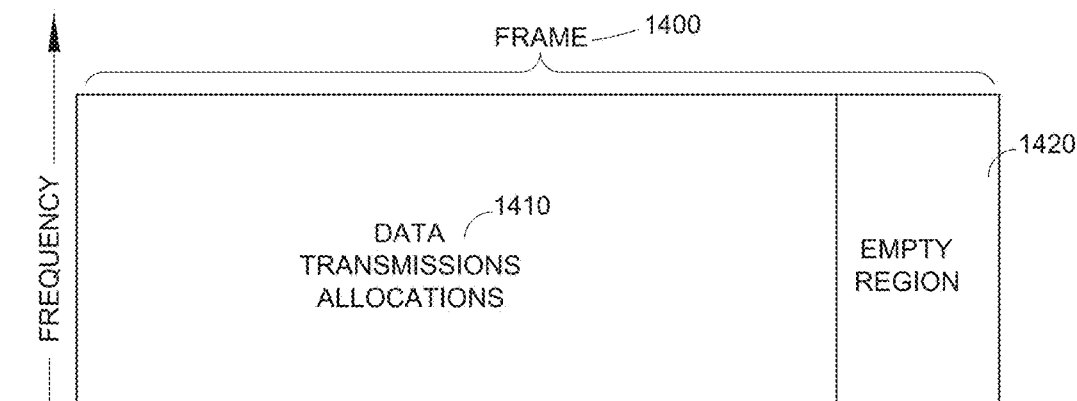
FIGS. 22a-22c are diagrams of methods for allocation of an empty region within a frame provided in accordance with certain respective embodiments of the present invention.
Figure 22B:
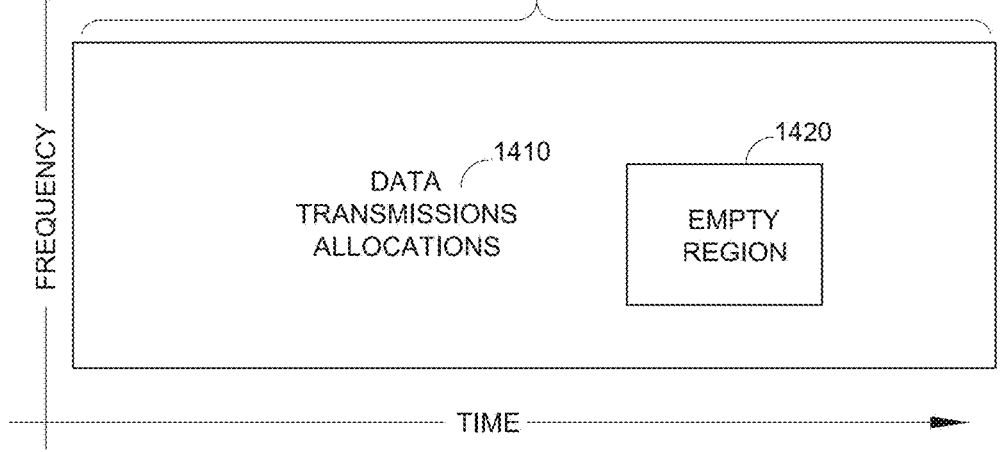
Figure 22C:
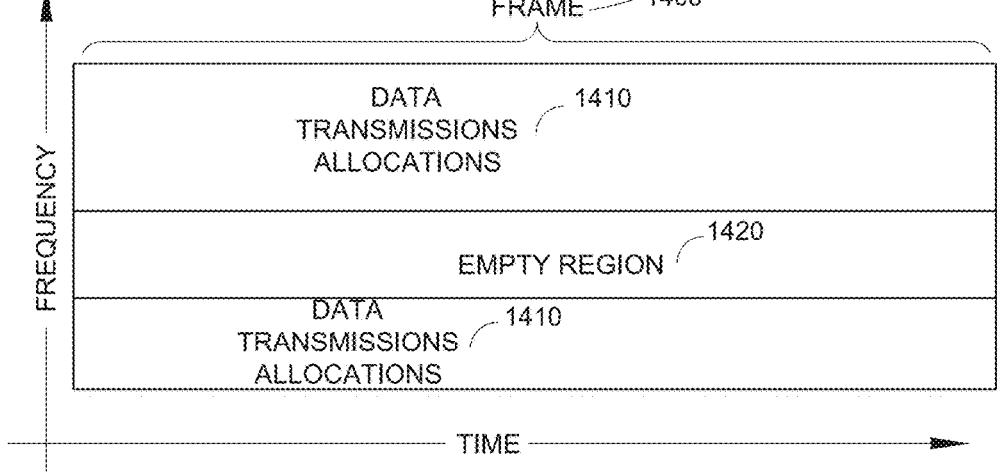

FIGS. 22a-22c illustrate an interference cancelling method constructed and operative in accordance with another embodiment of the present invention. In order for the multicarrier communication system to work properly, the data transmissions' allocations are made known to both the transmitter and the receiver. This is usually done by some protocol messages that the scheduler on one side sends to the other side, describing where and when data transmissions are placed, over time and frequency. For example, in WiMAX standard these protocol messages are called MAPs. FIG. 22a illustrates a frame 1400 for the multicarrier transmission. Frame 1400 is a time interval along the temporal axis. Data transmissions 1410 are allocated within the frame 1400. Data transmissions 1410 may originate and be transmitted from one source, or alternatively may be transmitted from several different transmitters, for multi-user data allocations, like in the case of OFDMA.

In order to be able to adjust the spatial nulling means 1104 efficiently, the method of FIGS. 22a-22c configures the scheduler to place an empty region 1420 within the frame 1400. In this empty region, no data transmissions are allocated by the scheduler. This empty region may be placed at the end of the frame duration, as illustrated in FIG. 22a, or at any other time within the frame as shown in FIGS. 22b and 22c, for example. The empty region may cover all the frequencies of the wideband transmission, and span only a portion of the frame duration, as in the example illustrated in FIG. 22a. For example, in WiMAX transmission, such a region is called a zone. Alternatively, the empty region may cover only a portion of frequencies, and span the whole frame duration, as in the example of FIG. 22c.

The empty region may also cover only a portion, either contiguous or fragmented, of frequencies, and may span over only a portion, either contiguous or fragmented, of the frame duration, as in the example of FIG. 22b. In LTE, such a region is called Resource Block (RB). Typically, the spatial nulling means 1104 may perform its adaptive weight computations as is well known in the art, using the received signal in the empty region.

Conventional methods for adaptive weight computation are described inter alia in the following publications:

An Overview of Adaptive Antenna Systems, Hafeth Hourani, Helsinki University of Technology—section VI An Overview of Adaptive Antenna Technologies For Wireless Communications, Chris Loadman, Dr Zhizhang Chen & Dylan Jorgensen, Dalhousie University—sections 3.1,3.2,3.3

Null-steering LMS Dual-Polarised Adaptive Antenna Arrays for GPS, W C Cheuk, M Trinkle & D A Gray, Journal of Global Positioning Systems (2005), Vol. 4, No. 1-2: 258-267,—formula 2.2

Smart Antenna Design for Wireless Communication using Adaptive Beam-forming Approach, Susmita Das, National Institute of Technology, Rourkela, India—section III Smart Antennas, Lal Chand Godara, CRC Press—section 2.3; and Digital Beamforming in Wireless Communications, John Litva and Titus Kwok-Yeung Lo, Artech House—section 3.2.

The spatial nulling means may optionally detect and estimate the presence of the interferer signals, their directions, power or some other measure. The empty region enables spatial nulling means 1104, the signal manipulator 1200 and the nulling quality spectral measure 1120, e.g. as described above, to adapt, compute and configure their parameters more accurately, because the only signals that are received within the empty region are the interferers 1110, while the desired signal 1112 is silent. Hence, the detection of the presence of an interferer, and measuring its power may be accurately performed by measuring the received power within the empty region. Computing the spatial nulling means weights by weights computation unit 1146 yields more accurate results when performed over the interferer 1110 solely, without the desired signal 1112 which acts like a noise for the weights computation unit method 1146. The spatial nulling means 1104 and the signal manipulator 1200 may be any one of the embodiments described hereinabove, specifically, but not limited to, one of the embodiments of FIGS. 15a,-15b, 16a-16b, 18a,-18b, 19a-19d, 20a-20c.

In a further embodiment, the empty region in the frame is controlled to be placed dynamically, e.g. according to the measured conditions, pre-determined configuration, and some decision logic. Optionally, the length in time and the bandwidth in frequency of the empty region, the provision of the empty region every frame or only once per several frames, and the place of the empty region within the frame, may be all configurable parameters, and may be controlled and adjusted dynamically. For example, if no interference is detected, the empty region size may be reduced, and it may be allocated once per several frames, in order to save throughput. Once interference is detected, the empty region may be enlarged to span over all frequencies in order to measure the interference and to adapt the weights more accurately, and also the empty region may be allocated on every frame in order to dynamically adapt to varying interferences.

In another embodiment, the scheduler is not configured directly to place an empty region 1420 within frame 1400. Instead, signal manipulator 1200 is configured to block the signal over the desired empty region location in time and frequency. Signal manipulator 1200 may optionally inject noise onto this region, or dynamically filter out this region. The receiver 1106 measures the received signal quality over this region as very bad, thus the scheduler does not allocate any data transmissions onto this region during the next frame or several frames. This way the empty region is practically allocated, but without direct configuration of the scheduler. This is an advantage in case the scheduler is not accessible directly.

Figure 23A:
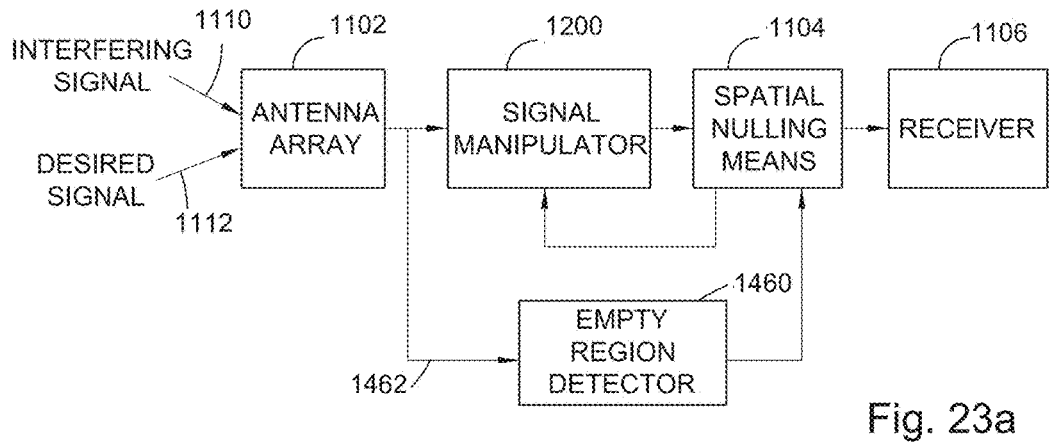
FIGS. 23a-23c and 25a-25c are simplified functional block diagram illustrations of interference cancelling systems for multicarrier communication applications, constructed and operative in accordance with certain embodiments of the present invention and characterized in that adaption of an interference canceller is provided, including using a scheduler to reserve, e.g. according to the methods of FIGS. 22a-22c, at least one empty sub-region within the time-frequency region by allocating only portions external to the sub-region to each of the data transmissions; and configuring the interference canceller by deriving, from signal content in the empty sub-region, at least one interference-dependent parameter of the interference canceller's operation.
Figure 23B:
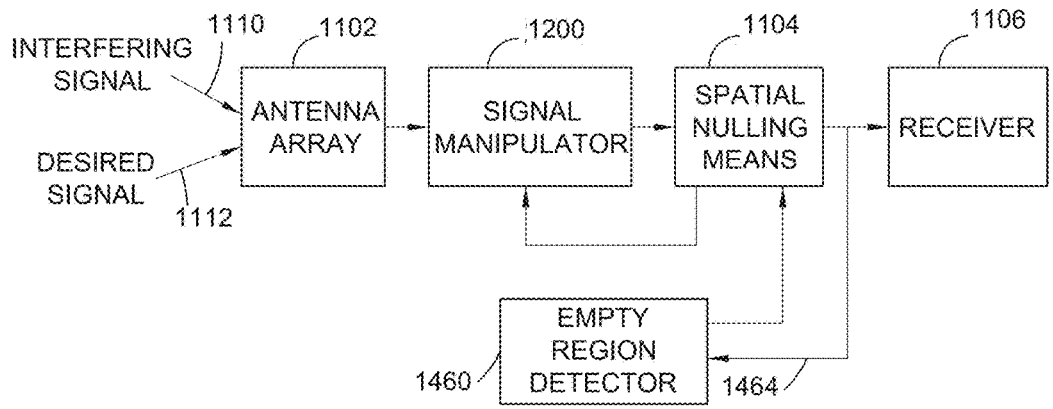
Figure 23C:
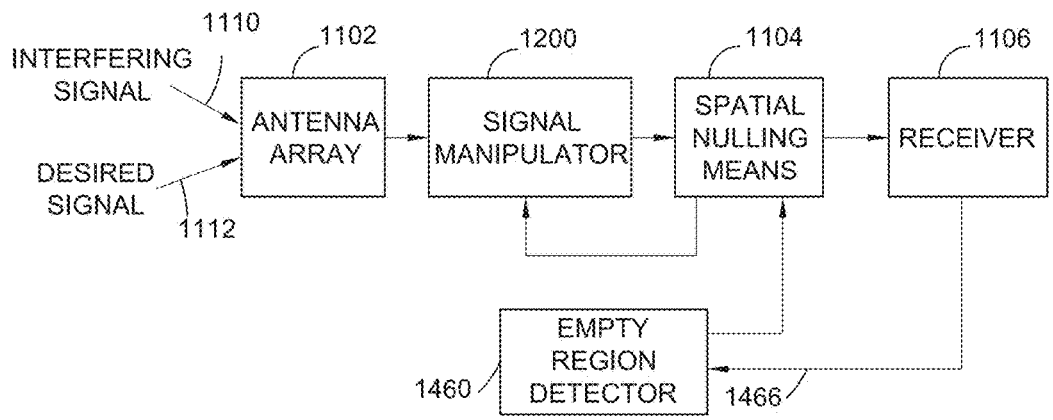

FIGS. 23a-23c illustrate modifications of the system of FIG. 22, which differ regarding the information which is fed into the empty region detector 1460. The spatial nulling means 1104 and the signal manipulator 1200 may be any one of the embodiments described hereinabove, such as but not limited to any of the embodiments of FIGS. 15a,-15b, 16a-16b, 18a,-18b, 19a-19d, 20a-20c. Specifically, the order of the spatial nulling means 1104 and the signal manipulator 1200 may be reversed.

In FIG. 23a, the signals 1462 from the antenna array 1102 are fed into an empty region detector 1460, which in turn detects the time-frequency existence and location of the empty region 1420. The detection may be based on energy criteria or by any other detection criteria or method. For example, in the case of interferer signal 1110 whose power is not too high relative to the power of the desired signal 1112, a simple energy measurement may be performed on each frequency carrier of the multi-carrier transmission, and every symbol duration, which is the fundamental temporal unit of the multi-carrier signal. The measured energy within the empty region will be noticeably lower than the energy within other regions in the frame. More complex methods for the detection of the empty region may utilize cross-correlation computations between the received signal 1462 and some predetermined reference signals.

Upon detection of the empty region, the detector 1460 notifies and triggers the spatial nulling means 1104 to compute and update its weights. Optionally, detector 1460 also triggers the signal manipulator 1200 to compute its parameters.

FIG. 23b illustrates another embodiment which is a variation on the embodiment of FIG. 23a in which the empty region detector 1460 is fed with the cleaner signal 1464 provided by the spatial nulling means 1104. The advantage of this embodiment is that the detection of the empty region may be performed more accurately, because the input signal to the detector 1460 contains less interferers' power, thus the empty region is more noticeable. The mutual operation of the spatial nulling means 1104 and the empty region detector 1460 may optionally be in an iterative-feedback manner, i.e. the detector 1460 detects the empty region and triggers spatial nulling means 1104 to compute weights, such that a cleaner signal is produced by the spatial nulling means 1104, allowing detector 1460 to detect the next coming empty region more accurately, and so forth.

FIG. 23c illustrates another variation on the embodiment of FIG. 23a in which the empty zone detector 1460 is fed with information from the receiver 1106. Optionally, the receiver 1106 generates a synchronization signal that notifies when the empty region starts. Alternatively, the receiver sends some data describing where and when the empty region is placed.

Figure 24:
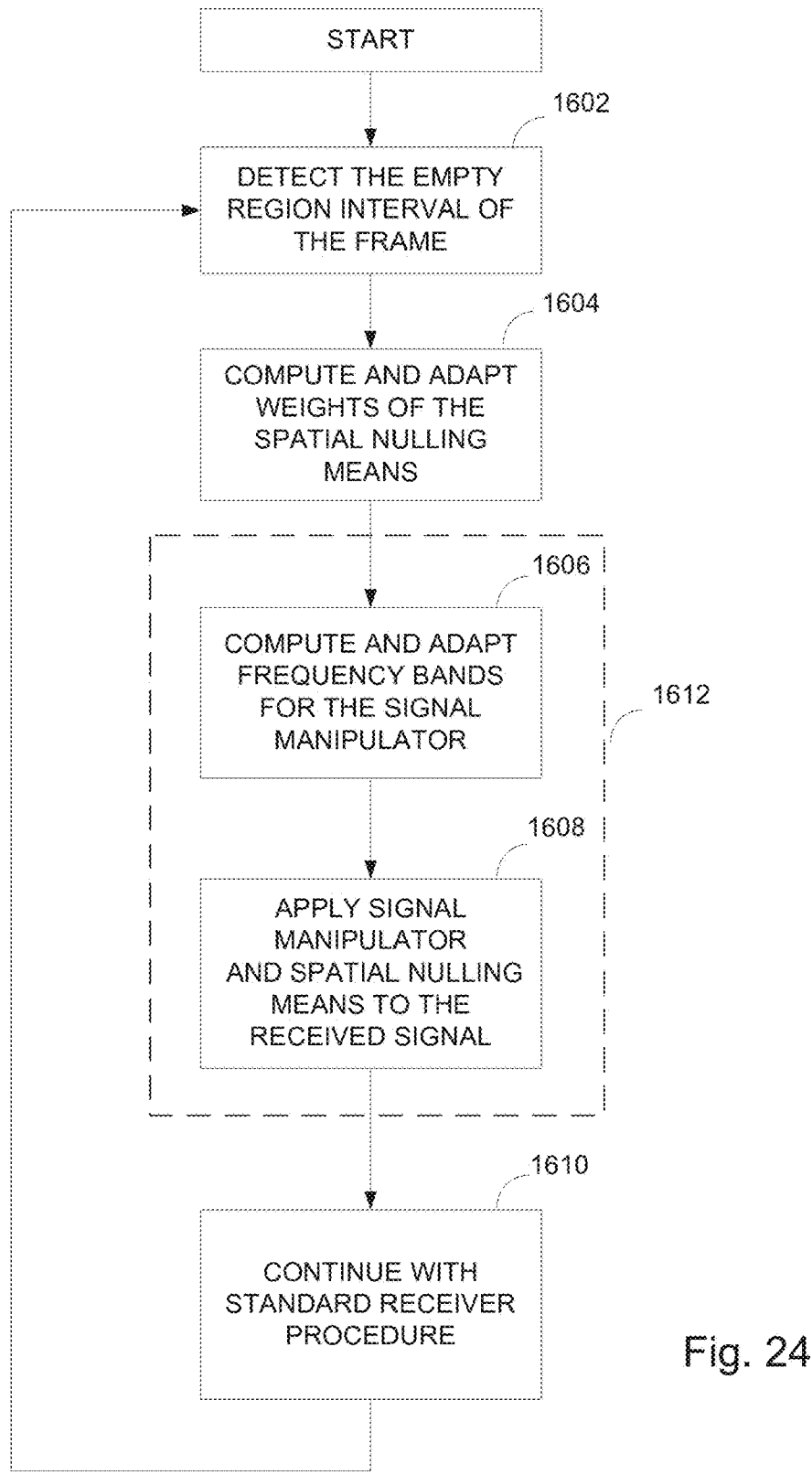
FIG. 24 is a simplified flowchart operation of a method for empty sub-region reservation which may be a method of operation for certain of the systems shown and described above.

FIG. 24 is a simplified flowchart illustration of a method of operation of the apparatus described above with reference to FIG. 23. Typically, upon setup, the scheduler is configured to place an empty region 1420 within frame 1400, and step 1602 is entered. In step 1602, the empty region detector 1460 searches for the empty region 1420. Upon detection of the empty region 1420, step 1604 is entered, in which and spatial nulling means 1104 compute and adapt its weights. This is done by the weights computation unit 1146, using the signals received over the empty region 1420. After weights are computed, step 1606 is entered, in which signal manipulator 1200 determines the desired useful frequency bands, either by analyzing the computed weights which are passed to signal manipulator 1200, e.g. as described above with reference to FIGS. 15a-15b, or alternatively by analyzing the nulling quality by nulling quality spectral measure 1220, e.g. as described above with reference to FIGS. 20a-20c.

After the desired useful frequency bands are determined, signal manipulator 1200 may adapt its frequency dependent method, either by coefficient computation unit 1206 for the programmable BPF 1202 e.g. as described above with reference to FIGS. 19a-19b, or alternatively by noise parameters computation 1284 for the programmable band limited noise injector 1282 e.g. as described above with reference to FIGS. 19c-19d. Then, step 1608 is entered, in which the signal manipulator 1200 method and the spatial nulling means 1104 method are applied to the signals coming from the antenna array 1102, generating a cleaner signal which is fed into the receiver 1106. Then, in step 1610, receiver 1106 performs its standard receive procedures, and completes the reception of the frame. Step 1602 may be optionally reentered either for each frame, or once per several frames, or upon a change in the quality of the reception of the desired signal. Steps 1606 and 1608 may be performed together at a single step 1612.

Figure 25A:
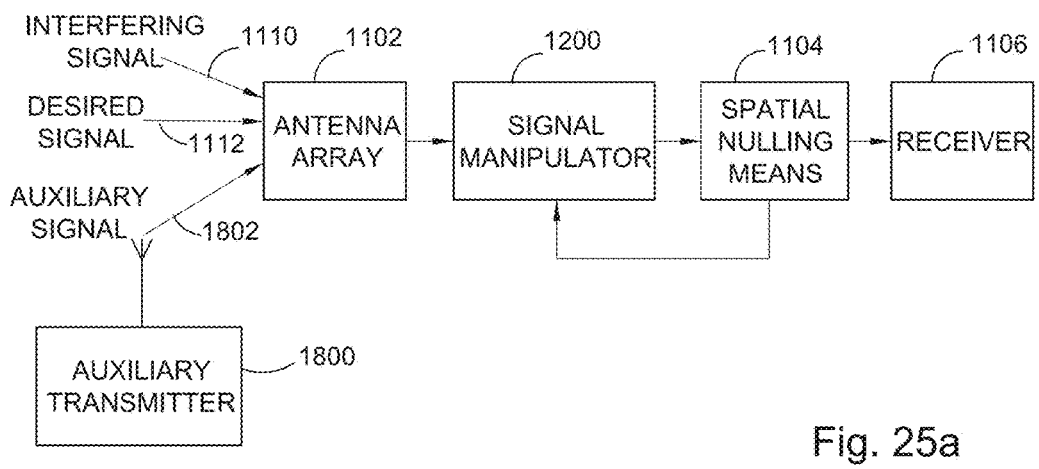
Figure 25B:
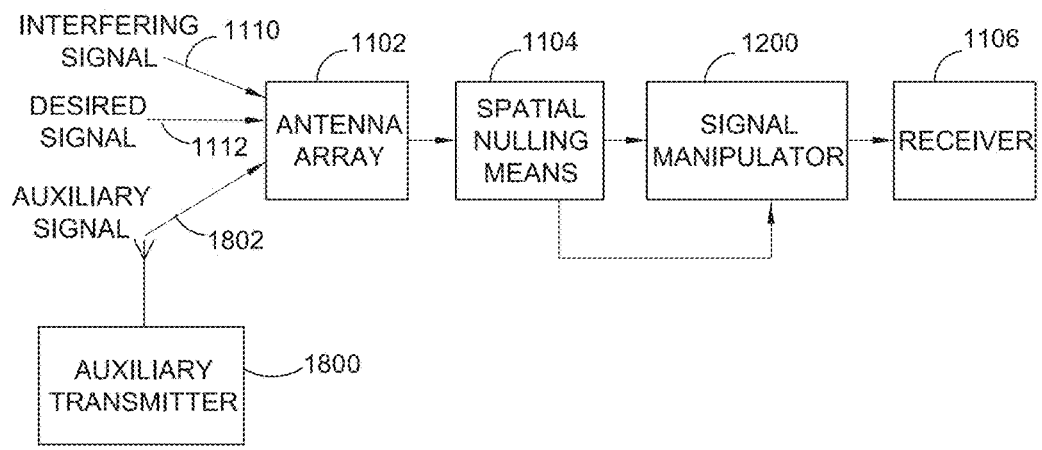
Figure 25C:
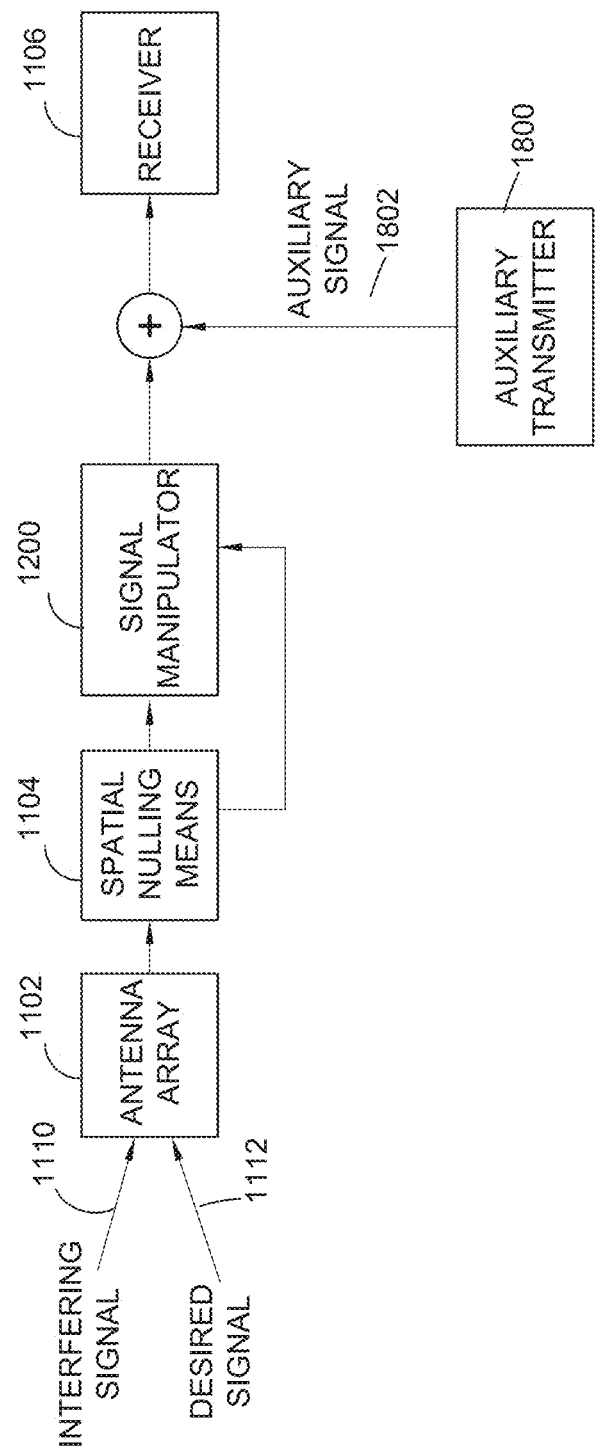

FIGS. 25a-25c illustrate three respective embodiments of another system for allocation of the empty region 1420 described above with reference to FIG. 22. In these embodiments, the scheduler is not directly configured to allocate empty region 1420. Instead, an auxiliary signal 1802 is generated, in a manner described hereinbelow, indirectly causing the scheduler to allocate the empty region 1420. In these figures, the spatial nulling means 1104 and the signal manipulator 1200 may be any one of the embodiments described hereinabove, such as but not limited to, one of the embodiments of FIGS. 15a,-15b, 16a-16b,18a,-18b, 19a-19d, 20a-20c.

FIG. 25a illustrates an auxiliary transmitter 1800 transmitting an auxiliary signal 1802, which is received by antenna array 1102 along with the other signals. Auxiliary transmitter 1800 is a cooperative transmitter, configured to transmit an auxiliary signal 1802 carrying a request to the scheduler for allocating an available region for the use of the auxiliary transmitter 1800. The allocation request is sent using agreed protocol messages of the multi-carrier transmission. The scheduler, based on its priorities, allocates a region for the auxiliary transmitter 1800, considering transmitter 1800 as a regular transmitter asking for allocation.

Upon grant for transmission, the auxiliary transmitter 1800 does not transmit any signals onto at least a portion of its allocated region, thus effectively causing an empty region 1420. Thereby, the empty region is practically allocated, but without direct configuration of the scheduler. This is an advantage in the case that the scheduler is not accessible directly. The auxiliary transmitter 1800 may be located at a place near antenna array 1102, or at another place, far from antenna array 1102. Alternatively, auxiliary signal 1802 may be added after the antenna array 1102, thus there is no need for the auxiliary transmitter 1800 to transmit energy to the air.

Optionally, auxiliary transmitter 1800 may be replaced by simulator generating the auxiliary signal 1802, thus eliminating the need for a full transmitter device.

The embodiment of FIG. 25b is similar to the embodiment of FIG. 25a, except that the order of spatial nulling means 1104 and the signal manipulator 1200 is reversed.

The embodiment of FIG. 25c is similar to the embodiment of FIG. 25a, except that the auxiliary signal is added to the signal fed into the receiver 1106, thus there is no need for the auxiliary transmitter 1800 to transmit energy to the air.

Figure 26A:
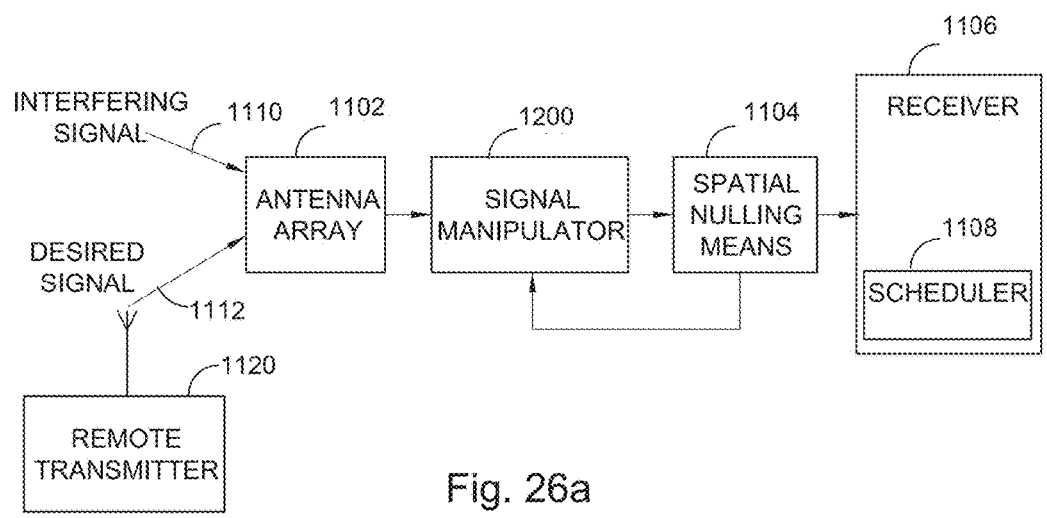
Figure 26B:
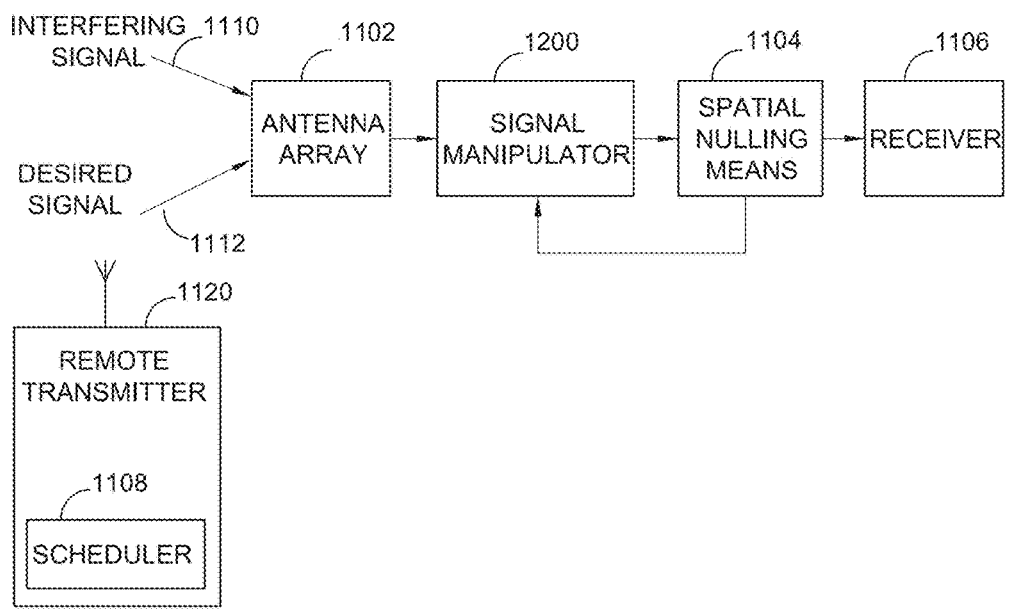
Figure 26C:
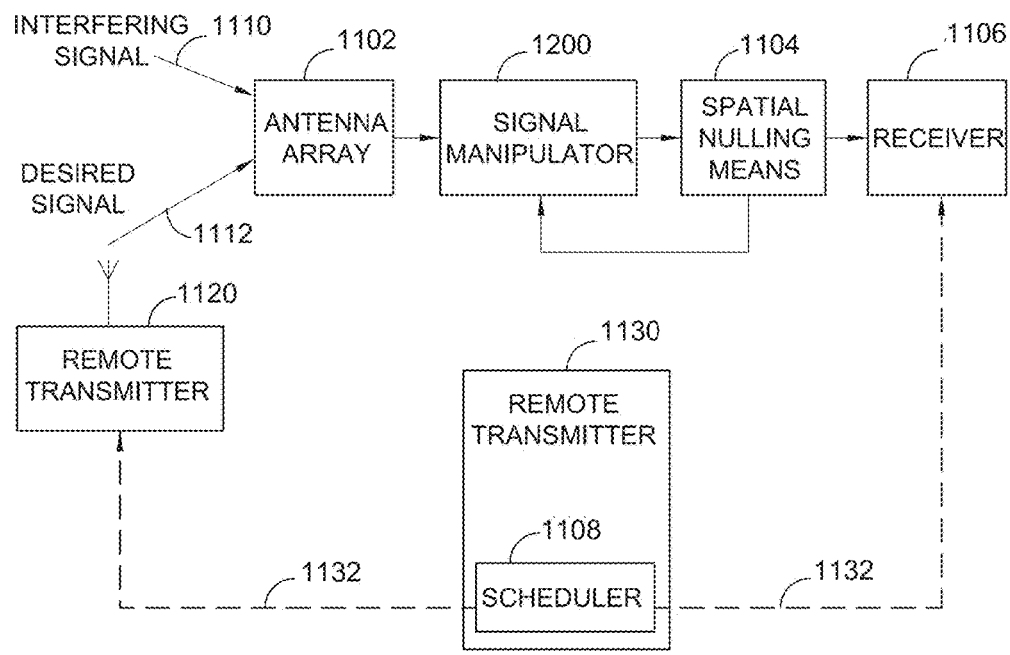

FIGS. 26A-26C illustrate alternative embodiments of the present invention which include a scheduler. FIGS. 26A-26C are based on the embodiment of FIG. 15a; it is appreciated that the embodiments of FIGS. 15B-20 and 23-25 may be modified similarly.

In FIG. 26a, scheduler 1108 is in the receiver 1106, or at the receiver side. The scheduler determines the data transmissions allocations over time/frequency, and configures the receiver accordingly. Also, the allocation is passed to the other side, i.e. to the remote transmitter, via the reverse communication link.

In FIG. 26b, scheduler 1108 is in the transmitter 1120, or at the transmitter side. The scheduler determines the data transmissions allocations over time/frequency, and configures the transmitter accordingly. Also, the allocation is passed to the other side, i.e. to the receiver, via the communication link e.g. via signal 1112, at the start of each frame, describing allocations at the rest of the frame.

In FIG. 26c, the scheduler 1108 is in a remote server 1130, and is located neither at the transmitter, nor at the receiver. The scheduler determines the data transmissions allocations over time/frequency. The allocation is passed to both the receiver and the transmitter, and configures them accordingly. Allocation is passed via communication means 1132, which could be any suitable communication means.

Regarding use of required Signal to Interferer Ratio (SIR) e.g. in the embodiments of FIGS. 15a, 16a and 18a, as described above, the appropriate level of SIR which may be employed is application specific since it typically depends on the physical layer (PHY) mode of operation, PHY configuration parameters and receiver design. For example, parameters that may affect determination of an appropriate SIR level include but may not be limited to the modulation order (e.g. QPSK, 16QAM, 64QAM etc.), the FEC (Forward Error Correction) method being used, the FEC rate, and the required BER (Bit Error Rate) at the receiver. The spatial nulling means affects the SIR by aiming for maximal reducing of the interferer power, while minimally reducing the desired signal power, hence aiming to enlarge the SIR. However, the nulling capabilities vary along frequencies, as described above with reference to FIG. 14. Frequency response 1160 depicts the nulling capability as a function of frequency, at the spatial angle of the interferer. Hence, the SIR at the output of the spatial nulling means is frequency dependent. For some frequencies the null is deep enough, affecting a good enough SIR (i.e. at least the required SIR for appropriate operation of the receiver). For other frequencies, the null is not deep enough, causing SIR not to be good enough in the sense that it does not meet the required SIR for appropriate operation of the receiver.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The present invention has been described with certain degree of particularity, but those versed in the art will readily appreciate that various alterations and modifications may be carried out without departing from the scope of the following Claims.

The invention claimed is:

1. A cellular system comprising:
   at least one moving relay having at least one add-on Interference Cancellation Module (ICM) configured to generate a cleaner signal by increasing a Signal-to-Interferer Ratio (SIR), thereby cancelling interference, to provide cellular communication between at least two mobile stations in a geographic area that lacks adequate cellular coverage by at least one stationary base station,
   wherein said interference originates from an intra-network or from an out-of-network source,
   wherein the cleaner signal is produced by at least a signal manipulator and a spatial nulling device,
   wherein said signal manipulator comprises an array of programmable band limited noise injectors including a plurality of programmable band limited noise injectors corresponding in number to a plurality of antennae,
   wherein each noise injector adds noise to the signal received from an antenna corresponding to the noise injector, such that noise is added only to frequency bands outside a subset of frequency bands in which the spatial nulling device is more effective and not to frequency bands inside the subset.

2. The system according to claim 1, wherein said lack of adequate coverage by the at least one stationary base station stems from a disconnected backhauling radio link between the moving relay and the at least one stationary base station.

3. The cellular system according to claim 2, wherein said moving relay includes a base station, a relay resource manager and a link to other base station.

4. The cellular system according to claim 3, wherein said ICM is coupled to said base station included in the moving relay.

5. The cellular system according to claim 3, wherein said link to other base station is implemented as in-band backhauling using mobile station functionality, and wherein said ICM is coupled to said mobile station functionality.

6. The cellular system according to claim 1, wherein said moving relay includes a base station, a relay resource manager and a link to other base station.

7. The system according to claim 6, wherein said moving relay further comprising at least one add-on Security Module (SM) facilitating upgraded security;
   wherein said at least two Mobile Stations each having at least one add-on Security Module (SM) facilitating upgraded security; and
   wherein the SM of said moving relay is interfaced to a moving core segment of said relay resource manager.

8. The cellular system according to claim 6, wherein said ICM is coupled to said base station included in the moving relay.

9. The cellular system according to claim 6, wherein said link to other base station is implemented as in-band backhauling using mobile station functionality, and wherein said ICM is coupled to said mobile station functionality.

10. The system according to claim 1, operable in 4G standard.

11. The system according to claim 1, operable in 3G standard.

12. The system according to claim 1, operable in WiMAX standard.

13. The system according to claim 1, wherein said cellular communication is configured to support applications including at least one of audio, video, messaging and data.

14. The system according to claim 1, wherein said moving relay is carried by a moving autonomous platform from a group that includes ground robot, unmanned aerial vehicle (UAV) or unmanned seaborne vessel.

15. A mobile station operable in a cellular system, the mobile station comprising:
   at least one add-on Interference Cancellation Module (ICM), configured to generate a cleaner signal by increasing a Signal-to-Interferer Ratio (SIR), thereby cancelling interference, and being configured to be carried by a moving platform;

the cellular system including at least one moving relay, to provide cellular communication between said mobile station and at least one other mobile station in a geographic area that lacks adequate cellular coverage by at least one stationary base station, wherein said interference originates from an intra-network or from an out-of-network source, wherein the cleaner signal is produced by at least a signal manipulator and a spatial nulling device, wherein said signal manipulator comprises an array of programmable band limited noise injectors including a plurality of programmable band limited noise injectors corresponding in number to a plurality of antennae, and wherein each noise injector adds noise to the signal received from an antenna corresponding to the noise injector, such that noise is added only to frequency bands outside a subset of frequency bands in which the spatial nulling device is more effective and not to frequency bands inside the subset.

16. The mobile station according to claim 15, the mobile station further comprising at least one add-on Security Module (SM); wherein said at least one moving relay having at least one add-on Security Module (SM) facilitating upgraded security for enabling cellular communication between said mobile station and at least one other mobile station having at least one add-on Security Module (SM).

17. The system according to claim 15, wherein said cellular communication is configured to support applications including at least one of audio, video, messaging and data.

18. The mobile station according to claim 15, operable in 4G standard.

19. The mobile station according to claim 15, operable in 3G standard.

20. The mobile station according to claim 15, operable in WiMAX standard.

\* \* \* \* \*